United States Patent [19]

Hosokawa et al.

[11] Patent Number: 5,389,444
[45] Date of Patent: Feb. 14, 1995

[54] ORGANIC ELECTROLUMINESCENCE DEVICE

[75] Inventors: Chishio Hosokawa; Shuji Sakamoto; Tadashi Kusumoto, all of Sodegaura, Japan

[73] Assignee: Idemitsu Kosan Co., Ltd., Tokyo, Japan

[21] Appl. No.: 50,489

[22] PCT Filed: Sep. 16, 1992

[86] PCT No.: PCT/JP92/01180
§ 371 Date: May 11, 1993
§ 102(e) Date: May 11, 1993

[87] PCT Pub. No.: WO93/06189
PCT Pub. Date: Apr. 1, 1993

[30] Foreign Application Priority Data

Sep. 18, 1991 [JP] Japan ................... 3-238111
Mar. 9, 1992 [JP] Japan ................... 4-050865
Mar. 10, 1992 [JP] Japan ................... 4-051955

[51] Int. Cl.⁶ ............................................. B32B 9/00
[52] U.S. Cl. ......................... 428/457; 428/917; 313/504; 252/301.16
[58] Field of Search .......... 313/501, 502, 503, 504; 252/301.16, 301.17, 301.19, 301.21, 301.22, 301.23, 301.35; 428/690, 917, 457

[56] References Cited

U.S. PATENT DOCUMENTS

| | | | |
|---|---|---|---|
| 4,317,782 | 3/1982 | Eckstein et al. | 252/301.22 |
| 5,085,947 | 2/1992 | Saito et al. | 428/917 |
| 5,093,210 | 3/1992 | Ohta et al. | 428/690 |
| 5,104,749 | 4/1992 | Sato et al. | 428/690 |
| 5,130,603 | 7/1992 | Tokailin et al. | 313/504 |
| 5,247,190 | 9/1993 | Friend et al. | 313/504 |

FOREIGN PATENT DOCUMENTS

| | | | |
|---|---|---|---|
| 0388768 | 9/1990 | European Pat. Off. | |
| 0399508 | 11/1990 | European Pat. Off. | |
| 2-247278 | 10/1990 | Japan | |
| 2-311591 | 12/1990 | Japan | |
| 300342 | 2/1991 | Japan | 252/301.16 |
| 3-231970 | 10/1991 | Japan | |
| 068414 | 1/1992 | Japan | 252/301.16 |
| 5-17765 | 1/1993 | Japan | 252/301.16 |

Primary Examiner—Patrick J. Ryan
Assistant Examiner—Patrick Jewik
Attorney, Agent, or Firm—Frishauf, Holtz, Goodman & Woodward

[57] ABSTRACT

An organic electroluminescence device having a high brightness, a high luminescence efficiency and a long service life. The organic electroluminescence device including two opposing electrodes and having disposed therebetween a polycarbonate polymer containing a styrylamine skeleton or a diarylvinylene arylene skeleton as a repeating unit.

25 Claims, 1 Drawing Sheet

ORGANIC ELECTROLUMINESCENCE DEVICE

TECHNICAL FIELD

The present invention relates to an organic electroluminescence device (hereinafter referred to as an organic EL device). More particularly, it relates to an organic EL device sufficiently high in brightness and luminescence efficiency, capable of emitting EL in the color range from blue to green, comprising an emitting layer or a hole injection layer made of a polycarbonate excellent in an ability to retain a thin film.

BACKGROUND ART

In recent years, Friend, R. H., et al. have disclosed an organic EL device having a emitting layer comprising a polyphenylene vinylene (PPV) as a emitting material (International Disclosure WO90/13148). This organic EL device is meant to take the electroluminescence effect by the injection of carriers (holes and electrons) from appropriate injecting electrodes into the conjugated polymer. The inventors have enumerated the characteristic features of the organic EL device as follows: (1) it is stable to oxygen and moisture, unsusceptible to changes even at high temperatures, (2) the emitting layer is adhesive with respect to an underlying electrode and the like, having resistance to cracks of thermal or mechanical origin, (3) the PPV is not liable to recrystallize and (4) the PPV is highly crystallizable and has a high melting point, preventing the migration of ions or atoms.

However, this organic EL device comprises a PPV as a completely conjugated polymer hardly capable of emitting in blue and having a low fluorescence yield. Friend, R. H., et al. has made clear that the above shortcoming is explained by the low fluorescence yield of the PPV (J. Phys. D20, 1367 (1987) and J. Mol. Electronics; 5, 19, (1989)). Said PPV has the fluorescence yield of 1% or less. The electroluminescence efficiency (hereinafter referred to as EL efficiency) is lower than the fluorescence yield, and sufficiently high brightness cannot be obtained since the fluorescence yield is as low as 1% or less. Furthermore, thin films of PPV can be formed simply by spin-coating a soluble precursor, and heat-treating the above precursor film. But the optimum conditions of this heat treatment are not an easy matter to determine, and are liable to permit the conjugation of the main chain to have defects causing a decrease of EL efficiency. Thus it is difficult or entirely impossible to use a thin film of a conjugated polymer such as polyphenylene vinylene as the emitting layer in an organic EL device.

Furthermore, D. Braun et al. have disclosed a device having a emitting layer comprising a thin film which is composed of spin coated soluble PPV derivative with a long chain alkoxy substituent group (Appl. Phys. Lett. 58, 1982 (1991)). This PPV derivative also has a low fluorescence yield (quantum yield) and thus the EL quantum yield is as low as $5 \times 10^{-4}$ if an in cathode is used and $10^{-2}$ if a Ca cathode is used. The color of the EL due to this PPV derivative is limited to orange.

Furthermore, Hosokawa et al. have disclosed an organic EL device having a emitting layer comprising a low molecular weight molecule with an arylene vinylene structure (EP No.0373582 and EP No. 0388768, etc.). This organic EL device is capable of emitting EL in greenish blue at a brightness as high as 300 cd/m² and having a luminescence efficiency of 2.9 lumen/W even with the application of a meager 5V. They also have invented emitting layers made of substances having the similar structures which are capable of not only emitting EL in blue at a high brightness over 1000 cd/m² but also emitting EL in a variety of colors range from bluish purple to green in sufficiently high brightness and efficiency.

These emitting layers are formed by the vapor deposition method. However, the vapor deposition method is more time consuming and less-productive than the spin coating method. Meanwhile, the vapor deposition films of an organic low molecular weight substance are liable to recrystallize on account of changes with the elapse of time or heat generation incidental to the operations. The recrystallized films no longer work as a emitting layer or as a hole injecting layer. The ability to retain thin films is missing in products of the vapor deposition method.

Under the circumstances, the present inventors have made extensive studies with a view to overcoming these shortcomings of the prior arts and developing an organic EL device comprising a emitting layer of a thin film easy to be formed by the spin coating method and capable of emitting EL in the color range from blue to green in sufficiently high brightness even on an application of a low applied voltage.

DISCLOSURE OF INVENTION

As the result, it has been found that said objects can be achieved to a full extent by using a polycarbonate polymer comprising a styrylamine or diarylvinylene arylene skeleton as the repeating unit and having a far better ability to retain thin films than organic low molecular weight substances. The new device has much improved luminescence efficiency as compared with the devices comprising the conjugated polymers such as PPV of the related arts. The present invention has been completed on the basis of this finding.

Accordingly, the present invention provides an organic electroluminescence device comprising as an emitting material and/or a hole injecting material a polycarbonate containing a repeating unit formed of a styrylamine skeleton or a diarylvinylene arylene skeleton capable of the electroluminescence. Particularly, the present invention provides said organic electroluminescence device comprising a polycarbonate containing a repeating unit represented by the general formula (I):

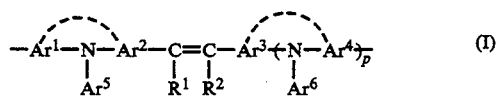  (I)

wherein $Ar^1$ to $Ar^4$ are each independently a substituted or unsubstituted arylene group having 6 to 20 carbon atoms; $Ar^5$ and $Ar^6$ are each independently a substituted or unsubstituted aryl group having 6 to 20 carbon atoms; $R^1$ and $R^2$ are each independently a hydrogen atom, an alkyl group having 1 to 6 carbon atoms or a substituted or unsubstituted aryl group having 6 to 20 carbon atoms wherein the substituent groups are an alkyl or alkoxy group having 1 to 10 carbon atoms; and P is an integer of 0 or 1, furthermore, the present invention provides said organic electroluminescence device comprising a polycarbonate containing a repeating unit (α) represented by the general formula (II):

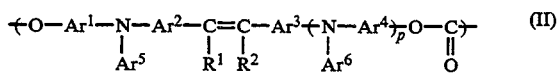

wherein Ar¹ to Ar⁶, R¹, R² and P are as defined above and R⁷ is each independently a substituted or unsubstituted arylene group having 6 to 20 carbon atoms, and a repeating unit (β) represented by the general formula (III):

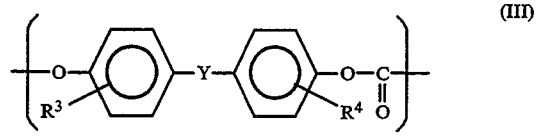

wherein $R^3$ and $R^4$ are each independently a hydrogen atom or an alkyl group having 1 to 6 carbon atoms; and Y is a single bond represented by:

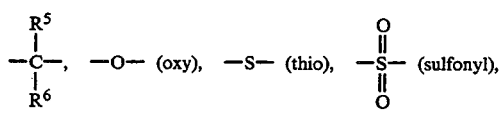

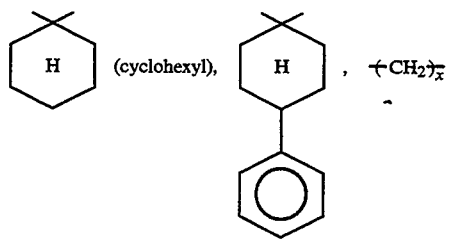

wherein x is an integer of 2 to 10; $R^5$ and $R^6$ are each independently a hydrogen atom, an alkyl group having 1 to 6 carbon atoms or an aryl group having 6 to 10 carbon atoms. Furthermore, the present invention provides said organic electroluminescence device comprising a polycarbonate containing a repeating unit represented by the general formula (IV):

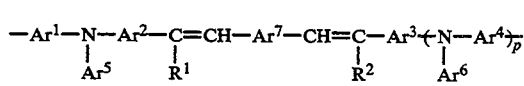

wherein $R^1$, $R^2$, P and Ar¹ to Ar⁶ are as defined above; Ar⁷ is each independently a substituted or unsubstituted arylene group having 6 to 20 carbon atoms wherein the substituent groups are an alkyl or alkoxy group having 1 to 10 carbon atoms; a dotted line means an acceptable single-bond linkage, and said organic electroluminescence device comprising a polycarbonate containing a repeating unit (γ) represented by the general formula (V): wherein Ar¹ to Ar⁷, R¹, R² and P are as defined above; a dotted line means an acceptable single-bond linkage and a repeating unit (β) represented by the general formula (III).

Furthermore, the present invention provides an organic electroluminescence device comprising as either or both of a emitting material and a hole injecting material a polycarbonate containing a repeating unit A represented by the general formula (IX):

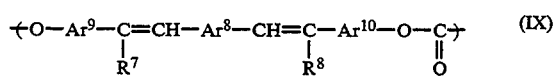

wherein Ar⁸ to Ar¹⁰ are each independently a substituted or unsubstituted arylene group having 6 to 20 carbon atoms represented by:

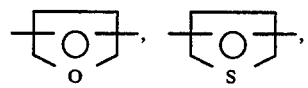

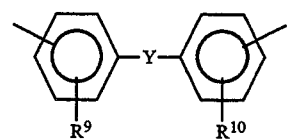

wherein $R^9$ and $R^{10}$ are each independently any of a hydrogen atom, a halogen atom, an alkyl group having 1 to 6 carbon atoms or an aryl group having 6 to 12 carbon atoms; Y is a single bond represented by:

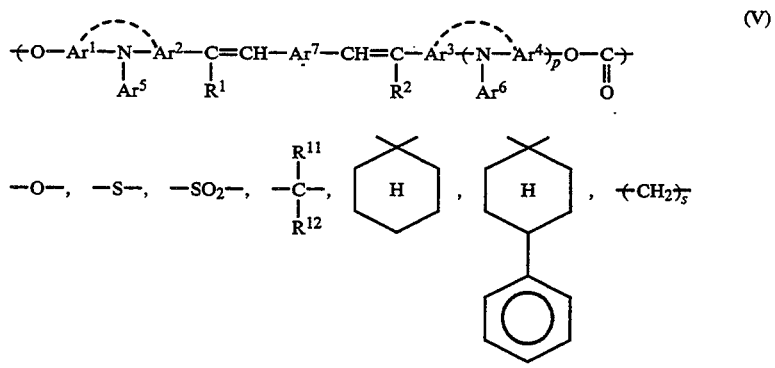

wherein $R^{11}$ and $R^{12}$ are each independently a hydrogen atom, a trifluoromethyl group, an alkyl group having 1 to 6 carbon atoms or an aryl group having 6 to 12 carbon atoms; and s is an integer of 2 to 10

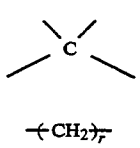

wherein r is an integer of 4 to 10, or

wherein s is as defined above and $R^7$ and $R^8$ are each independently an alkyl group having 1 to 6 carbon atoms or a substituted or unsubstituted aryl group having 6 to 20 carbon atoms, preferably a polycarbonate having a reduced viscosity of 0.2 dl/g as determined in a solution containing the concentration of 0.5 g/dl of the polycarbonate with a methylene chloride as the solvent at 20° C. Furthermore, the present invention provides an organic electroluminescence device comprising as either or both of a emitting material and a hole injecting material a polycarbonate copolymer containing a repeating unit A represented by the general formula (IX) and a repeating unit B represented by the general formula (X):

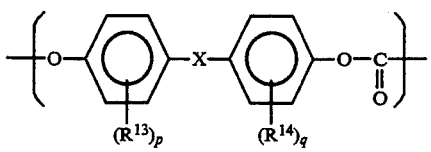

wherein $R^{13}$ and $R^{14}$ are each independently a hydrogen atom, a halogen atom, an alkyl group having 1 to 6 carbon atoms or an aryl group having 6 to 12 carbon atoms; p and q are each independently an integer of 1 to 4; and X is a single bond represented by:

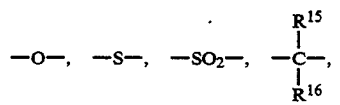

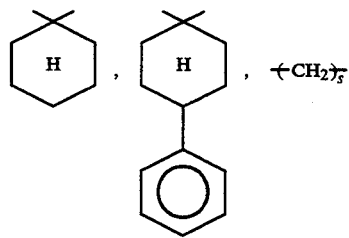

wherein $R^{15}$ and $R^{16}$ are each independently a hydrogen atom, a trifluoromethyl group, an alkyl group having 1 to 6 carbon atoms or an aryl group having 6 to 12 carbon atoms; and s is as defined above:

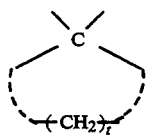

wherein t is an integer of 4 to 10, or

wherein u is an integer of 2 to 10, preferably a polycarbonate copolymer having a reduced viscosity of 0.2 dl/g as determined in a solution containing the concentration of 0.5 g/dl of the polycarbonate with a methylene chloride as the solvent at 20° C.

BEST MODE FOR CARRYING OUT THE INVENTION

Figure 1:
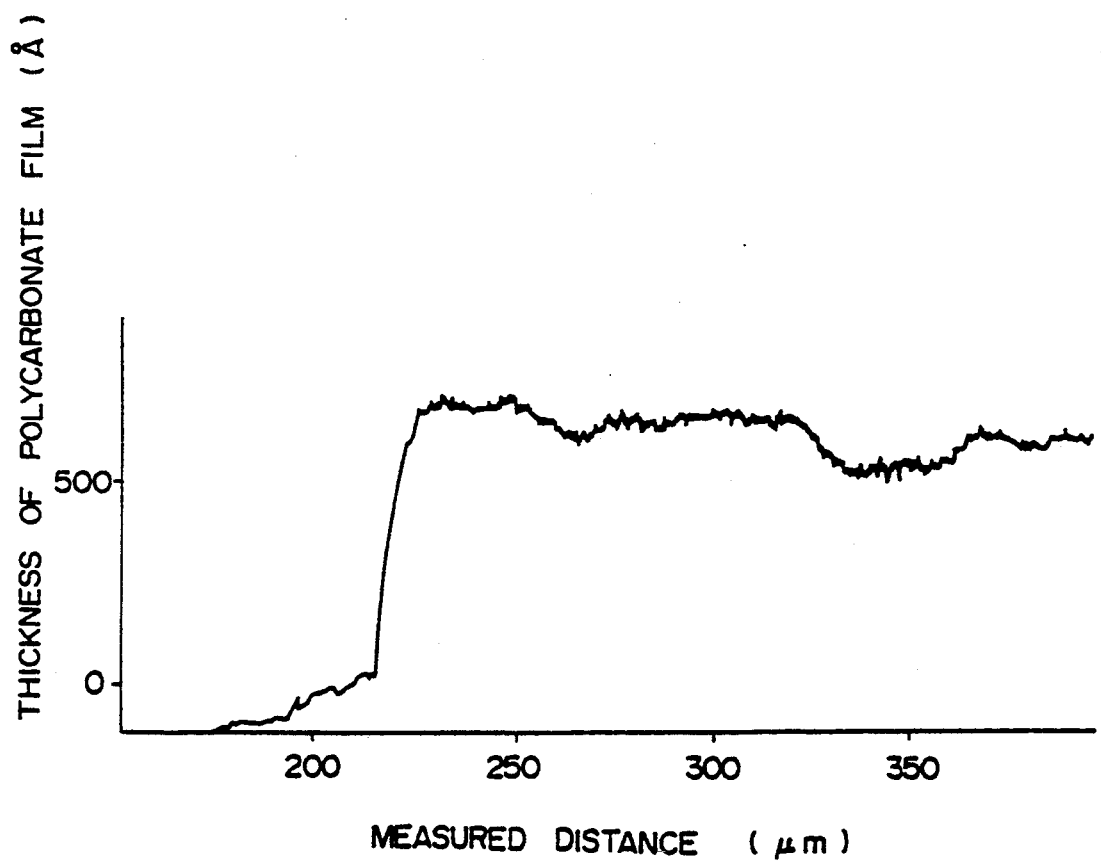
FIG. 1 is a graph showing the results in the measurement of the thickness of a thin film obtained in Example 1.

In the present invention, a polycarbonate containing a styrylamine skeleton or a diarylvinylene arylene skeleton having an electroluminescence function is used as either or both of a emitting material or a hole injecting material.

The electroluminescence (EL) function includes the injection function, the transporting function and the function of luminescence. For example, a emitting layer is made of a thin film which is formed from a compound by a known process such as spin coating method, cast method or LB method. This layer shows an electroluminescent effect, due to (1) the injection function wherein holes can be injected from an anode or a hole injecting or transporting layer and at the same time electrons can be injected from a cathode or an electron injecting or transporting layer when an electric field is applied, (2) the transporting function wherein the injected carriers (an electron and a hole) are transported under the electric field and (3) the function of luminescence wherein a site for the electron to combine with the hole each other to emit luminescence is provided in the emitting layer.

In the present invention, the styrylamine skeleton represented by the general formula (I) is enumerated as the site having the above electroluminescence function. A polycarbonate having a styrylamine skeleton (1) to be used in the present invention is defined as a polymer formed by connecting the specific styrylamine skeletons with a divalent group containing a conjugated system-breaking group represented by:

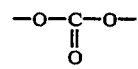

Thus the conjugation of the styrylamine skeletons is inhibited from extending, and an organic EL device comprising the polycarbonate is capable of emitting EL in color range from blue to green.

Furthermore, the polycarbonate having the specific styrylamine skeletons to be used in the present invention is excellent in the electroluminescence function and further excellent in the thin film properties.

Various styrylamine skeletons can be used in the present invention, and an preferred example is a monovalent or divalent group which is formed by removing hydrogen atoms from a compound containing one aromatic tertiary amine in which at least one aromatic ring of the aromatic tertiary amine is substituted by at least one arylvinylene group or an arylvinylene arylene vinylene group each having 8 to 22 carbon atoms.

The above aromatic tertiary amine is a compound containing a trivalent nitrogen atom wherein at least one of 3 carbon atoms substituted with the nitrogen atom forms a part of a aromatic ring having 4 to 20 carbon atoms.

Furthermore, the arylvinylene group is a monovalent group wherein a group (vinylene group) containing a carbon-carbon double bond represented by the general formula:

wherein $R^1$ and $R^2$ are as defined above is connected with an aryl group having 6 to 20 carbon atoms. Besides, the arylvinylene arylene vinylene group is a monovalent group formed by connecting said vinylene group, an aryl group having 6 to 20 carbon atoms and an arylene group having 6 to 20 carbon atoms in the order of the aryl group, the vinylene group, the arylene group and the vinylene group.

Another preferred example is a divalent group which is formed by removing hydrogen atoms from a compound containing two or three of said aromatic tertiary amine wherein these 2 or 3 aromatic tertiary amines are connected each other with said vinylene group or a vinylenearylene vinylene group having 10 to 22 carbon atoms.

Preferred among said styrylamine skeletons are those which connect the divalent group comprising the aromatic tertiary amine with the arylenevinylene group one after another or those which connect the divalent group comprising the aromatic tertiary amine, the vinylene group and the divalent group comprising the aromatic tertiary amine one after another. More preferred styrylamine skeletons are those represented by said general formulae (I) and (IV).

The polycarbonate (1) of the present invention can have various structures. Preferred among them are those having the repeating unit ($\alpha$) represented by the general formula (II) and the repeating unit ($\beta$) represented by the general formula (III)(polycarbonate A) and those having the repeating unit ($\gamma$) represented by the general formula (V) and the repeating unit ($\beta$) represented by the general formula (III)(polycarbonate B). More preferred are the polycarbonates A and B each having a weight average molecular weight of 4,000 or more.

In the general formulae (I), (II), (IV) and (V), $Ar^1$ to $Ar^4$ and $Ar^7$ are each independently a substituted or unsubstituted arylene group having 6 to 20 carbon atoms (for example, phenylene group, biphenylene group, naphthylene group, terphenylene group, anthranilene group and the like). As the substituent group, for example an alkyl group such as methyl group, ethyl group, isopropyl group and t-butyl group and an alkoxy group such as methoxy group, ethoxy group, propoxy group and butoxy group are enumerated. $Ar^5$ and $Ar^6$ are each independently a substituted or unsubstituted aryl group having 6 to 20 carbon atoms (for example, phenyl group, biphenyl group, naphthyl group, terphenyl group and the like). As the substituent group, for example an alkyl group such as methyl group, ethyl group, isopropyl group and t-butyl group and an alkoxy group such as methoxy group, ethoxy group, propoxy group and butoxy group are enumerated.

Furthermore, $R^1$ and $R^2$ are each independently a hydrogen atom, an alkyl group having 1 to 6 carbon atoms, a substituted or unsubstituted aryl group having 6 to 20 carbon atoms (for example, phenyl group, biphenyl group, naphthyl group and the like). As the substituent group, for example an alkyl group such as methyl group, ethyl group, isopropyl group and t-butyl group and an alkoxy group such as methoxy group, ethoxy group, propoxy group and butoxy group are enumerated.

Meanwhile, the polycarbonate (1) to be used in the present invention includes a polycarbonate having a styrylamine skeleton as a side chain, besides the polycarbonates A and B.

The manufacturing method of this polycarbonates (1) is not particularly limited and it can be manufactured according to various methods applying known processes mutatis mutandis. Preferably the polycarbonate (1) is manufactured by reacting a bisphenol material having a styrylamine skeleton represented by the general formula (VI):

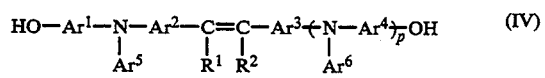

wherein $Ar^1$ to $Ar^6$, $R^1$, $R^2$ and P are as defined above or this bisphenol material and a dihydroxy compound represented by the general formula (VII):

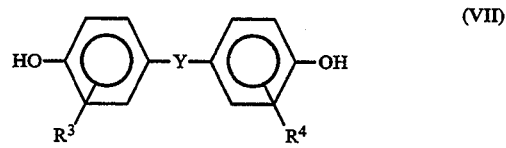

wherein $R^3$, $R^4$ and Y are as defined above with a carbonate-forming compound.

Specific examples of the bisphenol material having the styrylamine skeleton include:

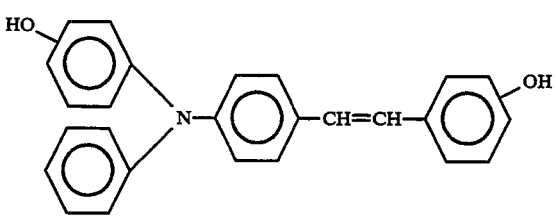

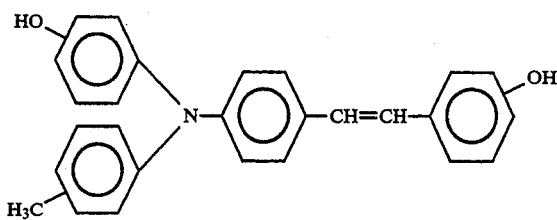
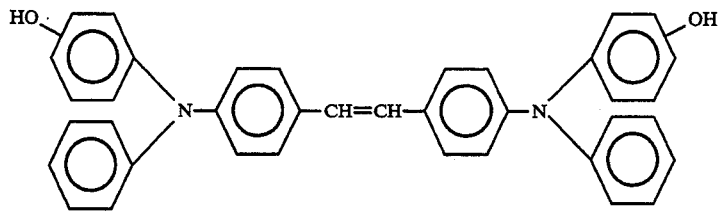
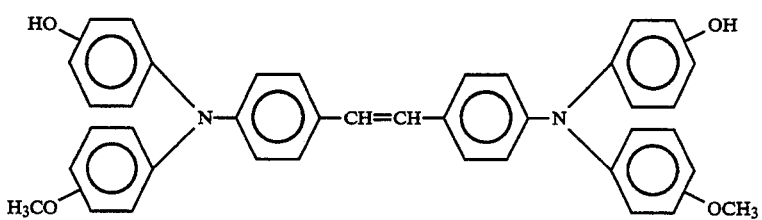
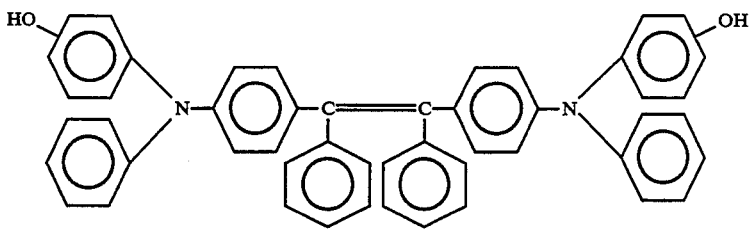
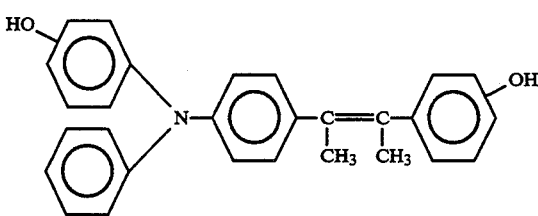
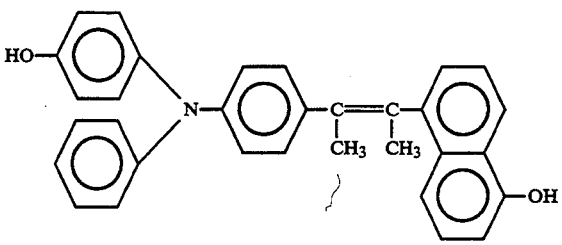
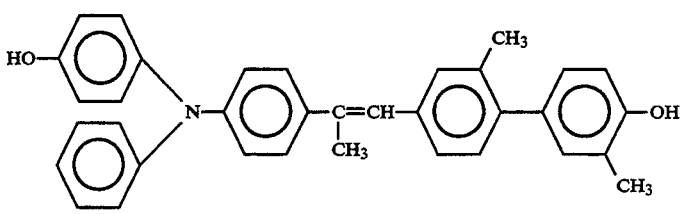

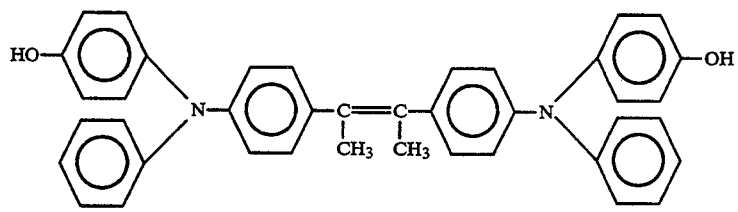
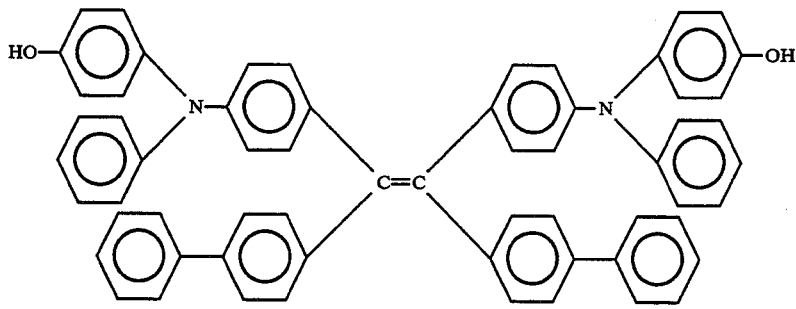
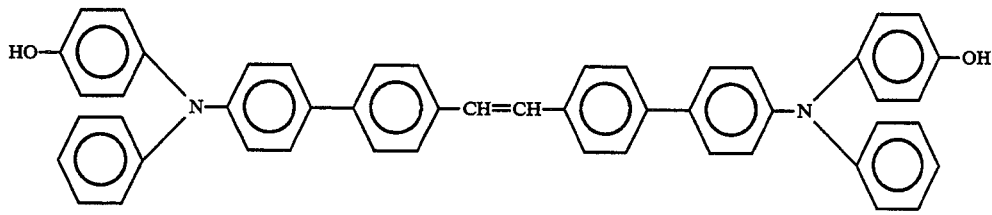
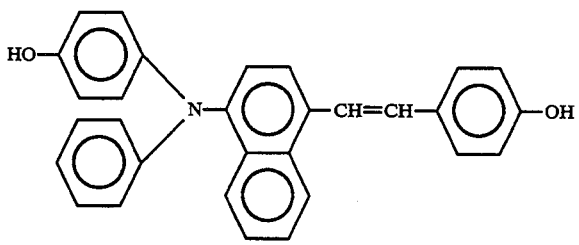
Examples of the dihydoxy compound are:
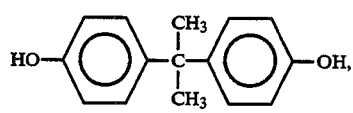
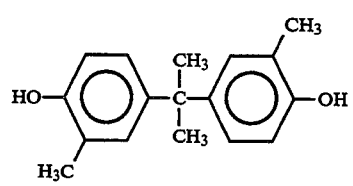
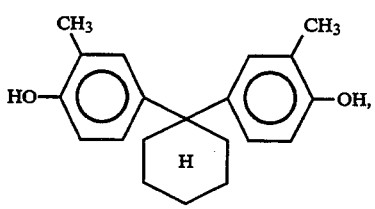
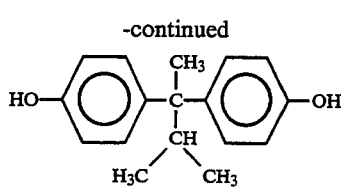
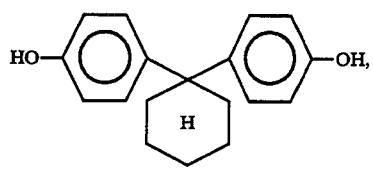
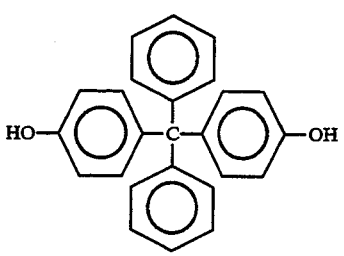

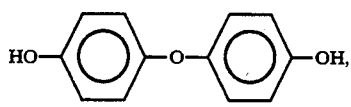

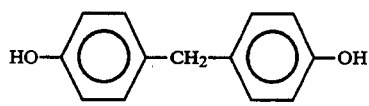

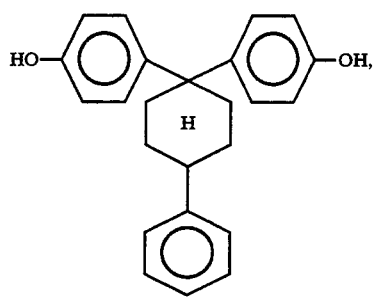

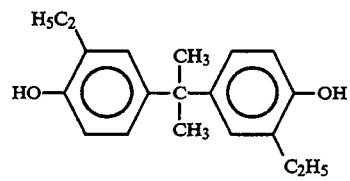

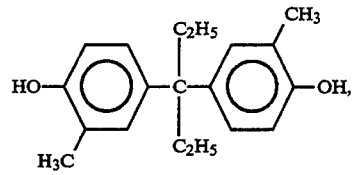

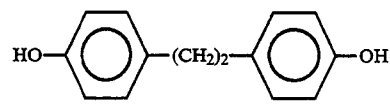

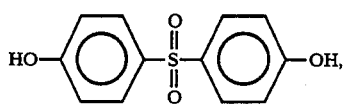

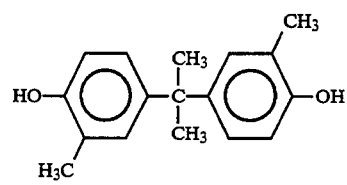

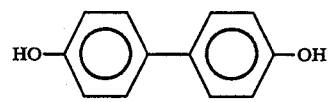

Likewise, the polycarbonate (1) can also be manufactured by reacting a bisphenol material having a styrylamine skeleton represented by the general formula (VIII):

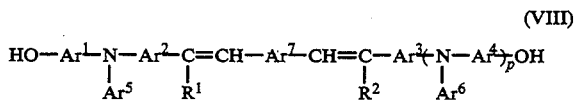
(VIII)

wherein $Ar^1$ to $Ar^6$, $R^1$, $R^2$ and P are as defined above or this bisphenol material and a dihydroxy compound represented by the general formula (VII) with a carbonate-forming compound. Specific examples of the bisphenol material having this styrylamine skeleton include:

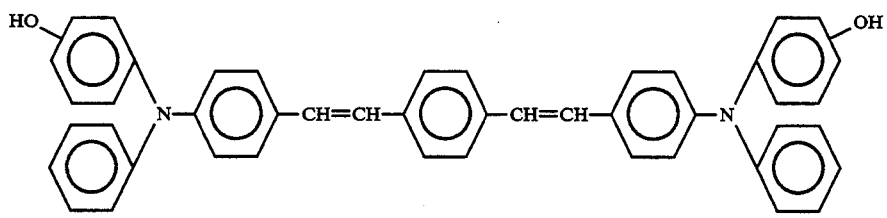

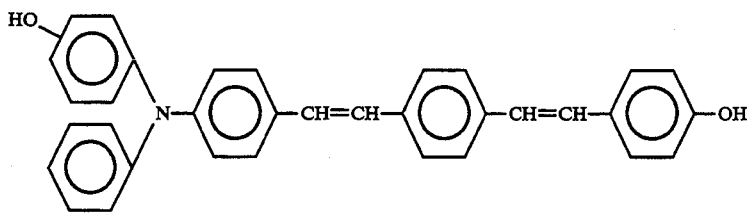

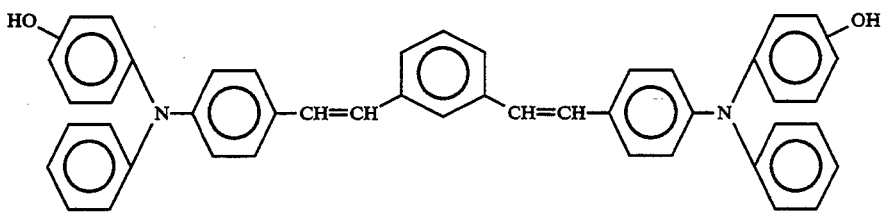

-continued
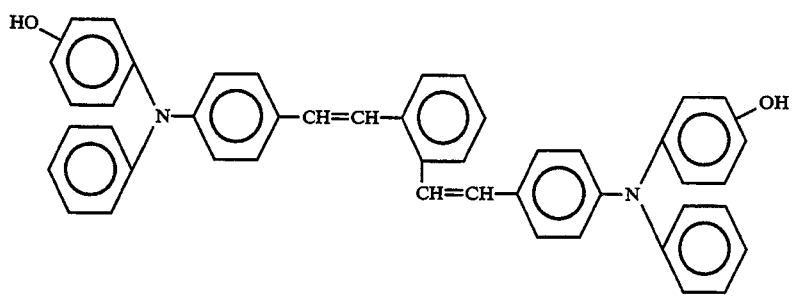
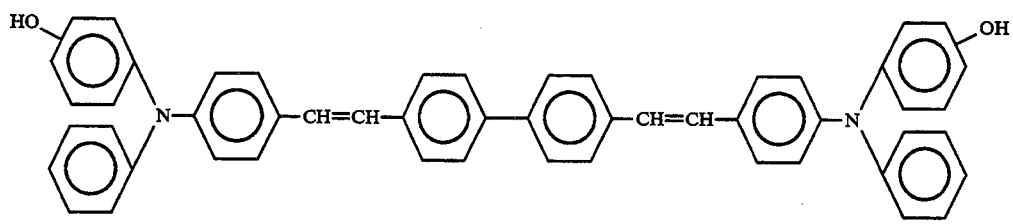
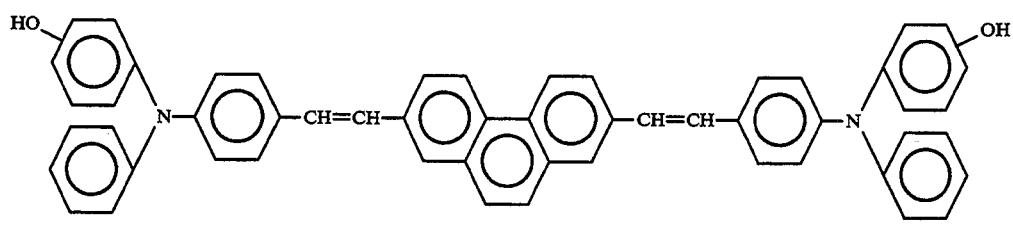
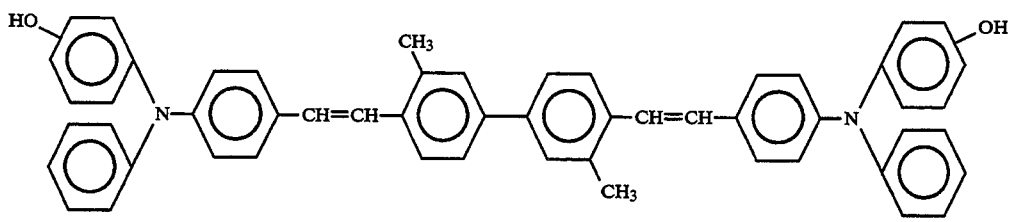
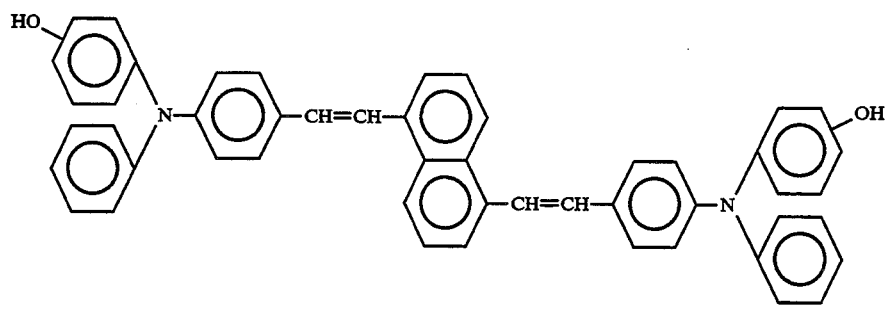
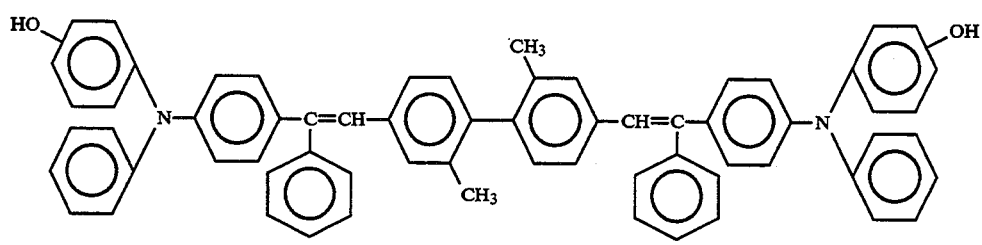

-continued

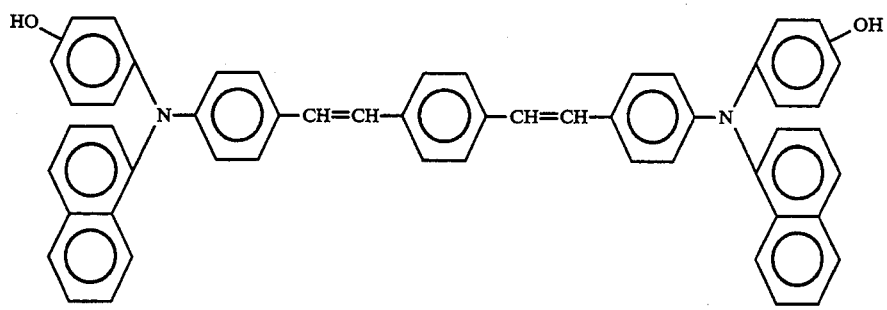

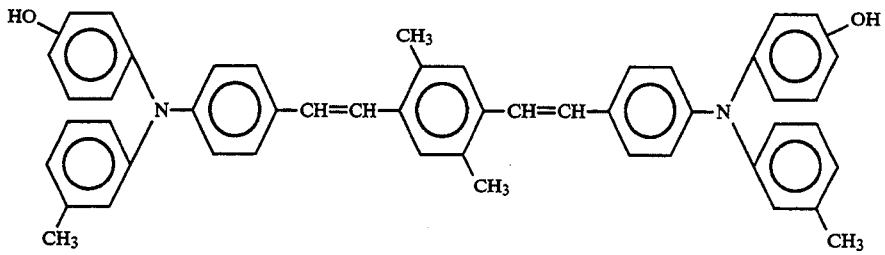

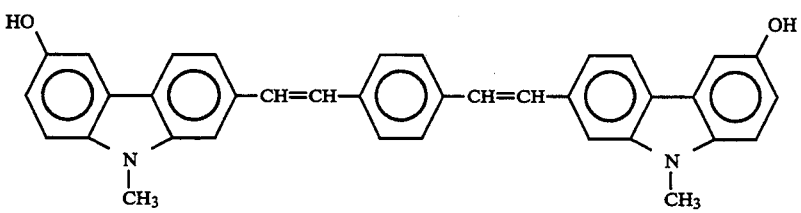

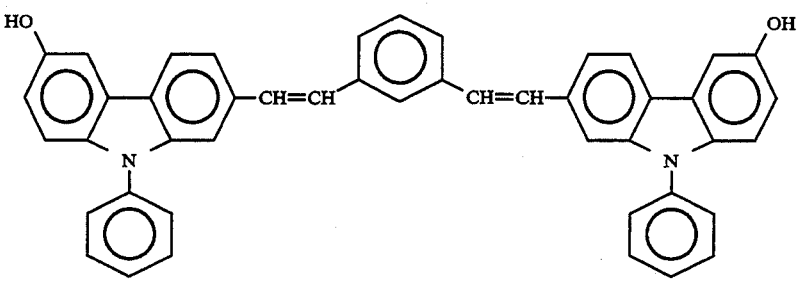

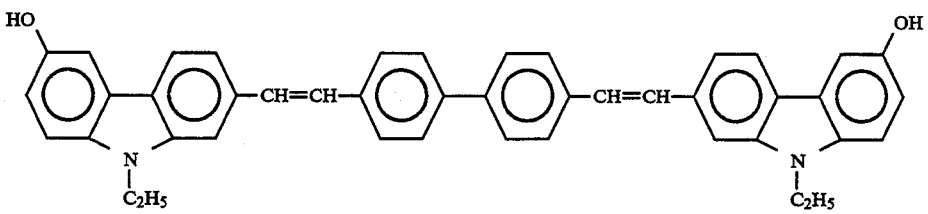

Various carbonate-forming compounds can be used in this process as far as they are those commonly used to manufacture polycarbonates. Examples of such carbonate-forming compound include an halogenated carbonyl such as phosgene, haloformates such as chloroformate compound, a carbonate compound and the like. Phosgene is particularly preferable among them.

The polycarbonate to be used in the present invention can be manufactured by reacting one member or two members or more of said bisphenol materials with at least one member of said carbonate-forming compounds, or by reacting one member or two members or more of said dihydroxy compounds and one member or two members or more of said bisphenol materials with at least one member of said carbonate-forming compounds. The ratio (molar ratio) between the repeating units ($\alpha$) and ($\beta$) or that of ($\gamma$) and ($\beta$) can be adjusted as desired by choosing a proper ratio of the amount of bisphenol materials to the amount of the hydroxy compounds. The polycarbonates (1) should contain the repeating units ($\alpha$) or ($\gamma$) as the essential component but the repeating unit ($\beta$) as the optional component and the incorporation of the repeating unit ($\beta$) into the polycarbonate (1) may as well be brought down to nothing. The reaction conditions are not particularly limited and, for example when a dihalogenated carbonyl such as phosgene or a haloformate such as chloroformate is used as a carbonate-forming compound, the reaction can be carried out in an appropriate solvent in the presence of an acid acceptor (for example, water-soluble alkali metal compound such as alkali metal hydroxide and alkali metal carbonate or organic base or the like). Various alkali metal hydroxides or alkali metal carbonates can be used herein, but ordinarily an aqueous sodium hydroxide solution, an aqueous potassium hydroxide solution or a aqueous sodium carbonate solution are suitably used for the pecuniary reasons.

The carbonate-forming compounds are used at a ratio which should appropriately be chosen in consideration for its stoichiometric ratio. A gaseous carbonate-forming compound such as phosgene can be suitably blown into the reaction system. Likewise, the acid acceptors are used at a ratio which should appropriately be chosen in consideration for its stoichiometric ratio. Specifically, 2 equivalents of an acid acceptor based on the total number of moles of the bisphenol materials and dihydroxy compounds or somewhat greater amount than that are preferably used.

Various solvents can be used singly or as a mixed solvent herein, as far as they are those commonly used to manufacture polycarbonates according to known methods. Preferred representative examples of the solvent include a hydrocarbon halide such as methylene chloride, a tetrahydrofuran (THF) and the like.

Furthermore, when this reaction is carried out, a molecular weight modifier (monophenol and the like), crosslinking agent (terphenol and the like) or a reaction accelerator (alkylamine and the like) may be added as desired to adjust the molecular weight, the molecular weight distribution or the reaction rate.

The reaction temperature ordinarily is 0° to 150° C., preferably 0° to 40° C. The reaction can be carried out under any of reduced pressure, ordinary pressure or pressurizing but preferably at ordinary pressure or at a reaction system's own pressure. The reaction time ordinarily is 0.5 minute to 10 hours, preferably 1 minute to 2 hours. The reaction can be carried out according to any one of the continuous process, the semi-continuous method or the batch method.

The so obtained polycarbonates (1) comprise the styrylamine skeletons which are combined one another with a divalent group capable of breaking the conjugated system and as the result the EL at the longer wavelength region is inhibited to provide the luminescence in the color range from blue to green in sufficiently high brightness. If the blue EL is provided, the luminescence in various colors such as red, orange, green, yellow, white or the like can also be provided by the known methods, for example a dope method by the use of a fluorescent dye as a dopant into an emitting layer, a method for changing the color of EL by the use of a fluorescent film or the like. Moreover, the polycarbonates (1) have an advantage that they can be synthesized or easily purified, as compared with polyethers, polyesters, polyacrylates, polymethacrylates or conjugated polymers. The polycarbonates (1) in the form of a solution are amenable to known film coating methods such as spin coating method, dip coating method, cast method or LB method, capable of forming an ultra thin film at a thickness range from 10 to 200 nm. This ultra thin film is free from pinholes and involves no risks of electrical shortcircuits. Furthermore, the polycarbonates (1) are easily soluble in said solvents, and even a solution containing 0.01 to 10% by weight of a polycarbonate (1) can be prepared as the preferred material for film making.

Preferably, the polycarbonate (1) films are prepared by the known spin coating method. It is a very easy film making method, capable of providing uniform, pinholelss thin films. The film making solutions are prepared preferably with the low boiling point solvents such as benzene, toluene, dichloromethane, chloroform, tetrahydrofuran (THF) or the like. Those solutions contain the polycarbonates (1) preferably at a concentration of 0.5 to 3% by weight. The spin coaters are operated preferably at 2000 to 10000 rpm. or 5000 to 7000 rpm. if a film at a thickness of 200 nm or less is preferred. The foreign materials in a solution may often be blamed for pinholes after the film is completed and preferably they should be removed by means of a filter ahead of time.

The diarylvinylene arylene skeleton represented by the general formula (IX) is also enumerated as the site having the EL function in the present invention. The polycarbonate (2) to be used in the present invention is defined as a polymer formed by connecting the specific diarylvinylene arylene skeletons with a divalent group containing a conjugated system-breaking group represented by:

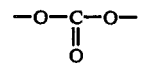

Thus, the polycarbonate having the specific diarylvinylene arylene skeleton to be used in the present invention has an excellent EL function and further is excellent in the thin film properties, and an EL device comprising the molecule is capable of emitting EL in blue in sufficiently high brightness. If the blue EL is provided, the EL in various colors such as red, orange, green, yellow, white or the like can also be provided by the known methods, for example a dope method by the use of a fluorescent dye as a dopant into an emitting layer, a method for changing the color of EL by the use of a fluorescent film or the like.

Said specific diarylvinylene arylene skeleton is included in the repeating unit A represented by the general formula (IX).

The polycarbonate (2) having various structures can be used in the present invention. Preferred among them are those which comprise only the repeating unit A or those which comprise the repeating units A and the repeating unit B represented by the general formula (X).

In said general formula (IX), $Ar^8$ to $Ar^{10}$ are each independently a substituted or unsubstituted arylene group having 6 to 20 carbon atoms (for example, a phenylene group, a biphenylene group, a naphthylene group, a terphenylene group and the like). Examples of the substituent group are an alkyl group such as methyl group, ethyl group, isopropyl group and t-butyl group, an alkoxy group such as methoxy group, ethoxy group, propoxy group and butoxy group and a cyano group. Furthermore, $R^7$ and $R^8$ are each independently an alkyl group having 1 to 6 carbon atoms or a substituted or unsubstituted aryl group having 6 to 20 carbon atoms (for example, a phenyl group, a biphenyl group, a naphthyl group and the like). Examples of the substituent group are an alkyl group such as methyl group, ethyl group, isopropyl group and t-butyl group, an alkoxy group such as methoxy group, ethoxy group, propoxy group and butoxy group and a cyano group. $R^9$ and $R^{10}$ are each independently a hydrogen atom, a halogen atom (I, Cl, Br, F and the like), an alkyl group having 1 to 6 carbon atoms and a substituted or unsubstituted aryl group having 6 to 20 carbon atoms (for example, a phenyl group, a biphenyl group, a naphthyl group and the like). Examples of the substituent group are an alkyl group such as methyl group, ethyl group, isopropyl group and t-butyl group and an alkoxy group such as methoxy group, ethoxy group, propoxy group and butoxy group. $R^{11}$ and $R^{12}$ are each independently a hydrogen atom, a trifluoromethyl group, an alkyl group having 1 to 6 carbon atoms and a substituted or unsubstituted aryl group having 6 to 12 carbon atoms (for example, a phenyl group, a biphenyl group and the like). Examples of the substituent group are an alkyl group such as methyl group, ethyl group, isopropyl group and t-butyl group and an alkoxy group such as methoxy group, ethoxy group, propoxy group and butoxy group.

Furthermore, r is an integer of 4 to 10, preferably 5 to 7. s is an integer of 2 to 10, preferably 2 to 6.

In said general formula (X), $R^{13}$ and $R^{14}$ are each independently a hydrogen atom, a halogen atom (I, Cl, Br, F and the like), an alkyl group having 1 to 6 carbon atoms and a substituted or unsubstituted aryl group having 6 to 12 carbon atoms (for example, a phenyl group, a biphenyl group and the like). Example of the substituent group are an alkyl group such as methyl group, ethyl group, isopropyl group and t-butyl group and an alkoxy group such as methoxy group, ethoxy group, propoxy group and butoxy group. $R^{15}$ and $R^{16}$ are each independently a hydrogen atom, a trifluoromethyl group, an alkyl group having 1 to 6 carbon atoms and a substituted or unsubstituted aryl group having 6 to 12 carbon atoms (for example, a phenyl group, a biphenyl group and the like). Examples of the substituent group are an alkyl group such as methyl group, ethyl group, isopropyl group and t-butyl group and an alkoxy group such as methoxy group, ethoxy group, propoxy group and butoxy group.

Furthermore, t is an integer of 4 to 10, preferably 5 to 7. u is an integer of 2 to 10, preferably 2 to 6.

This repeating unit A is made of a dihydroxy compound represented by the following general formula (XI):

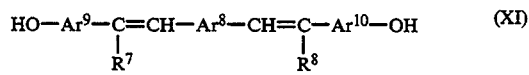

(XI)

wherein $Ar^8$ to $Ar^{10}$, $R^7$ and $R^8$ are as defined above. Various dihydroxy compounds can be used in the present invention and their specific examples are:

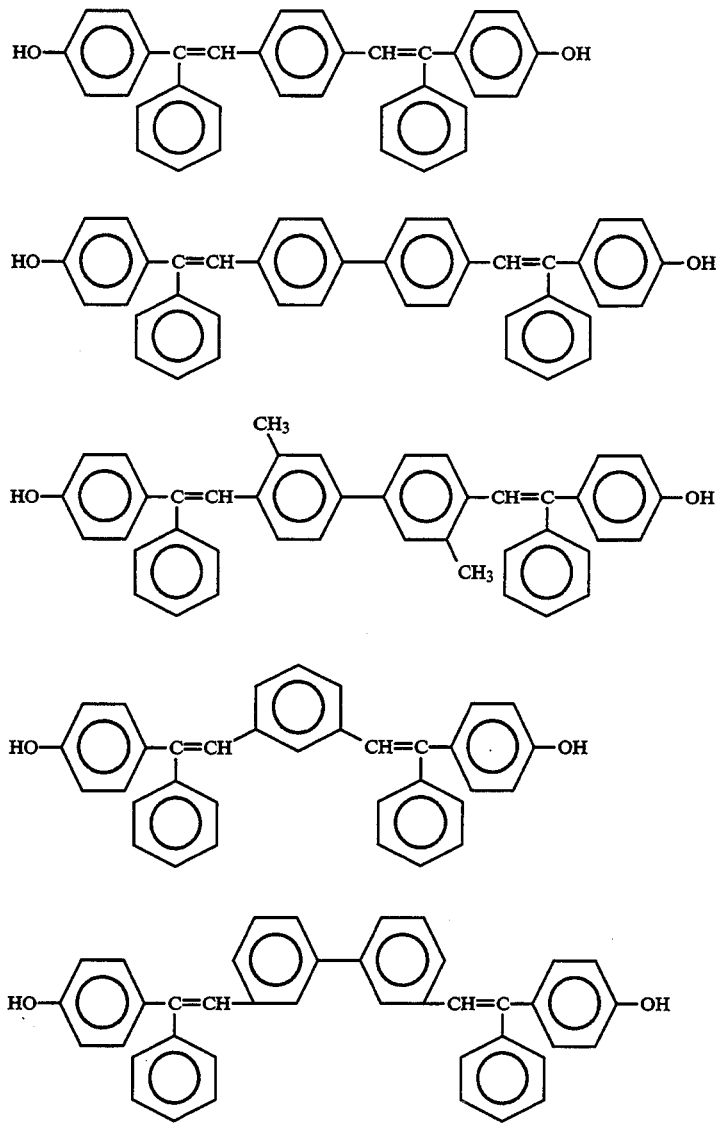

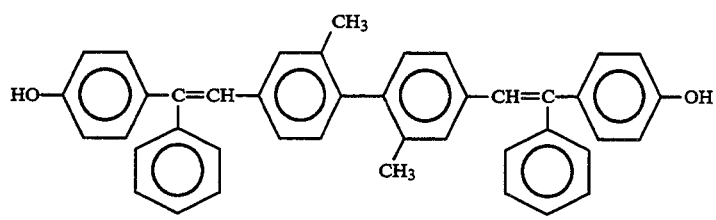
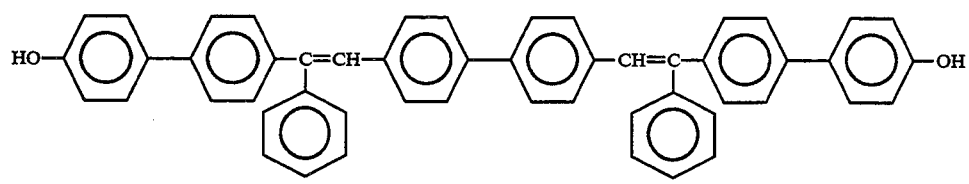
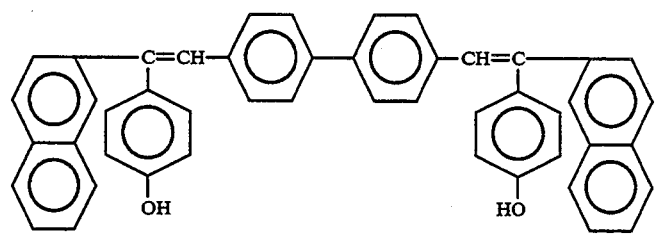
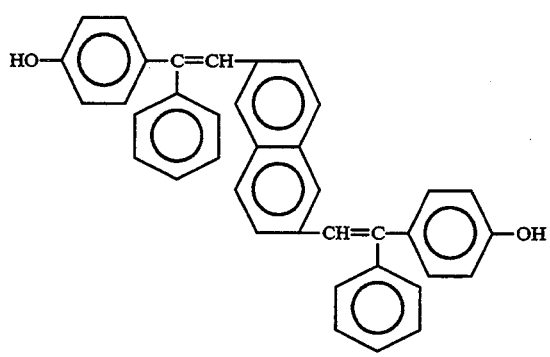
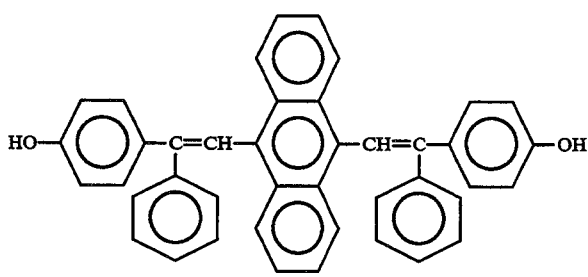
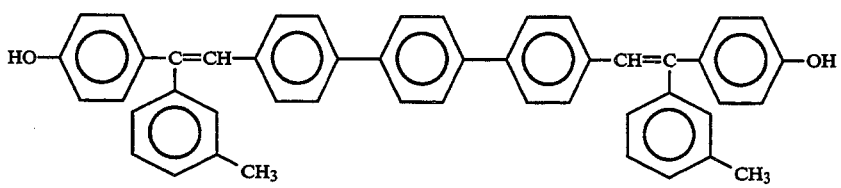

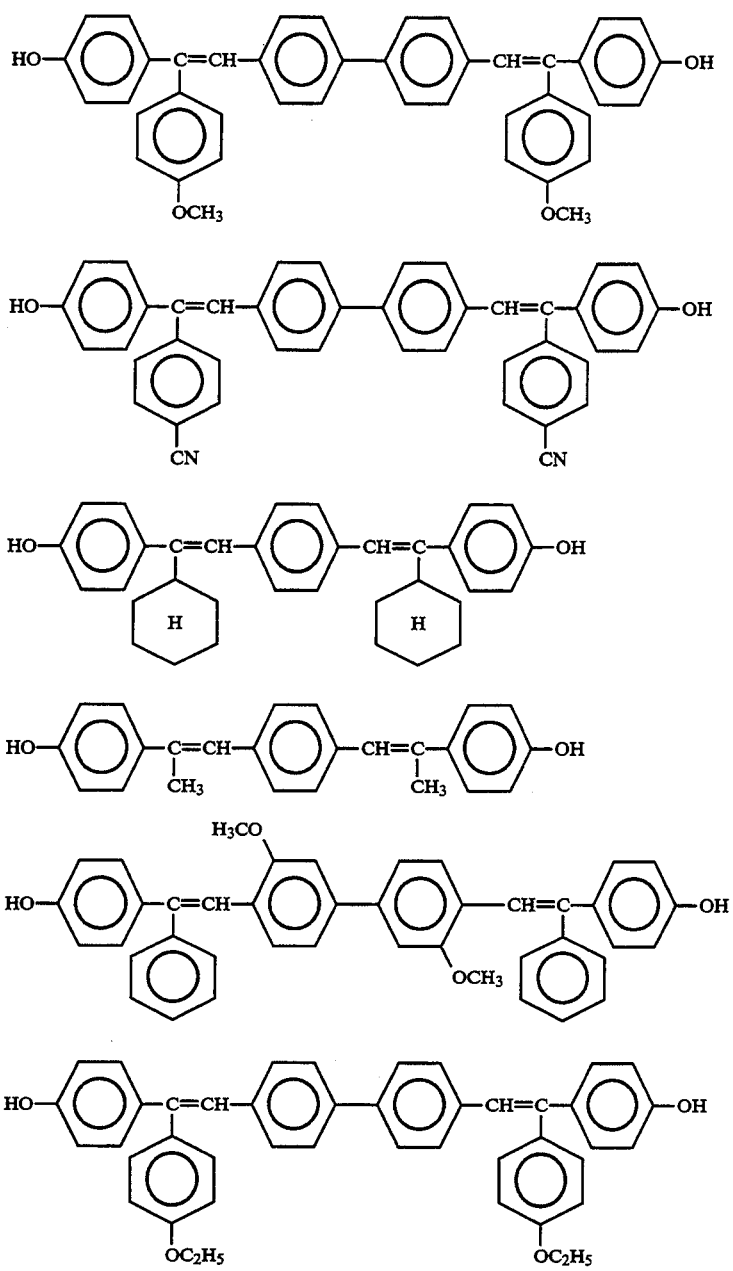

Moreover, the repeating unit B is made of a dihydroxy compound represented by the following general formula (XII):

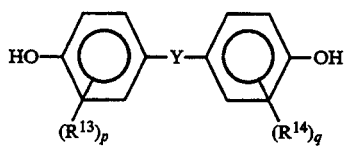

wherein $R^{13}$, $R^{14}$, p and q are as defined above. A variety of this dihydroxy compound can be used in the present invention and their specific examples are: bis (4-hydroxyphenyl) methane; 1, 1-bis (4-hydroxyphenyl) ethane; 1, 2-bis (4-hydroxyphenyl) ethane; 2, 2-bis (4-hydroxyphenyl) propane; 2, 2-bis (3-methyl-4-hydroxyphenyl) butane; 2, 2-bis (4-hydroxyphenyl) butane; 2, 2-bis (4-hydroxyphenyl) octane; 4, 4-bis(4-hydroxyphenyl) heptane; 4, 4'-dihydroxytetraphenylmethane; 1-phenyl-1, 1-bis (4-hydroxyphenyl) ethane; 1, 1-bis(4-hydroxyphenyl)-1-phenylmethane; bis (4-hydroxyphenyl) ether; bis (4-hydroxyphenyl) sulfide; bis (4-hydroxyphenyl) sulfone; 1,1-bis (4-hydroxyphenyl) cyclopentane; 1, 1-bis (4-hydroxyphenyl) cyclohexane; 2, 2-bis (3-methyl-4-hydroxyphenyl) propane; 2-(3-methyl-4-hydroxyphenyl)-2-(4-hydroxyphenyl)-1-phenylethane; bis (3-methyl-4-hydroxyphenyl) sulfide; bis (3-methyl-4-hydroxyphenyl)-sulfone; bis (3-methyl-4-hydroxyphenyl) methane; 1, 1-bis (3-methyl-4-hydroxyphenyl) cyclohexane; 4, 4'-dihydroxyphenyl; 2, 2-bis (2-methyl-4-hydroxyphenyl) propane; 1, 1-bis (2-butyl-4-hydroxy-5-methylphenyl) butane; 1, 1-bis(2-tert-butyl-4-hydroxy-3-methylphenyl) ethane; 1, 1-bis (2-tert-butyl-4-hydroxy-5-methylphenyl) propane; 1, 1-bis (2-tert-butyl-4-hydroxy-5-methylphenyl) butane; 1, 1-bis (2- tert-butyl-4-hydroxy-5-methylphenyl) isobutane; 1, 1-bis (2-tert-butyl-4-hydroxy-5-methylphenyl) heptane; 1, 1-bis (2-tert-butyl-4-hydroxy-5-methylphenyl)-1-phenylmethane; 1, 1-bis (2-tert-amyl-4-hydroxy-5-methylphenyl) butane; bis (3-chloro-4-hydroxyphenyl) methane; bis (3, 5-dibromo-4-hydroxyphenyl) methane; 2, 2-bis (3-chloro-4-hydroxyphenyl) propane; 2, 2-bis (3-fluoro-4-hydroxyphenyl) propane; 2, 2-bis (3-bromo-4-hydroxyphenyl) propane; 2, 2-bis (3, 5-difluoro-4-hydroxyphenyl) propane; 2, 2-bis (3, 5-dichloro-4-hydroxyphenyl) propane; 2, 2-bis (3, 5-dibromo-4-hydroxyphenyl) propane; 2, 2-bis (3-bromo-4-hydroxy-5-chlorophenyl) propane; 2, 2-bis (3, 5-dichloro-4-hydroxyphenyl) butane; 2, 2-bis (3, 5-dibromo-4-hydroxyphenyl) butane; 1-phenyl-1, 1-bis (3-fluoro-4-hydroxyphenyl) ethane; bis (3-fluoro-4-hydroxyphenyl) ether; 4, 4'-dihydroxybiphenyl; 3, 3'-difluoro-4, 4'-dihydroxybiphenyl; 1, 1-bis (3-cyclohexyl-4-hydroxyphenyl) cyclohexane; 2, 2-bis (4-hydroxyphenyl) hexafluoropropane; 2, 2-bis (3-phenyl-4-hydroxyphenyl) propane; 1, 1-bis (3-phenyl-4-hydroxyphenyl) cyclohexane; bis (3-phenyl-4-hydroxyphenyl) sulfone; 1, 1-bis (4-hydroxyphenyl)- 1, 1-diphenylmethane. Preferred among them are 2, 2-bis(4-hydroxyphenyl) propane; 4, 4'-dihydroxytetraphenylmethane; 1-phenyl-1, 1-bis (4-hydroxyphenyl) ethane; bis (4-hydroxyphenyl) sulfone; 1, 1-bis (4-hydroxyphenyl) cyclohexane; 2, 2-bis (3-methyl-4-hydroxyphenyl) propane; 4, 4'-dihydroxybiphenyl; and 2, 2-bis (3-phenyl-4-hydroxyphenyl) propane.

The so obtained polycarbonate (2) has a reduced viscosity ($\eta$ sp/c) of 0.2 dl/g or more (solvent: methylene chloride, concentration: 0.5 g/dl, 20° C.), preferably 0.2 to 2.5 dl/g. If it is less than 0.2, the mechanical strength is insufficiently low.

The polycarbonates (2) to be used in the present invention are not particularly limited relative to their manufacturing method and can be manufactured according to various methods developed by applying known processes mutatis mutandis. A preferred method is to react a dihydroxy compound having the diarylvinylene arylene skeletons represented by said general formula (XI) or this dihydroxy compound and a dihydroxy compound represented by said general formula (XII) with a carbonate-forming compound.

In this manufacturing method, various carbonate-forming compounds can be used as far as they are those commonly used to manufacture ordinary types of polycarbonates. Their examples are a dihalogenated carbonyl such as phosgene, haloformates such as chloroformate compound, a carbonate compound and the like. Preferred among them is the phosgene.

The polycarbonate (2) to be used in the present invention can be manufactured by reacting, for example one member or two members or more of the dihydroxy compounds represented by said general formula (XI) with at least one member of said carbonate-forming compounds or reacting one member or two members or more of the dihydroxy compounds represented by said general formula (XI) and one member or two members or more of the dihydroxy compound represented by said general formula (XII) with at least one member of said carbonate-forming compounds. As used herein, the ratio (molar ratio) between the repeating units A and B can be adjusted as desired by choosing a proper ratio of the amount of the dihydroxy compound represented by the general formula (XI) to the amount of the dihydroxy compound represented by the general formula (XII). The polycarbonate (2) to be used in the present invention contains the repeating unit A having the diarylvinylene arylene skeleton as the essential component, ordinarily at a content of 1 to 100 mole %, preferably 10 to 80 mole %.

The reaction conditions are not particularly limited. For example, when a dihalogenated carbonyl such as phosgene or a haloformate such as chloroformate is used as the carbonate-forming compound, the reaction can be carried out in an appropriate solvent in the presence of an acid acceptor (for example, a water-soluble alkali metal compound such as alkali metal hydroxide and alkali metal carbonate, an organic base and the like). Various alkali metal hydroxides or alkali metal carbonates can be used herein but ordinarily an aqueous sodium hydroxide solution, an aqueous potassium hydroxide solution, an aqueous sodium carbonate solution, an aqueous potassium carbonate solution and the like are suitably used for the pecuniary reasons.

Furthermore, said carbonate-forming compounds are used at a ratio optionally chosen in consideration for the stoichiometric ratio of the reaction. When a gaseous carbonate-forming compound such as phosgene is used, it can be suitably blown into the reaction system. Likewise, said acid acceptor is used at a ratio optionally chosen in consideration for the stoichiometric ratio of the reaction. Specifically, two equivalents of said acid acceptor based on the total number of moles of the dihydroxy compounds represented by the general formulae (XI) and (XII) or a somewhat greater amount than that are preferably used.

Furthermore, various solvents as commonly used to make known polycarbonates can be used singly or in the form of a mixed solvent. Their preferred representative examples are a hydrocarbon halide such as methylene chloride, a tetrahydrofuran (THF) and the like.

To this reaction system, a molecular weight modifier (monophenol and the like), crosslinking agent(terphenol and the like) or a reaction accelerator (alkylamine and the like) can be added to adjust the molecular weight, the molecular weight distribution or the rate of reaction.

The reaction temperatures are ordinarily 0° to 150° C., preferably 0° to 40° C. The reaction can be carried out under any of reduced pressure, atmospheric pressure or pressurizing but ordinarily at atmospheric pressure or the reaction system's own pressure or the other one close to it. The reaction time is ordinarily 0.5 minutes to 10 hours, preferably 1 minute to 2 hours. The reaction can be carried out according to any of the continuous process, the semi-continuous process or the batch method.

The polycarbonates (1) or (2) as described above are a polymer combining the styrylamine or diarylvinylene arylene skeleton each having the EL function with the dihydroxy compound. The thin films made from these polycarbonates are excellent in the EL function and further have much improved film properties and thermostability, unsusceptible to the breakage on account of the crystallization and the like and hardly liable to change with the elapse of time. Furthermore, practically no foreign substances are incorporated into these polycarbonates during the polymerization processes and they are easy to purity, as compared with other polymers, for example polyether, polyester, polyacrylate, polymethacrylate or conjugated polymer. The polycarbonates of the present invention are very suitable for the fields of use wherein organic substances of a high purity are required.

The polycarbonates having such an ability to retain a thin film can be used as either or both of the emitting layer and hole injection layer in the organic EL devices. In the organic EL devices, when a polycarbonate is used as the hole injection layer, the polycarbonate layer does not provide the electroluminescence. On the other hand, when it is used as the emitting layer, the electroluminescence is obtained from the polycarbonate layer. This is explained, as follows: an electron injecting layer is composed of a compound having the hole barrier properties which do not permit the passage of holes forwarded from the side of an anode. This electron injecting layer is situated between a polycarbonate layer and a cathode, the holes are accumulated in the emitting layer comprising said polycarbonate layer. The so accumulated holes are combined with the electrons fed from the electron injecting layer to provide the electroluminescence. On the other hand, in a laminate of said polycarbonate with a fluorescent, electron transferring compound having no hole barrier properties, said polycarbonate is the hole injecting layer and said laminated compound is the emitting layer. Thus, the polycarbonates of the present invention can optionally be used either as the emitting layer or as the hole injecting layer. In other words, they can be either an emitting material having the electroluminescence function or a hole injecting material (hole transferring compound).

An electron transferring compound represented by the general formulae (XIII) or (XIV):

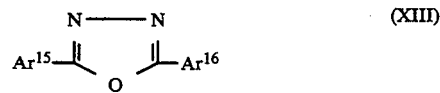

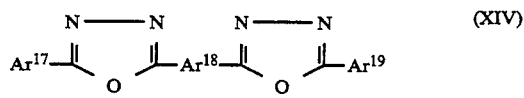

wherein $Ar^{15}$ to $Ar^{17}$ and $Ar^{19}$ are each independently a substituted or unsubstituted aryl group and $Ar^{18}$ is a substituted or unsubstituted arylene group can be preferably used as said electron injection layer having the hole barrier properties. Examples of the aryl group are a phenyl group, a naphthyl group, a biphenyl group, an anthranyl group, a perylenyl group, a pyrenyl group and the like. Examples of the arylene group are a phenylene group, a naphthylene group, a biphenylene group, an anthracenylene group, a perylenylene group, a pyrenylene group, and the like. Examples of the substituent group are an alkyl group having 1 to 10 carbon atoms, an alkoxy group having 1 to 10 carbon atoms, a cyano group and the like. The compounds represented by these general formulae (XIII) or (XIV) preferably have the thin film-forming properties.

Specific examples of the compounds represented by the general formulae (XIII) or (XIV) are:

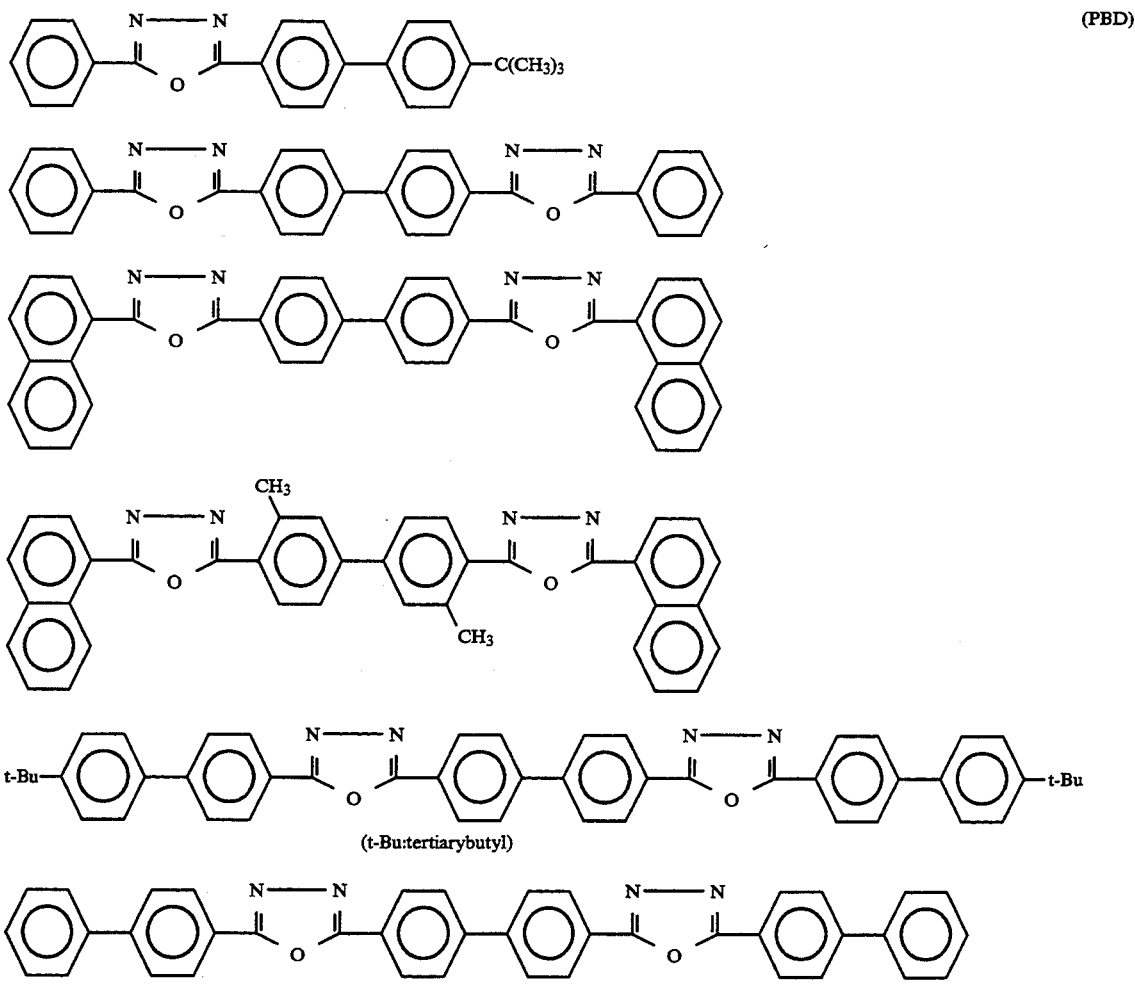

-continued

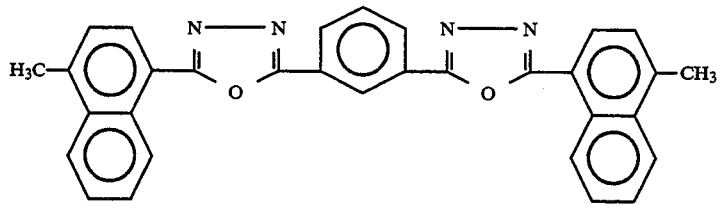

The EL devices of the present invention are made in various ways. Basically, however, an EL device has an emitting layer situated between a pair of electrodes (an anode and a cathode), optionally interspersing a hole injection or transporting layer (a hole injecting layer) and an electron injecting or transporting layer (an electron injecting layer). The specific examples thereof are a device comprising (1) an anode, an emitting layer and a cathode, (2) an anode, a hole injecting or transporting layer, an emitting layer and a cathode, (3) an anode, a hole injecting or transporting layer, an emitting layer, an electron injecting or transporting layer and a cathode and (4) an anode, a luminescence layer, an electron injecting or transporting layer and a cathode.

The hole injecting or transporting layer or the electron injecting or transporting layer are not always necessary but the devices having these two are capable of providing much better EL performance.

Furthermore, it is preferable that all the devices made in said ways should be supported on substrates. The substrates are not particularly limited for what they are made from. Preferable are substrates made of materials conventionally used in the organic EL devices, for example glass, transparent plastics, quartz and the like.

The anode for the organic EL device of the present invention preferably is those made of the electrode materials having a high work function (4 eV or more), such as metal, alloy, electrically conductive compound or their mixture. Specific examples of the electrode material are a metal such as Au and an conductive, transparent material such as Cu, I, ITO $SnO_2$ and ZnO. Said anodes are made by forming films from these electrode materials by the vapor deposition process, sputtering process or the like. Preferably the electrodes have a transmittance of 10% or more and a resistance of sheet of several hundred $\Omega/\square$ at the most in order to pick up the EL from these electrodes. The thickness of films depends upon materials but is preferably in a range of 10 nm to 1 $\mu$m, more preferably 50 to 150 nm.

On the other hand, the cathodes are made from electrode materials having a low work function (4 eV or less), such as metal, alloy, electrically conductive compound or their mixture.

Specific examples of the electrode material are a sodium, a sodium-potassium alloy, a magnesium, a lithium, a magnesium-copper mixture, an Al—$AlO_2$, an indium, a rare earth metal and the like. The cathodes are made by forming thin films from these electrode materials according to the vapor deposition process, the sputtering process or the like. Preferably, the electrodes have a resistance of sheet of several hundred $\Omega/\square$ or less and comprise a film having a thickness in a range of ordinarily 10 nm to 1 $\mu$m, preferably 50 to 200 nm. Although this is not provided for in the present invention, either an anode or a cathode is preferably transparent or translucent so that the EL is transmitted and picked up in high efficiency.

The hole transferring compounds to be used in the hole injecting or transporting layers are situated between 2 electrodes applied with the electric field, capable of transferring the holes to the emitting layer properly after the holes are injected from the anode. Preferably they have a hole mobility of, for example at least $10^{-6}$ cm$^2$/V·sec. when an electric field of $10^4$14 $10^6$V/cm is applied.

These hole transferring compounds are not particularly limited, except that they should have the preferred property as described above. Any compound can be used as the hole transferring compound, selected from the polycarbonates of the present invention, the photoconductive materials conventionally used as the hole transferring material and the known compounds commonly used as the hole injecting or transporting layers of the EL devices.

Examples of the hole transferring material are the triazole derivatives (U.S. Pat. No. 3,112,197), the oxadiazole derivatives (U.S. Pat. No. 3,189,447), the imidazole derivatives (Japanese Patent Publication No. 16096/1962), the polyarylalkane derivatives (U.S. Pat. Nos. 3,615,402, 3,820,989 and 3,542,544; Japanese Patent Publication Nos. 555/1970 and 10983/1976; and Japanese Patent Application Laid-Open Nos. 93224/1976, 17105/1980, 4148/1981, 108667/1980, 156953/1980 and 36656/1981, etc.), the pyrazoline derivatives and pyrazolone derivatives (U.S. Pat. Nos. 3,180,729 and 4,278,746; and Japanese Patent Application Laid-Open Nos. 88064/1980, 88065/1980, 105537/1974, 51086/1980, 80051/1981, 88141/1981, 45545/1982, 112637/1979, 74546/1970, etc.), the phenylenediamine derivatives (U.S. Pat. No. 3,615,404; and Japanese Patent Publication Nos. 10105/1976, 3712/1971 and 25336/1972; and Japanese Patent Application Laid-Open Nos. 53435/1979, 110536/1979 and 119925/1979, etc.), the arylamine derivatives (U.S. Pat. Nos. 3,567,450, 3,180,703, 3,240,597, 3,658,520, 4,232,103, 4,175,961 and 4,012,376; Japanese Patent Publication Nos. 35702/1974 and 27577/1964; Japanese Patent Application Laid-Open Nos. 144250/1980, 119132/1981 and 22437/1981; and German Patent No. 1,110,518, etc.), the amino-substituted chalcone derivatives (U.S. Pat. No. 3,526,501, etc.), the oxazole derivatives (U.S. Pat. No. 3,257,203, etc.), the styrylanthracene derivatives (Japanese Patent Application Laid-Open No. 46234/1981, etc.), the fluorenone derivatives (Japanese Patent Application Laid-Open No. 110837/1979), the hydrazone derivatives (U.S. Pat. No. 3,717,462; and Japanese Patent Application Laid-Open Nos. 59143/1979, 52063/1980, 52064/1980, 46760/1980, 85495/1980, 11350/1982 and 148749/1982, etc.) and the stilbene derivatives (Japanese Patent Application Laid-Open Nos. 210363/1986, 228451/1986, 14642/1986, 72255/1986, 47646/1987, 36674/1987, 10652/1987, 30255/1987, 93445/1985, 94462/1985, 174749/1985 and 175052/1985, etc.).

In the present invention these compounds can be used as the hole transferring compound, but it is preferred to use the porphyrin compounds as set forth below (Japanese Patent Application Laid-Open No. 2956965/1988, etc.), the aromatic tertiary amine compounds and the styrylamine compounds (U.S. Pat. No. 4,127,412; and Japanese Patent Application Laid-Open Nos. 27033/1978, 58445/1979, 149634/1979, 64299/1979, 79450/1980, 144250/1980, 119132/1981, 295558/1986, 98353/1986 and 295659/1988). More preferable among them are the aromatic tertiary amine compounds.

Representative examples of the porphyrin compound are porphyrin, 1,10,15,20-tetraphenyl-21H, 23H-porphyrin copper (II), 1, 10, 15, 20-tetraphenyl21H, 23H-porphyrin zinc (II), 5, 10, 15, 20-tetrakis (pentafluorophenyl)-21H, 23H-porphyrin, siliconphthalocyanine oxide, aluminum phthalocyanine chloride, phthalocyanine (nonmetal), dilithium phthalocyanine, copper tetramethylphthalocyanine, copper phthalocyanine, chrome phthalocyanine, zinc phthalocyanine, lead phthalocyanine, titanium phthalocyanine oxide, magnesium phthalocyanine and copper octamethylphthalocyanine.

Representative examples of the aromatic tertiary amine compound and those of styrylamine compound are N, N, N', N'-tetraphenyl-4, 4'-diaminophenyl, N, N'-diphenyl-N, N'-di(3-methlphenyl)-4, 4'-diaminobiphenyl, 2, 2-bis(4-di-p-tolylaminophenyl) propane, 1, 1-bis(4-di-p-tolylaminophenyl)cyclohexane, N, N, N', N'-tetra-p-tolyl-4, 4'-diaminophenyl, 1, 1-bis(4-di-p-tolylaminophenyl)-4-phenylcyclohexane, bis(4-dimethylamino-2-methylphenyl)phenylmethane, bis(4-di-p-tolylaminophenyl) phenylmethane, N, N'-diphenyl-N, N'-di(4-methoxyphenyl)-4, 4'-diaminobiphenyl, N, N, N', N'-tetraphenyl-4, 4'-diaminodiphenylether, 4, 4'-bis(diphenylamino) quadriphenyl, N, N, N-tri(p-tolyl) amine, 4-(di-p-tolylamino)-4'-[4(di-p-tolylamino)styryl] stilbene, 4-N, N-diphenylamino-(2-diphenylvinyl) benzene, 3-methoxy-4'-N, N-di phenylaminostilbenezene, N-phenylcarbazole and the like.

The hole injecting or transporting layers in the EL devices of the present invention may be made of a single layer comprising one member or two members or more of these hole transferring compounds or a laminate combining the above layer with a hole injecting or transporting layer comprising other compounds.

On the other hand, the electron injecting or transporting layers in an EL device having the structure (3) as described above comprise an electron transferring compound, having the function of transporting the injected electrons from the cathode to the luminescence layer. These electron transferring compounds are not particularly limited. Any compound can be used for them, selected from among known substances.

Preferred examples of the electron transferring compound are the thiopyran dioxide derivatives represented by:

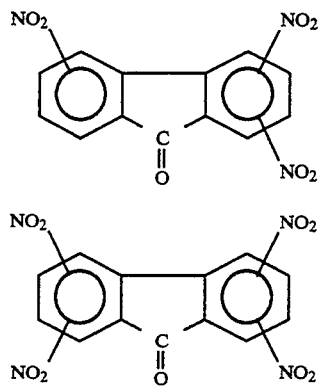

the diphenylquinone derivatives represented by:

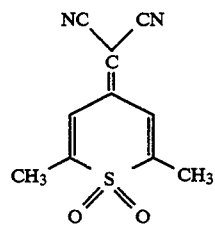

(Polymer Preprints, Japan, Vol. 37, No. 3, p. 681 (1988), etc.), or those compounds represented by:

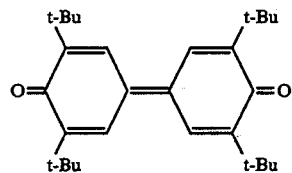

(J. J. Appl. Phys., Vol. 27, L269(1988), etc.), the anthraquinodimethane derivatives (Japanese Patent Application Laid-Open Nos. 149259/1982, 55450/1983, 225151/1986, 233750/1986, 104061/1988, etc.), the fluorenylidenemethane derivatives (Japanese Patent Application Laid-Open Nos. 69657/1985, 143764/1986, 148159/1986, etc.), the anthrone derivatives (Japanese Patent Application Laid-Open Nos. 225151/1986 and 233750/1986, etc.)

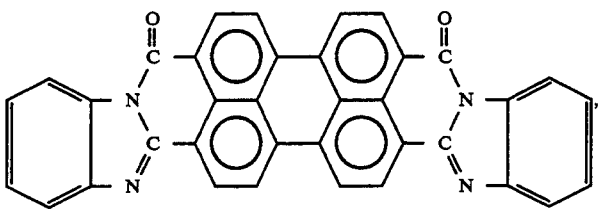

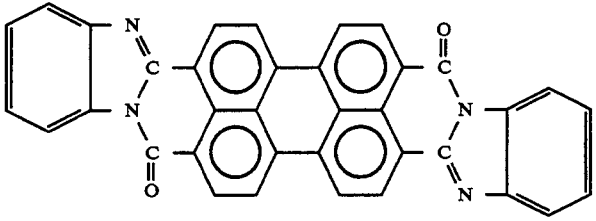

and the oxadiazole derivatives (Appl. Phys. Lett., Vol. 55, p. 1489 (1989)). Most preferred among them are the compounds having the hole barrier properties for use in the electron injecting layer, as represented by the general formulae (XIII) or (XIV).

Now the preferred processes for preparing organic EL devices of the present invention will be described with reference to the device of each structure as set forth above. An EL device comprising an anode, an emitting layer and a cathode is prepared as follows: At first, an anode is prepared by forming a thin film at a thickness of 1 μm or less, preferably in a range from 10 to 20 nm on an appropriate substrate. The film is made from a desired electrode material, for example a substance for anode by the sputtering method or the like. Then, an emitting layer is laid on this anode by forming a thin film from a compound of the emitting material. The films can be made from said emitting material by the spin coating process, the cast process, the LB process or the vapor deposition method, but the spin coating process is preferably used to obtain films which are uniform, without pinholes. After the emitting layer is formed, a cathode is laid thereon by forming a film at a thickness of 1 μm or less, preferably in a range from 50 to 200 nm from a material for cathode, for example by the vapor deposition process, the sputtering process or the like. In this way, the desired organic EL device is obtained. Meanwhile, it is quite acceptable as well to make the organic EL device by following the above steps in the reverse order or in the order of the cathode, the emitting layer and the anode.

Then, an EL device comprising an anode, a hole injecting or transporting layer, an emitting layer and a cathode is made as follows: at first, the anode is prepared by repeating the procedure of the above EL device. Then, the hole injecting or transporting layer is laid on the anode by forming the film from a hole transferring compound by the spin coating process or the like. The film forming conditions of the emitting material as described above should be applied mutatis mutandis to this step. Thereafter, the emitting layer and the cathode are laid one by one on the hole injecting or transporting layer by repeating the procedure of the above EL device to obtain the desired EL device. Meanwhile, it is acceptable as well to reverse the order of steps and proceed in the order of the cathode, the emitting layer, the hole injecting or transporting layer and the anode to prepare this EL device.

Furthermore, an EL device comprising an anode, a hole injecting or transporting layer, an emitting layer, an electron injecting or transporting layer and a cathode is prepared as follows: At first, the anode, the hole injecting or transporting layer and the emitting layer are laid one after another by repeating the procedures of the above EL devices. Then, the electron injecting or transporting layer is spread over this emitting layer by forming a thin film from an electron transferring compound according to the spin coating process or the like, followed by the cathode prepared in the same way as in the above EL device to obtain the desired EL device.

Meanwhile, it is quite acceptable to reverse the order of steps and proceed in the order of the cathode, the electron injecting or transporting layer, the luminescence layer, the hole injecting or transporting layer and the anode to prepare this EL device.

Now the so obtained organic EL device of the present invention is applied with a DC voltage, as follows: with the anode having the polarity (+) and the cathode having the polarity (−), the voltage of about 1 to 30V is applied, resulting in a finding that the electroluminescence is provided on the side of a transparent or translucent electrode. If the voltage is applied with the electrode polarities arranged in the other way, there is no passage of the electric current, nor is the EL obtained. Furthermore, if an AC voltage is applied, there is provided the EL only when the anode is (+) and the cathode (−). Meanwhile, the AC voltage having any waveforms is acceptable to apply.

Next, the present invention will now be described in detail with reference to the reference examples, the synthesis examples and the examples.

SYNTHESIS EXAMPLE 1

A 1 liter flask was charged with a solution dissolving 66.5 g (0.125 mole) of a bisphenol compound having a styrylamine skeleton represented by the following structural formula:

Structural Formula

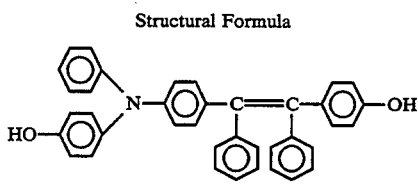

and 33.5 g (0.125 mole) of a 1, 1-bis (4-hydroxyphenyl) cyclohexane in 600 ml of a 3N aqueous sodium hydroxide solution and 250 ml of a methylene chloride. The reaction solution was vigorously stirred while the temperature of the solution was maintained in the neighborhood of 10° C. with the external cooling and phosgene was blown thereinto at a rate of 340 ml per minute for 30 minutes.

Thereafter, stirring was continued for 1 hour to complete the polymerization. After the reaction, 500 ml of a methylene chloride was added to dilute the organic layer. The diluted organic layer was washed with water, diluted hydrochloride acid and water in this order and the resultant mixture was introduced into a methanol to obtain a polycarbonate.

This polycarbonate was found to have a reduced viscosity [$\eta_{sp}/c$] of 0.85 dl/g as determined in a solution having a concentration of 0.5 g/dl the polycarbonate with the methylene chloride as a solvent at 20° C. The mean molecular weight (Mw) of this polycarbonate was determined by the gel permeation chromatography (GPC), with the resultant finding of 35000.

The structure and composition of this polymer were analyzed with the spectrum each of the proton nuclear magnetic resonance ($^1$H-NMR), the infrared absorption (IR) and the mass spectrometry (MS) and as the result it was found that the polymer was a polycarbonate copolymer comprising the following repeating unit and composition:

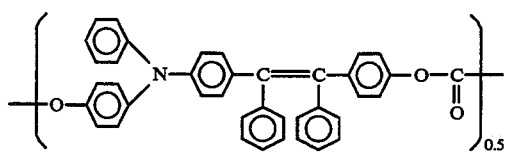

-continued

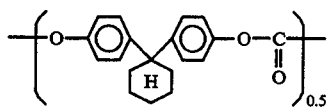

SYNTHESIS EXAMPLE 2

A polycarbonate was obtained by repeating the procedure of the Synthesis Example 1, except that 75.8 g (0.2 mol) of a bisphenol compound having a styrylamine skeleton represented by the following structural formula:

Structural Formula

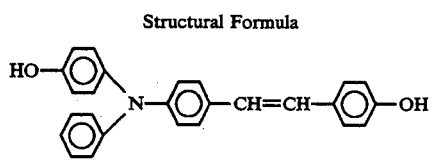

pane in place of 1, 1-bis(4-hydroxyphenyl) cyclohexane were used.

This polycarbonate was found to have a $[\eta_{sp}/c]$ of 0.92 dl/g as determined in a solution having a concentration of 0.5 g/dl of the polycarbonate with the methylene chloride as a solvent at 20° C. The Mw of this polymer was determined by the GPC, with the resultant finding of 38000.

The structure and composition of the polymer were analyzed with the spectrum each of the $^1$H-NMR, the IR and the MS, resulting in a finding that the polymer was a polycarbonate copolymer comprising the following repeating unit and composition:

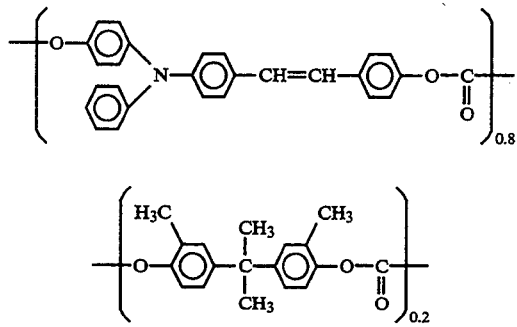

SYNTHESIS EXAMPLE 3

A polycarbonate was obtained by repeating the procedure of the Synthesis Example 1, except that 20.4 g (0.05 mol) of a bisphenol compound having a styrylamine skeleton represented by the following structural formula:

Structural Formula

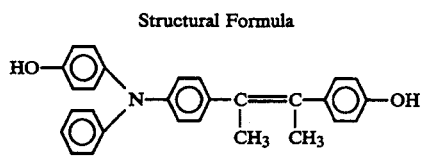

and 70.4 g (0.20 mole) of a 1, 1-bis(4-hydroxyphenyl)-1, 1-diphenylmethane in place of 1, 1-bis(4-hydroxyphenyl) cyclohexane were used.

This polycarbonate was found to have a $[\eta_{sp}/c]$ of 0.78 dl/g as determined in a solution having a concentration of 0.5 g/dl of the polycarbonate with the methylene chloride as a solvent at 20° C. The Mw of this polymer was determined by the GPC, with the resultant finding of 30000.

The structure and composition of the polymer were analyzed with the spectrum each of the $^1$H-NMR, the IR and the MS, resulting in a finding that the polymer was a polycarbonate copolymer comprising the following repeating unit and composition:

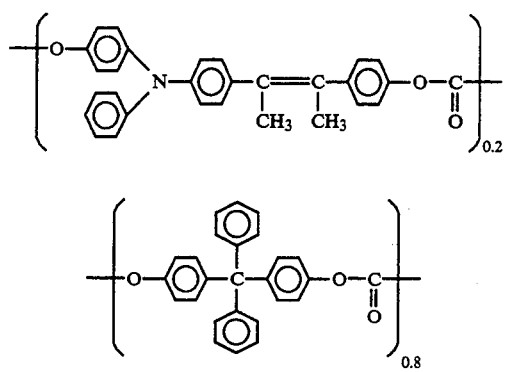

SYNTHESIS EXAMPLE 4

A polycarbonate was obtained by repeating the procedure of Synthesis Example 1, except that 71.75 g (0.125 mole) of a bisphenol compound having a styrylamine skeleton represented by the following structural formula:

Structural Formula

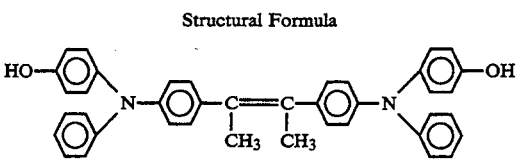

and 28.5 g (0.125 mole) of a 2, 2-bis(4-hydroxyphenyl) propane in place of 1, 1-bis(4-hydroxyphenyl) cyclohexane were used.

This polycarbonate was found to have a $[\eta_{sp}/c]$ of 0.77 dl/g as determined in a solution having a concentration of 0.5 g/dl of the polycarbonate with the methylene chloride as a solvent at 20° C. The Mw of this polymer was determined by the GPC, with the resultant finding of 32000.

The structure and composition of the polymer were analyzed with the spectrum each of the $^1$H-NMR, the IR and the MS, resulting in a finding that the polymer was a polycarbonate copolymer comprising the following repeating unit and composition:

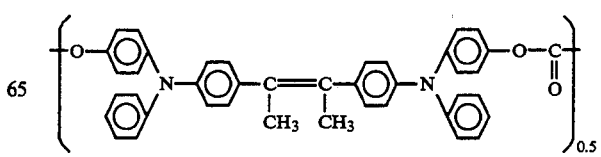

-continued

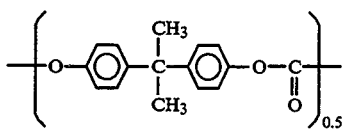

SYNTHESIS EXAMPLE 5

A polycarbonate was obtained by repeating the procedure of the Synthesis Example 1, except that 139.6 g (0.20 mole) of a bisphenol compound having a styrylamine skeleton represented by the following structural formula:

Structural Formula

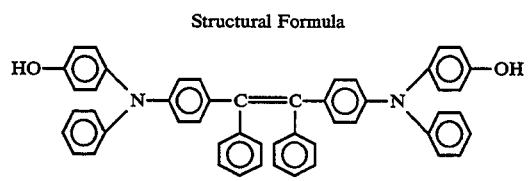

and 13.4 g (0.05 mole) of a 1, 1-bis(4-hydroxyphenyl) cyclohexane were used. This polycarbonate was found to have a [$\eta_{sp}/c$] of 0.61 dl/g as determined in a solution having a concentration of 0.5 g/dl of the polycarbonate with the methylene chloride as a solvent at 20° C. The Mw of this polymer also was determined by the GPC, with the resultant finding of 25000.

The structure and composition of the polymer were analyzed with the spectrum each of the $^1$H-NMR, the IR and the MS, resulting in a finding that the polymer was a polycarbonate copolymer comprising the following repeating unit and composition:

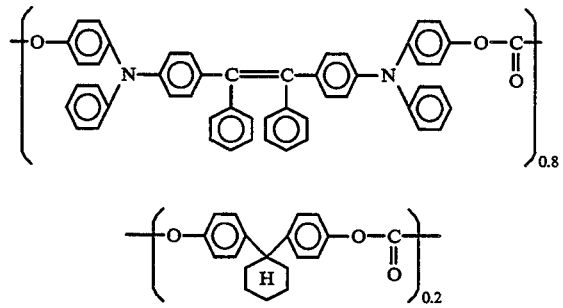

SYNTHESIS EXAMPLE 6

A polycarbonate was obtained by repeating the procedure of the Synthesis Example 1, except that 27.3 g (0.05 mole) of a bisphenol compound having a styrylamine skeleton represented by the following structural formula:

Structural Formula

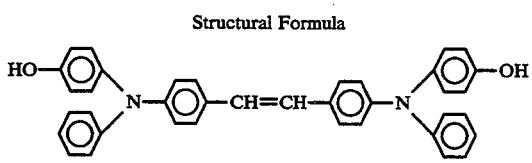

and 70.4 g (0.20 mole) of a 1, 1-bis(4-hydroxyphenyl)-1, 1-diphenylmethane in place of 1, 1-bis(4-hydroxyphenyl) cyclohexane were used. This polycarbonate was found to have a [$\eta_{sp}/c$] of 0.57 dl/g as determined in a solution having a concentration of 0.5 g/dl of the polycarbonate with the methylene chloride as a solvent at 20° C. The Mw of this polymer was determined by the GPC, with the resultant finding of 24000.

The structure and composition of the polymer were analyzed with the spectrum each of the $^1$H-NMR, the IR and the MS, resulting in a finding that the polymer was a polycarbonate copolymer comprising the following repeating unit and composition:

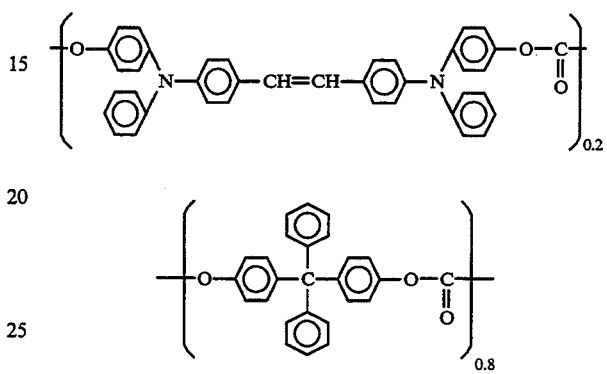

SYNTHESIS EXAMPLE 7

A polycarbonate was obtained by repeating the procedure of the Synthesis Example 1, except that 109.2 g (0.20 mole) of a bisphenol compound having a styrylamine skeleton represented by the following structural formula:

Structural Formula

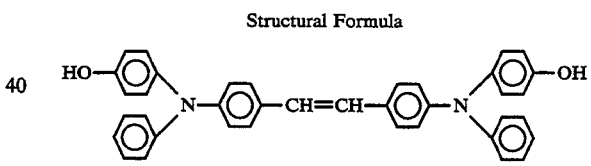

and 12.8 g (0.05 mole) of a 2, 2-bis(3-methyl-4-hydroxyphenyl) propane in place of 1, 1-bis(4-hydroxyphenyl) cyclohexane were used.

This polycarbonate was found to have a [$\eta_{sp}/c$] of 0.68 dl/g as determined in a solution having a concentration of 0.5 g/dl of the polycarbonate with the methylene chloride as a solvent at 20° C. The Mw of this polymer was determined by the GPC, with the resultant finding of 29000.

The the structure and composition of the polymer were analyzed with the spectrum each of the $^1$H-NMR, the IR and the MS, resulting in a finding that the polymer was a polycarbonate copolymer comprising the following repeating unit and composition:

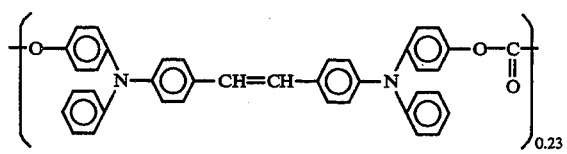

-continued

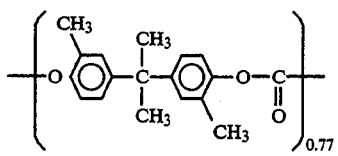

EXAMPLE 1

A transparent supporting substrate was provided in the form of a 25 mm×75 mm×1.1 mm glass substrate over which a film having a thickness of 100 nm was formed from an ITO by the vapor deposition method (supplied by HOYA Co., Ltd.). Previously this substrate was ultrasonically cleaned in an isopropyl alcohol, dried by blowing nitrogen gas and further washed in UV ozone (UV300 supplied by Samco International) for 8 minutes.

An emitting layer was laid on this transparent supporting substrate by coating a 0.9 wt. % solution obtained by dissolving 200 mg of the polycarbonate of Synthesis Example 7 in 20 g of a dichloromethane by the spin coating method. This spin coating was carried out in 7000 rpm for 50 seconds, resulting in a film at a thickness of 600±100Å[*1] (surface profile detector: DEKTAK 3030, supplied by Sloan Co.).

[*1]: The film was examined by an optical microscope 6 months later, with the resultant finding that no recognizable crystallization was present and the film remained as it should be.

Then, the transparent supporting substrate was set to the substrate holder of a commercially available vapor deposition system (supplied by Nihon Vacuum Technique Co., Ltd.) having 3 resistance heating boats.

PBD (200 mg) as the electron injecting material was placed in one boat, magnesium (2 g) in another boat and a silver (200 mg) in still another boat and the vacuum chamber was depressurized to $2 \times 10^{-3}$ Pa. Thereafter, the boat containing PBD was heated to deposit the PBD at a deposition rate of 0.3 to 0.5 nm/sec. and provide an electron injecting layer at a thickness of 20 nm on the transparent supporting substrate. In this process the substrate was maintained at room temperature.

Thereafter, the boat containing the magnesium and the boat containing the silver were electrified simultaneously to deposit them while keeping the ratio of one deposition rate to another deposition rate (magnesium:silver) at 1:7 to 1:10. Thus, obtained was an opposed electrode comprising the magnesium and silver which were deposited at a thickness of 120 nm (the thickness of the film was detected by a quartz oscillator sensor). In this way, the desired organic EL device was completed.

Then, the so obtained organic EL device was applied at a DC voltage of 6V, resulting in the passage of an electric current of approximately 136 mA/cm$^2$ to emit EL in Purplish Blue as determined by the chromaticity coodinates. The peak was at 460 nm as determined by the spectrometry and the brightness was 120 cd/cm$^2$.

In FIG. 1, it is shown that there is no polycarbonate layer in a portion of the curve up to 0Å of the ordinate axis. The thickness of the polycarbonate layer is shown by the magnitude of the rise in the curve close to 220 μm of the abscissa axis. The thickness deviation of 100Å from 600Å shows that this ultra thin film has an excellent flatness.

REFERENCE EXAMPLE 1

A sulfonate represented by the following structural formula:

Structural Formula

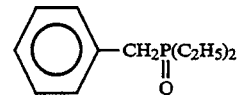

was dissolved in 20 ml of a dimethyl sulfoxide (DMSO) in an atmosphere of argon gas and 1.0 g of a potassium-t-butoxide (t-BuOK) was added thereto. Then, a compound represented by the following structural formula:

Structural Formula

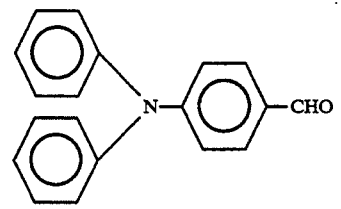

was added thereto and the resultant mixture was stirred for 5 hours. 100 ml of a methanol was added to the so obtained reaction product and a yellowish powder was precipitated. An iodine-containing benzene solution was added to recrystallize this powder and 0.8 g of a yellowish powder was obtained. The obtained yellowish powder was analyzed for its structure and composition by the proton magnetic resonance ($^1$H-NMR) spectrum and it was found that the powder was a styrylamine compound represented by:

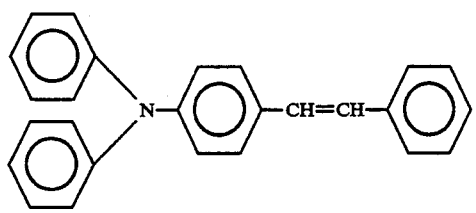

The procedure of Example 1 was repeated, wherein a 0.9 wt. % solution obtained by dissolving 200 mg of this compound in 20 g of a dichloromethane was coated on a transparent supporting substrate according to the spin coating method. This spin coating was carried out in 7000 rpm for 50 seconds. The thickness of the obtained film was measured by said DEKTAK 3030, with the resultant finding that it was 600±500Å and the thin film had a quite uneven thickness.

Ordinarily, a thin film cannot be formed from a single member of an organic low molecular weight compound having this much unevenness according to the spin coating method and it is impossible to use such a compound as an emitting layer or as a hole injecting layer.

COMPARATIVE EXAMPLE 1

A styrylamine compound represented by:

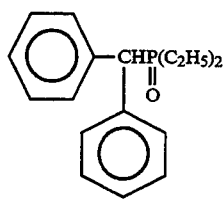

was synthesized by repeating the procedure of Reference Example 1, except that a sulfonate represented by the following structural formula:

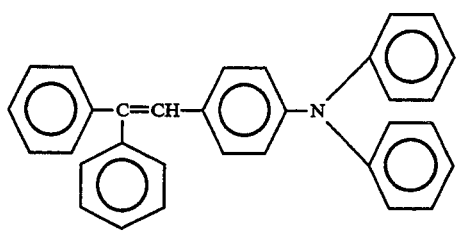

was used.

Furthermore, an organic EL device was prepared by repeating the procedure of Example 1, except that the above styrylamine compound was used as the emitting layer (at a thickness of 50 nm).

This organic EL device had an ITO electrode as the anode and a mixed metal electrode of magnesium and silver as the cathode.

When the voltage of 10V was applied, it was found that the EL device was shortcircuited, incapable of emitting EL.

EXAMPLE 2

A polycarbonate was obtained by repeating the procedure of Example 1. Then, a hole injecting layer was prepared by coating a 0.9 wt. % solution obtained by dissolving 200 mg of this polycarbonate in 20 g of a dichloromethane according to the spin coating method. This spin coating was carried out in 7000 rPm for 50 seconds, resulting in a film having a thickness of 600±100Å (surface profile detector: DEKTAK 3030).

Then, the transparent supporting substrate was set to the substrate holder of a commercially available vapor deposition system (supplied by Nihon Vacuum Technique Co., Ltd.) having 3 resistance heating boats.

Placed in one boat was an aluminum complex (Alq, 200 mg) wherein a 8-hydroxyquinoline was coordinated at (III). A magnesium (2 g) was placed in another boat and a silver (200 mg) in still another boat and then the vacuum chamber was depressurized to $10^{-3}$ Pa. Thereafter, the boat containing the Alq was heated to 250° to 270° C. to deposit the Alq at a deposition rate of 0.1 to 0.3 nm/sec. and provide an electron transferring emitting layer at a thickness of 50 nm thick film on the transparent supporting substrate. In this process the substrate was maintained at room temperature.

Thereafter, the boat containing magnesium and the boat containing silver were electrified simultaneously to deposit them while keeping the ratio of one rate of deposition to another rate of deposition (magnesium:silver) at 1:7 to 1:10. Thus, obtained was an opposed electrode comprising the magnesium and silver which were deposited at a thickness of 120 nm (detected by a quartz oscillator sensor). In this way, the desired organic EL device was completed.

The so obtained organic EL device had an ITO electrode as the anode and a mixed metal electrode of magnesium and silver as the cathode and was applied with a DC voltage of 12V, resulting in the passage of an electric current of approximately 168 mA/cm² to emit EL in Green as determined by the chromaticity coodinates. The peak wavelength as determined by the spectrometry was 513 nm and the brightness was 800 cd/cm².

COMPARATIVE EXAMPLE 2

An EL device was prepared by repeating the procedure of Example 2, except that the hole injecting layer comprising the polycarbonate layer was removed.

The so obtained organic EL device had an ITO electrode as the anode and a mixed metal electrode of magnesium and silver as the cathode and was applied with a DC voltage of 17V, resulting in the passage of an electric current of approximately 20 mA/cm² to luminesce in Green as determined by the chromaticity coodinates. The peak wavelength as determined by the spectrometry was 513 nm and the brightness was 20 cd/cm². It was found that this device required a very high voltage but had low brightness, showing that the polycarbonate layer had served the function of a hole injecting layer to a full extent in Example 2.

EXAMPLES 3 TO 8

The EL devices were prepared by using the polycarbonates listed in Table 1 as the luminescence layer and repeating the procedure of Example 1. The results obtained with these devices are given in Table 1. They were found to have sufficiently high brightness and high luminescence efficiency in the colors of blue wherein it is difficult for EL luminescence layers to work.

TABLE 1

| Examples | Polycarbonates | Voltage (V) | Current (mA/cm²) |
|---|---|---|---|
| 3 | Synthesis Example. 1 | 7 | 100 |
| 4 | Synthesis Example. 2 | 7 | 80 |
| 5 | Synthesis Example. 3 | 7 | 80 |
| 6 | Synthesis Example. 4 | 7 | 100 |
| 7 | Synthesis Example. 5 | 7 | 70 |
| 8 | Synthesis Example. 6 | 7 | 60 |

| Example No. | Color of Luminescence | Brightness (cd/m²) | Luminescence Eff. (lm/W) |
|---|---|---|---|
| 3 | Greenish blue | 400 | 0.2 |
| 4 | Purplish blue | 150 | 0.08 |
| 5 | Purple | 200 | 0.1 |
| 6 | Blue | 10 | 0.04 |
| 7 | Bluish green | 600 | 0.4 |
| 8 | Purplish green | 260 | 0.2 |

REFERENCE EXAMPLE 2

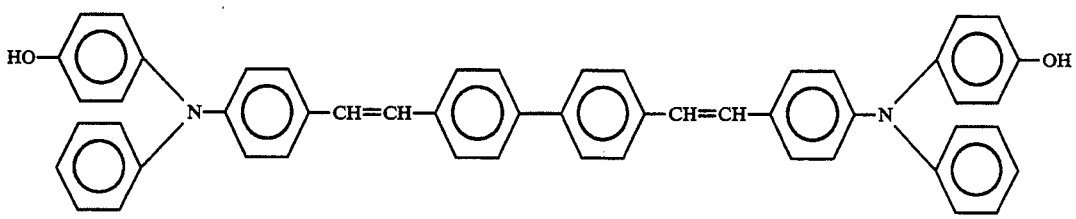

(1) Synthesis of:

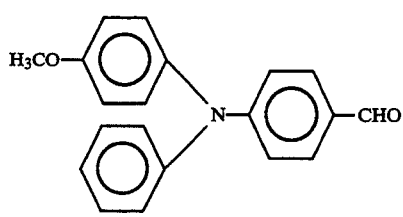

6.0 g (0.08 mole) of a DMF was added dropwise to 4 g (0.026 mole) of a phosphorus oxychloride while cooling them with ice and a transparent solution was obtained. 6.6 g (0.024 mole) of a 4-methoxytriphenylamine was added to the solution to obtain a yellow suspension. The yellow suspension was stirred at 4° C. for 1 hour, followed by stirring with heating at 80° C. for 1 hour to obtain a reddish brown solution. The solution was allowed to stand to cool and the resultant reaction solution was introduced into 100 ml of water and neutralized on addition of 2 g of a sodium acetate. A yellow precipitate obtained therein was filtered and the residue was washed with 100 ml of water thrice and distilled under reduced pressure and 6.1 g of a yellow powder was obtained (yield: 83%). The powder was analyzed with the proton magnetic resonance ($^1$H-NMR), with the finding of the desired compound.

(2) Synthesis of:

5.0 g (0.011 mole) of a phosphonate represented by:

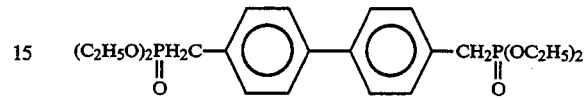

22.5 g (0.022 mole) of a potassium-t-butoxide and 6.7 g (0.022 mole) of an aldehyde synthesized in Reference Example 2 (1) were suspended in 100 ml of a dimethyl sulfoxide anhydride and the suspension was stirred in an atmosphere of argon gas at room temperature. The resultant red suspension was stirred for 5 hours, 50 ml of methanol and 50 ml of water were added thereto and a yellow oily substance was obtained. The yellow oily substance was purified by the silica gel chromatography to obtain 4.0 g (yield: 48%) of a yellow amorphous compound. The so obtained compound was analyzed with the $^1$H-NMR spectrum, with the resultant finding of the desired compound.

(3) Synthesis of:

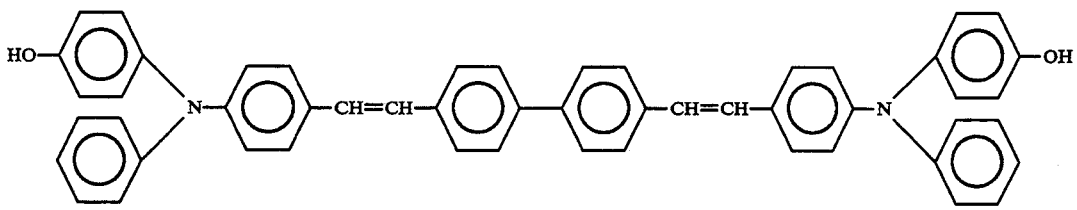

3.0 g (0.0039 mole) of the compound obtained in Reference Example 2 (2) was placed in a flask equipped with a nitrogen gas tube and dissolved in 50 ml of a methylene chloride with cooling. 0.7 ml (0.0075 mole) of a boron tribromide was slowly dropped thereto. After the dropping was over, the reaction solution was stirred for 3 hours at room temperature and 50 ml of water in limited amounts was added thereto with cooling. The organic layer was washed with 50 ml of water thrice and dried with a sodium sulfate. The sodium sulfate was filtered, then the solvent was distilled away and 2.2 g (yield: 77%) of the desired compound was obtained. The compound was analyzed with the $^1$H-NMR spectrum and it was found that the obtained product was the desired compound.

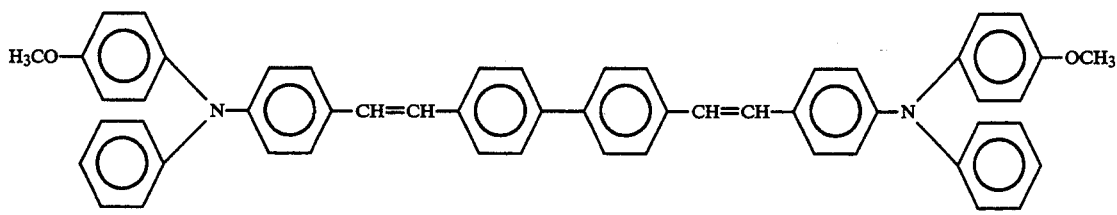

SYNTHESIS EXAMPLE 8

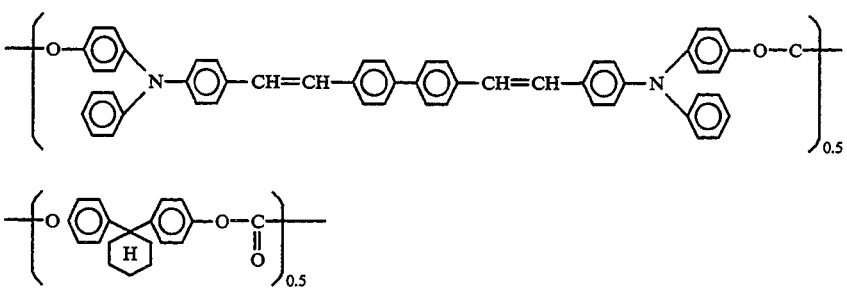

A solution obtained by dissolving 88.8 g (0.125 mole) of the bisphenol compound having the styrylamine skeleton synthesized in Reference Example 2 and 33.5 g (0.125 mole) of a 1, 1-bis(4-hydroxyphenyl) cyclohexane in 600 ml of a 3N aqueous sodium hydroxide solution and 250 ml of a methylene chloride were introduced into a 1 liter flask. The reaction solution was vigorously stirred while keeping it at a temperature close to 10° C. with external cooling and phosgene was blown thereinto at a rate of 340 ml/min. for 30 minutes.

Then, the stirring was continued for 1 hour to complete the polymerization. After the reaction was completed, the organic layer was diluted with the addition of 500 ml of a methylene chloride. The diluted organic layer was washed with water, dilute hydrochloride acid and water in this order and introduced into a methanol to obtain a polycarbonate.

This polycarbonate was found to have a reduced viscosity [$\eta_{sp}/c$] of 0.70 dl/g as determined in a solution having a concentration of 0.5 g/dl of the polycarbonate with the methylene chloride as the solvent at 20° C. The mean molecular weight (Mw) of the polymer was measured by the gel permeation chromatography (GPC), with the resultant finding of 28000. The polymer was analyzed with the spectrum each of the $^1$H-NMR and IR, with the following findings:

$^1$H-NMR (solvent: CD$_2$Cl$_2$). δ(ppm)=1.55 (6H, s), 2.3 (4H, s), 6.8 to 7.5 (144H, m). IR (KBr tablet method). 981 cm$^{-1}$ ($\delta_{C-H}$ trans).

The polymer was analyzed for its structure and composition in accordance with the results of the above spectrum analyses and it was found that the polymer was a polycarbonate copolymer having the following repeating unit and composition:

SYNTHESIS EXAMPLE 9

A bisphenol compound represented by the following structural formula:

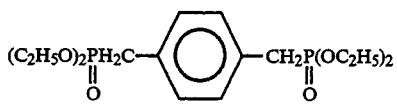

was obtained by repeating the procedure of Reference Example 2, except that the following compound:

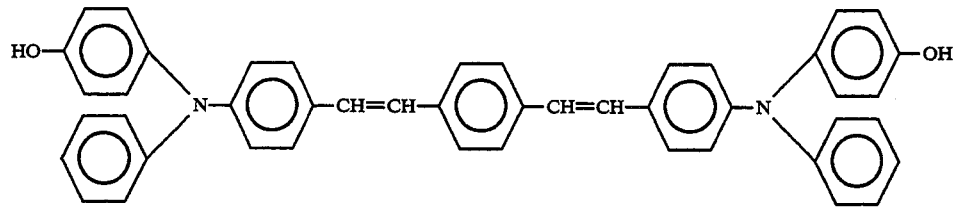

was used as the phosphonate.

A polycarbonate was obtained by repeating the procedure of Synthesis Example 8, except that 136.4 g (0.2 mole) of this bisphenol compound having the above styrylamine skeleton and 12.8 g (0.05 mole) of a 2, 2-bis(3-methyl-4-hydroxyphenyl) propane in place of 1, 1-bis(4-hydroxyphenyl) cyclohexane were used.

This polycarbonate was found to have a [$\eta_{sp}/c$] of 0.53 dl/g as determined in a solution having a concentration of 0.5 g/dl of the polycarbonate with the methylene chloride as the solvent at 20° C. The Mw was measured by the GPC with the resultant finding of 28000.

The structure and composition of this polymer were analyzed with the spectrum each of the $^1$H-NMR, IR and MS, with the resultant finding that the polymer was a polycarbonate copolymer having the following repeating unit and composition:

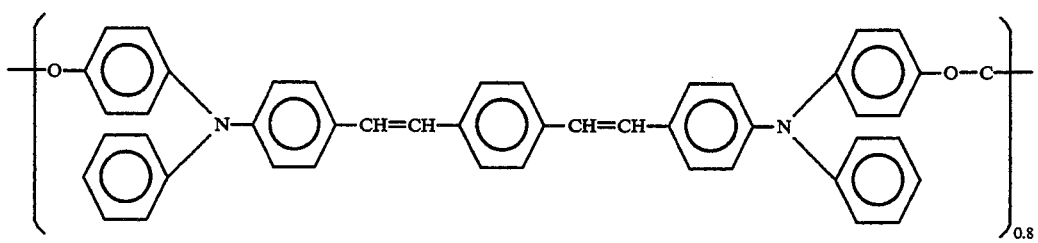

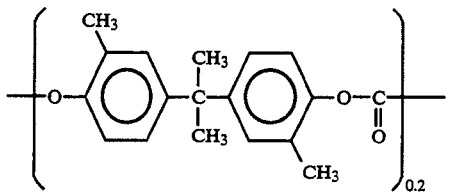

SYNTHESIS EXAMPLE 10

A bisphenol compound represented by the following structural formula: Structural Formula

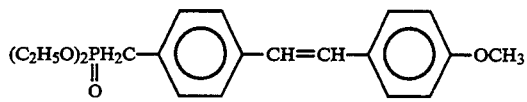

was obtained by repeating the procedure of Reference Example 2, except that the following compound:

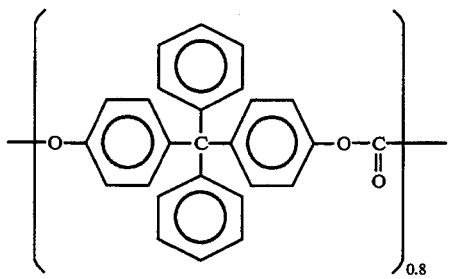

was used as the phosphonate.

A polycarbonate was obtained by repeating the procedure of Synthesis Example 8, except that 23.35 g (0.05 mole) of this bisphenol compound having the above styrylamine skeleton and 70.4 g (0.20 mole) of a 1, 1-bis(4-hydroxyphenyl)-1, 1-diphenylmethane in place of 1, 1-bis(4-hydroxyphenyl) cyclohexane were used. This polycarbonate was found to have a [$\eta_{sp}/c$] of 0.74 dl/g as determined in a solution having a concentration of 0.5 g/dl of the polycarbonate with the methylene chloride as the solvent at 20° C. The Mw was measured by the GPC with the resultant finding of 30000.

The structure and composition of this polymer were determined with the result of the analysis of the spectrum each of the $^1$H-NMR, IR and MS. As the result it was found that the polymer was a polycarbonate copolymer having the following repeating unit and composition:

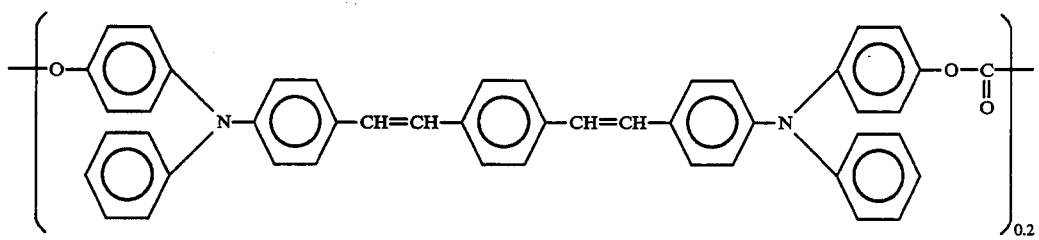

SYNTHESIS EXAMPLE 11

A bisphenol compound represented by the following structural formula:

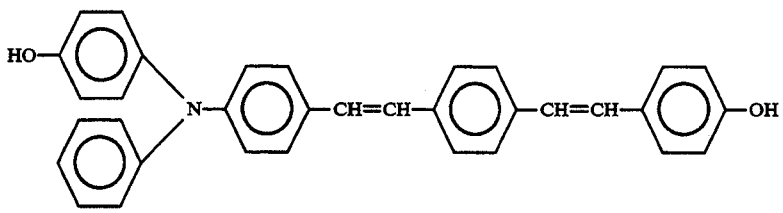

was obtained by repeating the procedure of Reference Example 2, except that the following compound:

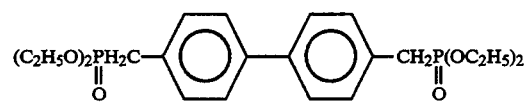

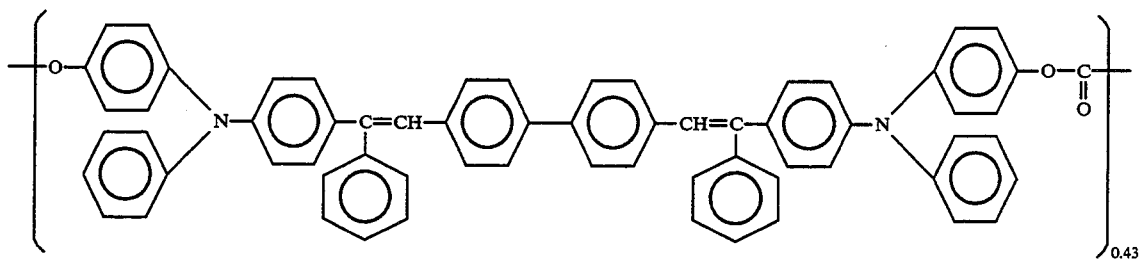

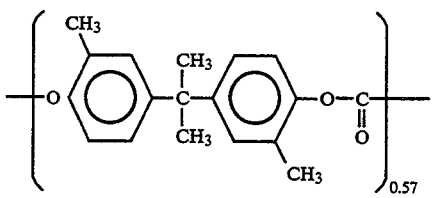

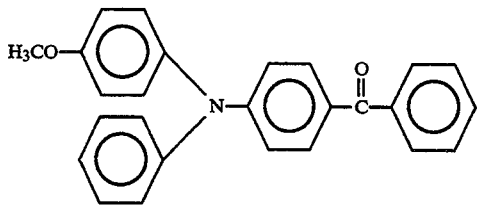

was used as the phosphonate and following another compound:

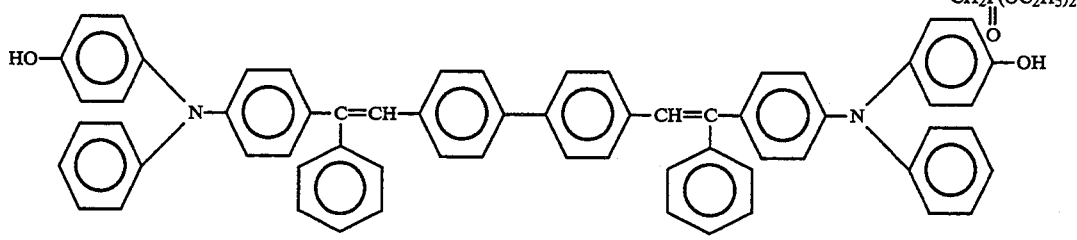

was used as the aldehyde derivative.

A polycarbonate was obtained by repeating the procedure of Synthesis Example 8, except that 113.5 g (0.125 mole) of this bisphenol compound having a styrylamine skeleton represented by the above formula and 28.5 g (0.125 mole) of a 2, 2-bis(4-hydroxyphenyl) propane in place of 1, 1-bis(4-hydroxyphenyl) cyclohexane were used.

This polycarbonate was found to have a [$\eta_{sp}$/c] of 0.68 dl/g as determined in a solution having a concentration of 0.5 g/dl of the polycarbonate with the methylene chloride as the solvent at 20° C. The Mw was measured by the GPC with the resultant finding of 24000.

The structure and composition of this polymer were determined with the result of the analysis of the spectrum each of the $^1$H-NMR, IR and MS, As the result, it was found that the polymer was a polycarbonate copolymer having the following repeating unit and composition:

SYNTHESIS EXAMPLE 12

A bisphenol compound represented by the following structural. formula:

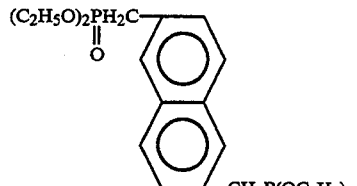

was obtained by repeating the procedure of Reference Example 2, except that the following compound:

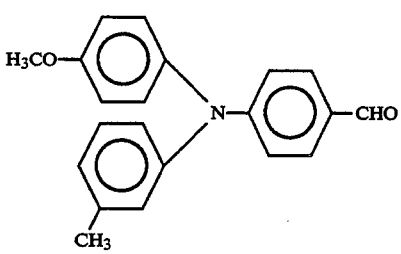

was used as the phosphonate and following another compound:

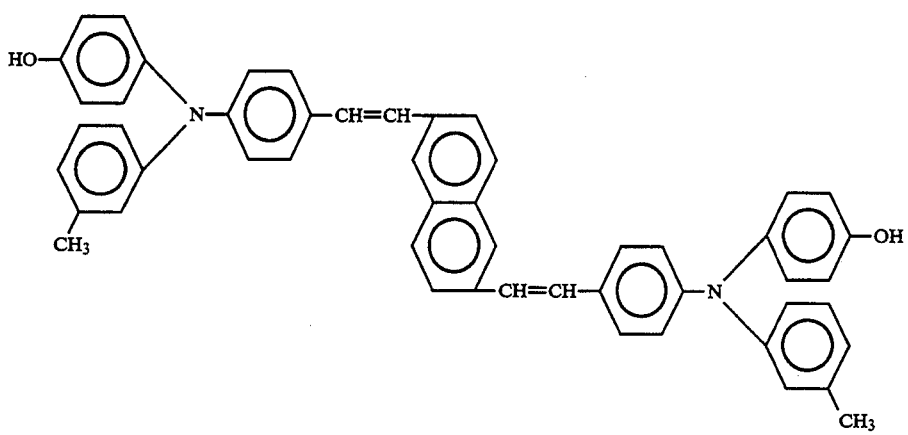

was used as the aldehyde derivative.

A polycarbonate was obtained by repeating the procedure of Synthesis Example 8, except that 158 g (0.2 mole) of this bisphenol compound having a styrylamine skeleton represented by the above formula and 13.4 g (0.05 mole) of a 1,1-bis(4-hydroxyphenyl) cyclohexane were used. This polycarbonate was found to have a $[\eta_{sp}/c]$ of 0.52 dl/g as determined in a solution having a concentration of 0.5 g/dl of the polycarbonate with the methylene chloride as the solvent at 20° C. The Mw was measured by the GPC with the resultant finding of 21000.

The structure and composition of this polymer were determined with the results of the analysis of the spectrum each of the $^1$H-NMR, IR and MS, with the resultant finding that the polymer was a polycarbonate copolymer having the following repeating unit and composition:

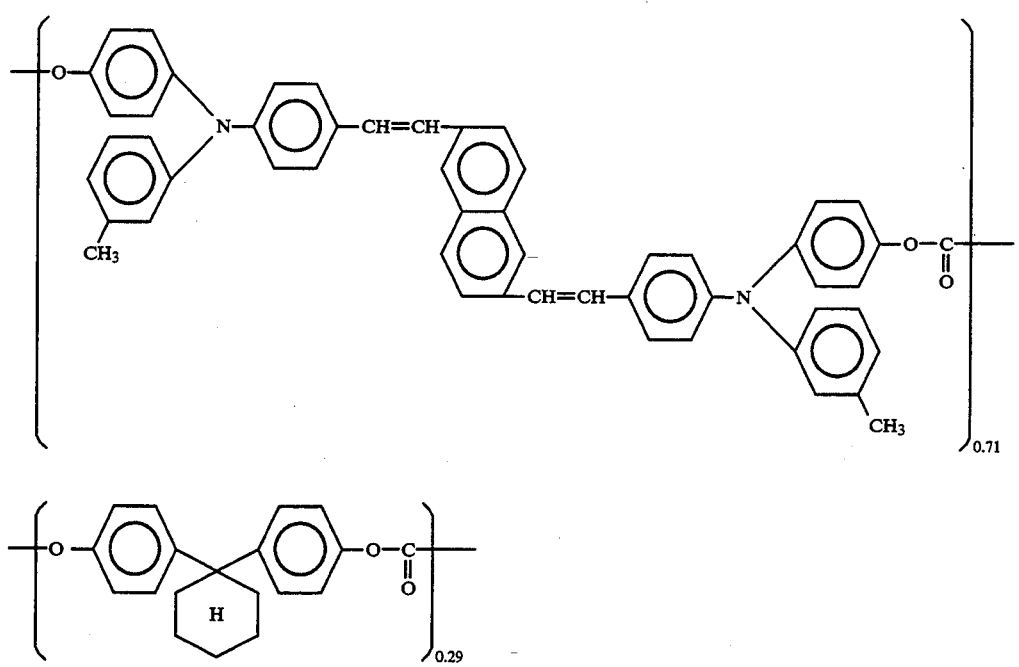

SYNTHESIS EXAMPLE 13

A bisphenol compound represented by the following structural formula:

Structural Formula

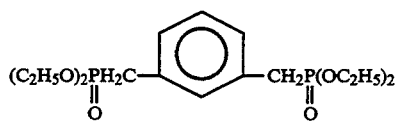

was obtained by repeating the procedure of Reference Example 2, except that the compound represented by:

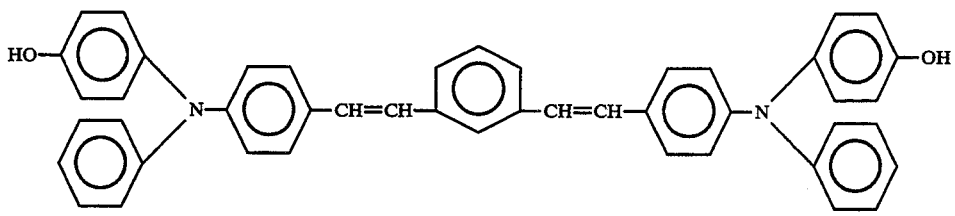

was used as the phosphonate.

A polycarbonate was obtained by repeating the procedure of Synthesis Example 8, except that 34.1 g (0.05 mole) of this bisphenol compound having a styrylamine skeleton represented by the above structural formula and 70.4 g (0.20 mole) of a 1, 1-bis(4-hydroxyphenyl)-1, 1-diphenylmethane in place of 1, 1-bis(4-hydroxyphenyl) cyclohexane were used. This polycarbonate was found to have a [$\eta_{sp}/c$] of 0.62 dl/g as determined in a solution having a concentration of 0.5 g/dl of the polycarbonate with the methylene chloride as the solvent at 20° C. The Mw was measured by the GPC with the resultant finding of 21000.

The structure and composition of this polymer were determined with the results of the analysis of the spectrum each of the $^1$H-NMR, IR and MS, with the resultant finding that the polymer was a polycarbonate copolymer having the following repeating unit and composition:

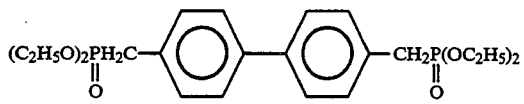

was obtained by repeating the procedure of Reference Example 2, except that the following compound:

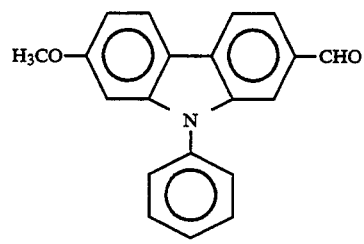

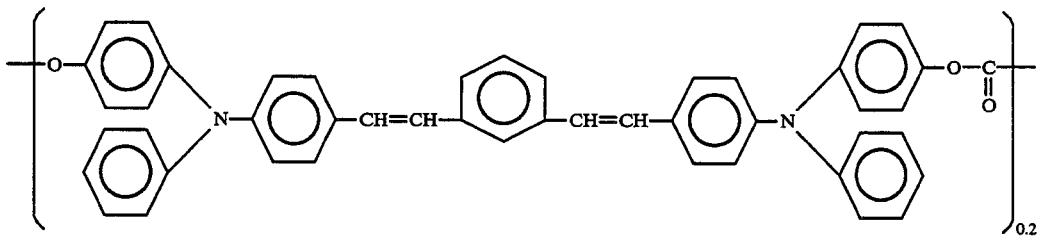

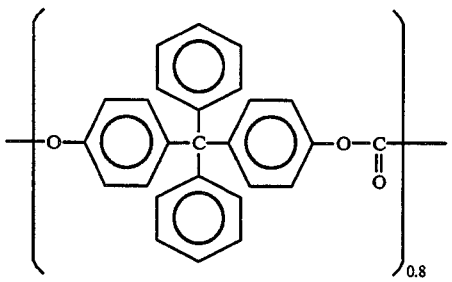

SYNTHESIS EXAMPLE 14

A bisphenol compound represented by the following structural formula:

was used as the phosphonate and following another compound:

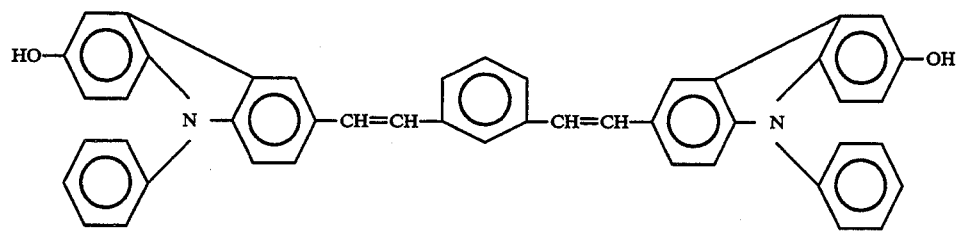

was used as the aldehyde derivative.

A polycarbonate was obtained by repeating the procedure of Synthesis Example 8, except that 132.4 g (0.2 mole) of this bisphenol compound having a styrylamine skeleton represented by the above structural formula and 12.8 g (0.05 mole) of a 2, 2-bis(3-methyl-4-hydroxyphenyl) propane in place of 1, 1-bis(4-hydroxyphenyl)-cyclohexane were used.

Structural Formula

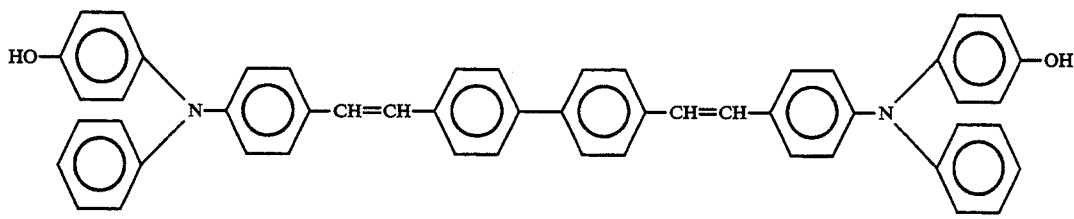

This polycarbonate was found to have a [$\eta_{sp}/c$] of 0.68 dl/g as determined in a solution having a concentration of 0.5 g/dl of the polycarbonate with the methylene chloride as the solvent at 20° C. The Mw was measured by the GPC with the resultant finding of 29000.

The structure and composition of this polymer were determined with the results of the analysis of the spectrum each of the $^1$H-NMR, IR and MS, with the resultant finding that the polymer was a polycarbonate copolymer having the following repeating unit and composition:

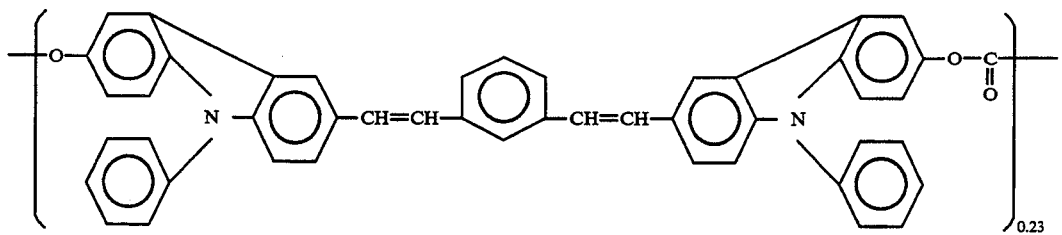

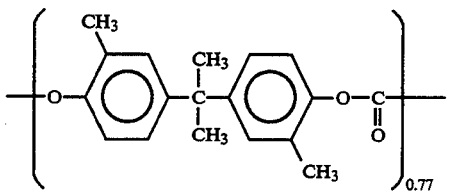

SYNTHESIS EXAMPLE 15

A polycarbonate was obtained by repeating the procedure of Reference Example 2 and Synthesis Example 8, except that 144.8 g (0.2 mole) of a bisphenol compound having a styrylamine skeleton represented by the following structural formula:

and 20.2 g (0.2 mole) of a 4, 4'-hydroxyphenylether in place of 1, 1 -bis(4-hydroxyphenyl) cyclohexane were used. This polycarbonate was found to have a [$\eta_{sp}/c$] of 0.71 dl/g as determined in a solution having a concentration of 0.5 g/dl of the polycarbonate with the methylene chloride as the solvent at 20° C. The Mw was measured by the GPC with the resultant finding of 30000.

The structure and composition of this polymer were determined with the results of the analysis of the spectrum each of the $^1$H-NMR, IR and MS, with the resultant finding that the polymer was a polycarbonate copolymer having the following repeating unit and composition:

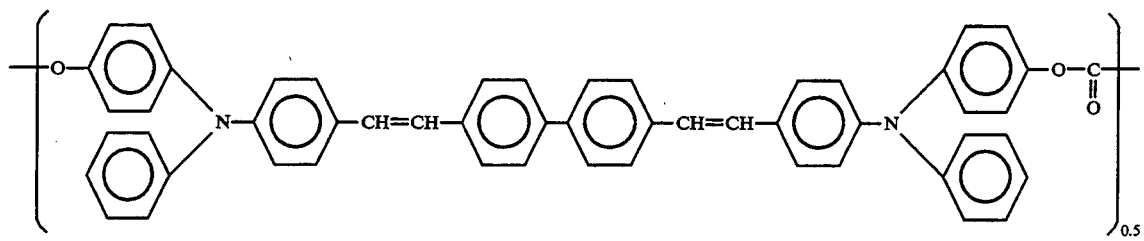

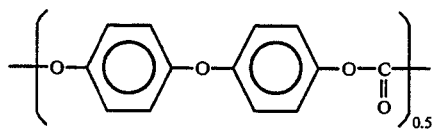

SYNTHESIS EXAMPLE 16

A polycarbonate was obtained by repeating the procedure of Reference Example 2 and Synthesis Example 8, except that 72.4 g (0.1 mole) of a bisphenol compound having a styrylamine skeleton represented by the following structural formula:

Structural Formula

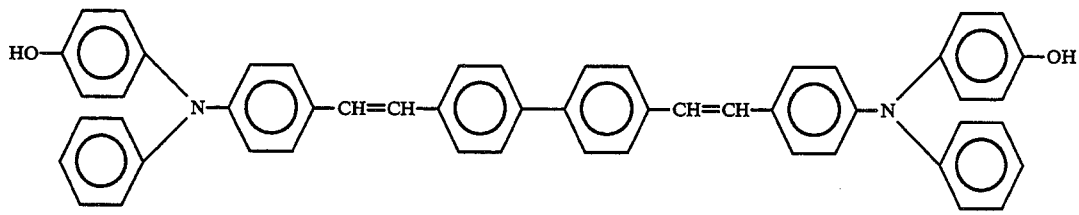

and 21.8 g (0.1 mole) of a 4, 4'-hydroxybiphenylsulfone in place of 1, 1-bis(4-hydroxyphenyl) cyclohexane were used. This polycarbonate was found to have a [$\eta_{sp}$/c] of 0.5 dl/g as determined in a solution having a concentration of 0.5 g/dl of the polycarbonate with the methylene chloride as the solvent at 20° C. The Mw was measured by the GPC with the resultant finding of 19000.

The structure and composition of this polymer were determined with the results of the analysis of the spectrum each of the $^1$H-NMR, IR and MS, with the resultant finding that the polymer was a polycarbonate copolymer having the following repeating unit and composition:

SYNTHESIS EXAMPLE 17

A polycarbonate was obtained by repeating the procedure of Reference Example 2 and Synthesis Example 8, except that 72.4 g (0.1 mole) of a bisphenol compound having a styrylamine skeleton represented by the following structural formula:

Structural Formula

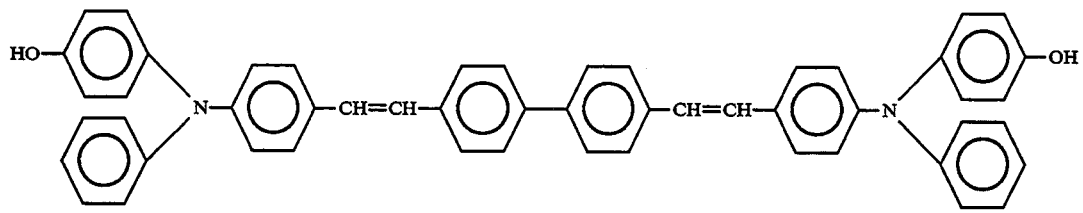

and 25 g (0.1 mole) of a 4, 4'-hydroxybiphenylsulfide in place of 1, 1-bis(4-hydroxyphenyl) cyclohexane were used. This polycarbonate was found to have a [$\eta_{sp}$/c] of 0.62 dl/g as determined in a solution having a concentration of 0.5 g/dl of the polycarbonate with the methylene chloride as the solvent at 20° C. The Mw was measured by the GPC with the resultant finding of 24000.

The structure and composition of this polymer were determined with the results of the analysis of the spectrum each of the $^1$H-NMR, IR and MS, with the resultant finding that the polymer was a polycarbonate co-

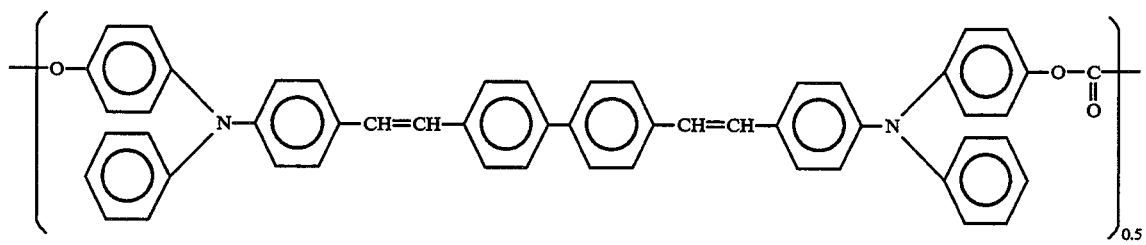

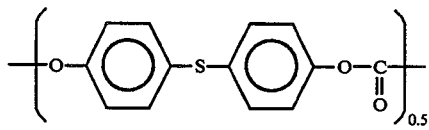

polymer having the following repeating unit and composition:

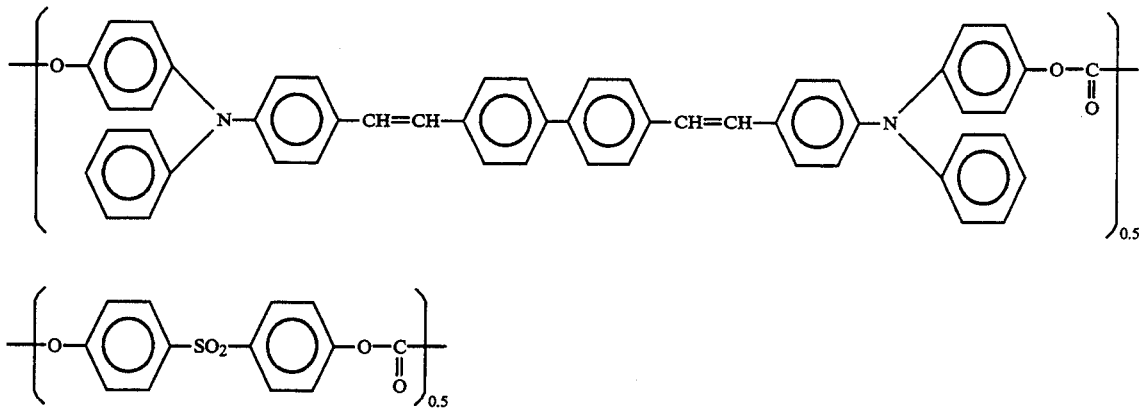

was measured by the GPC with the resultant finding of 31000.

SYNTHESIS EXAMPLE 18

A polycarbonate was obtained by repeating the procedure of Reference Example 2 and Synthesis Example 8, except that 72.4 g (0.1 mole) of a bisphenol compound having a styrylamine skeleton represented by the following structural formula:

Structural Formula

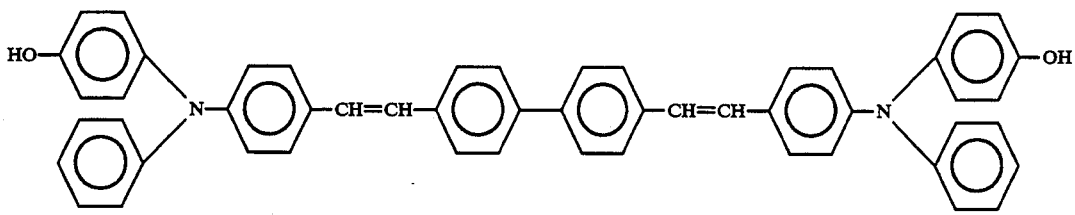

and 19 g (0.1 mole) of a 1, 4-bis(4-hydroxyphenyl) butane in place of 1, 1-bis(4-hydroxyphenyl) cyclohexane were used. This polycarbonate was found to have a $[\eta_{sp}/c]$ of 0.71 dl/g as determined in a solution having a concentration of 0.5 g/dl of the polycarbonate with the methylene chloride as the solvent at 20° C. The Mw was measured by the GPC with the resultant finding of 31000.

The structure and composition of this polymer were determined with the results of the analysis of the spectrum each of the $^1$H-NMR, IR and MS, with the resultant finding that the polymer was a polycarbonate copolymer having the following repeating unit and composition:

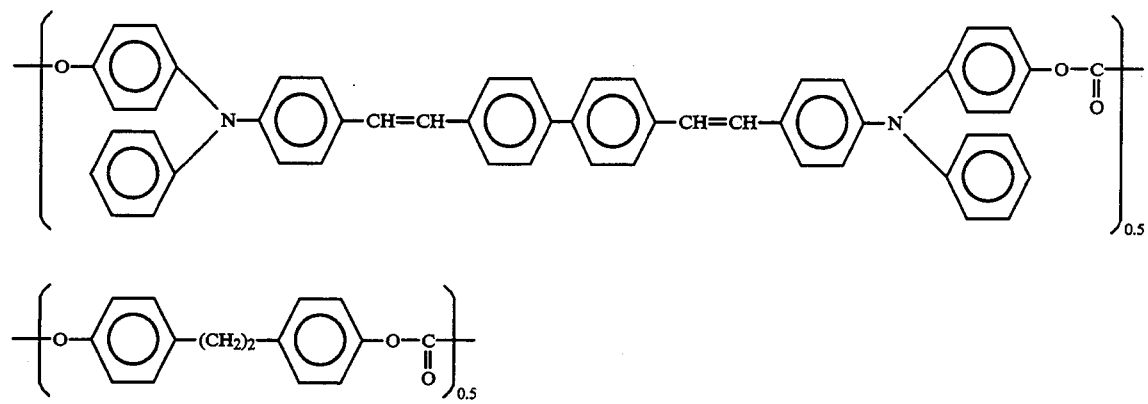

SYNTHESIS EXAMPLE 19

A polycarbonate was obtained by repeating the procedure of Reference Example 2 and Synthesis Example 8, except that 72.4 g (0.1 mole) of a bisphenol compound having a styrylamine skeleton represented by the following structural formula:

Structural Formula

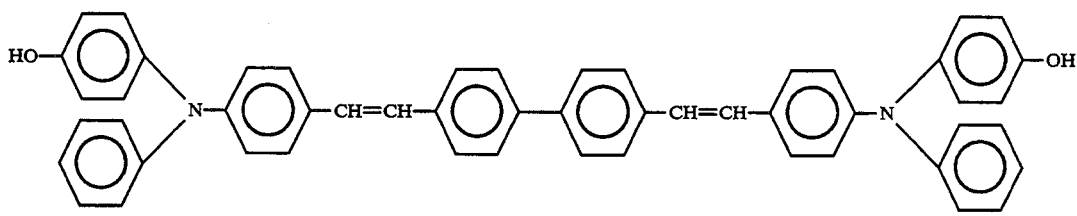

and 34.4 g (0.1 mole) of a 1, 1-bis(4-hydroxyphenyl) cyclohexane were used. This polycarbonate was found to have a $[\eta_{sp}/c]$ of 0.65 dl/g as determined in a solution having a concentration of 0.5 g/dl of the polycarbonate with the methylene chloride as the solvent at 20° C. The Mw was measured by the GPC with the resultant finding of 25000.

The structure and composition of this polymer were determined with the results of the analysis of the spectrum each of the $^1$H-NMR, IR and MS, with the resultant finding that the polymer was a polycarbonate copolymer having the following repeating unit and composition:

8, except that 72.4 g (0.1 mole) of a bisphenol compound having a styrylamine skeleton represented by the following structural formula:

Structural Formula

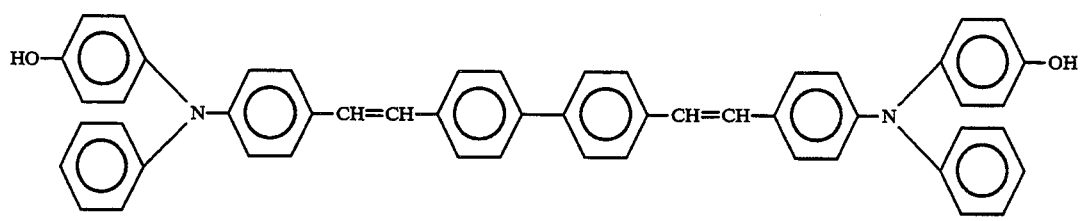

and 18.6 g (0.1 mole) of a 4, 4'-biphenyl in place of 1, 1-bis(4-hydroxyphenyl) cyclohexane were used. This polycarbonate was found to have a $[\eta_{sp}/c]$ of 0.68 dl/g as determined in a solution having a concentration of 0.5 g/dl of the polycarbonate with the methylene chloride as the solvent at 20° C. The Mw was measured by the GPC with the resultant finding of 29000.

The structure and composition of this polymer were determined with the results of the analysis of the spectrum each of the $^1$H-NMR, IR and MS, with the resul-

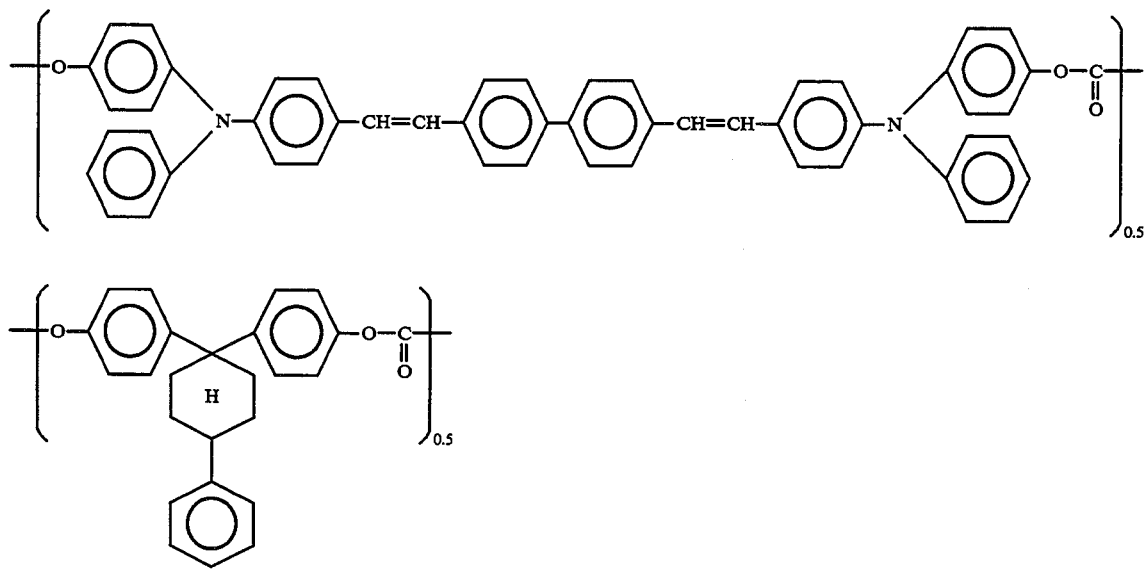

SYNTHESIS EXAMPLE 20

A polycarbonate was obtained by repeating the procedure of Reference Example 2 and Synthesis Example tant finding that the polymer was a polycarbonate copolymer having the following repeating unit and composition:

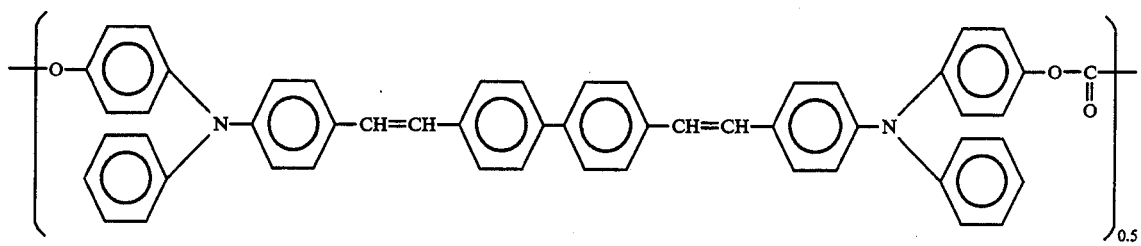

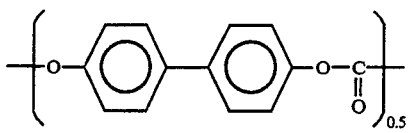

SYNTHESIS EXAMPLE 21

A polycarbonate was obtained by repeating the procedure of Reference Example 2 and Synthesis Example 8, except that 75.2 g (0.2 mole) of a bisphenol compound having a styrylamine skeleton represented by the following structural formula:

Structural Formula

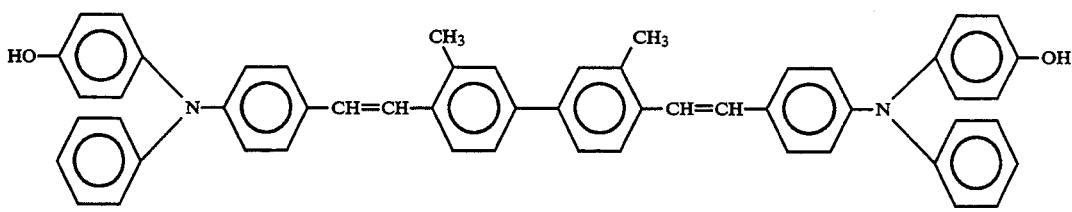

and 21.6 g (0.1 mole) of a 2, 2-bis(4-hydroxyphenyl) propane in place of 1, 1-bis(4-hydroxyphenyl) cyclohexane were used. This polycarbonate was found to have a $[\eta_{sp}/c]$ of 0.68 dl/g as determined in a solution having a concentration of 0.5 g/dl of the polycarbonate with the methylene chloride as the solvent at 20° C. The Mw was measured by the GPC with the resultant finding of 25000.

The structure and composition of this polymer were determined with the results of the analysis of the spectrum each of the $^1$H-NMR, IR and MS, with the resultant finding that the polymer was a polycarbonate copolymer having the following repeating unit and composition:

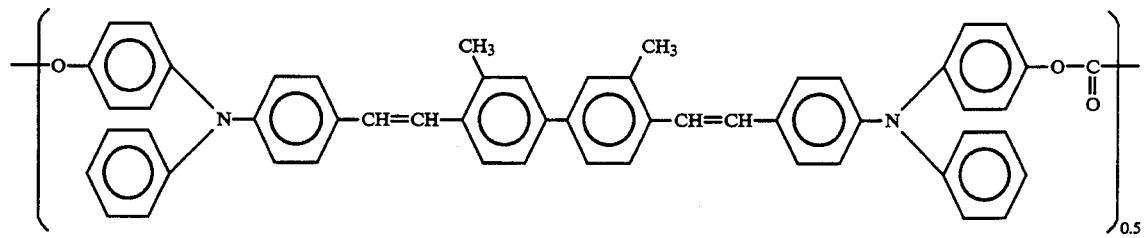

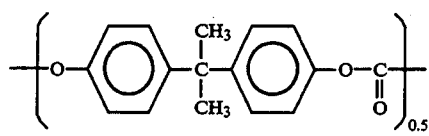

SYNTHESIS EXAMPLE 22

A polycarbonate was obtained by repeating the procedure of Reference Example 2 and Synthesis Example 8, except that 61.8 g (0.1 mole) of a bisphenol compound having a styrylamine skeleton represented by the following structural formula:

Structural Formula

-continued

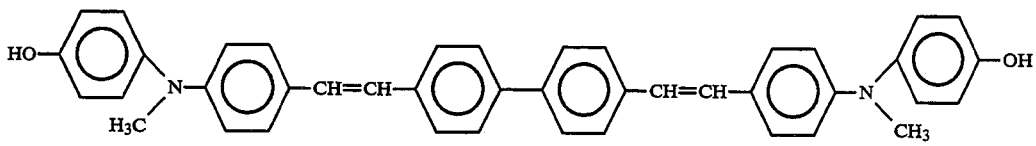

and 21.6 g (0.1 mole) of a 2, 2-bis(4-hydroxyphenyl) propane in place of 1, 1-bis(4-hydroxyphenyl) cyclohexane were used. This polycarbonate was found to have a Structural Formula

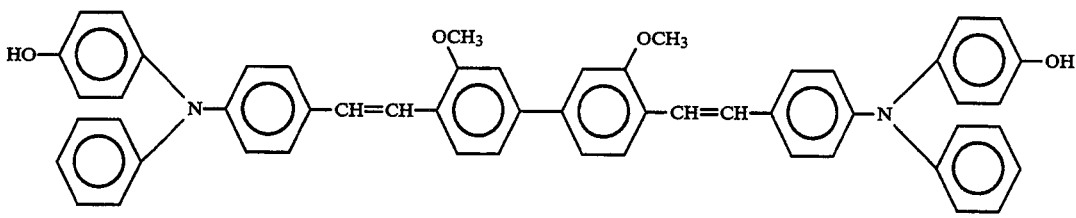

$[\eta_{sp}/c]$ of 0.85 dl/g as determined in a solution having a concentration of 0.5 g/dl of the polycarbonate with the methylene chloride as the solvent at 20° C. The Mw was measured by the GPC with the resultant finding of 34000.

The structure and composition of this polymer were determined with the results of the analysis of the spectrum each of the $^1$H-NMR, IR and MS, with the resultant finding that the polymer was a polycarbonate copolymer having the following repeating unit and composition:

8, except that 78.4 g (0.1 mole) of a bisphenol compound having a styrylamine skeleton represented by the following structural formula:

and 4.6 (0.1 mole) of a 2, 2-bis(4-hydroxyphenyl) propane in place of 1, 1-bis(4-hydroxyphenyl) cyclohexane were used. This polycarbonate was found to have a $[\eta_{sp}/c]$ of 0.59 dl/g as determined in a solution having a concentration of 0.5 g/dl of the polycarbonate with the methylene chloride as the solvent at 20° C. The Mw was measured by the GPC with the resultant finding of 20000.

The structure and composition of this polymer were determined with the results of the analysis of the spectrum each of the $^1$H-NMR, IR and MS, with the resul-

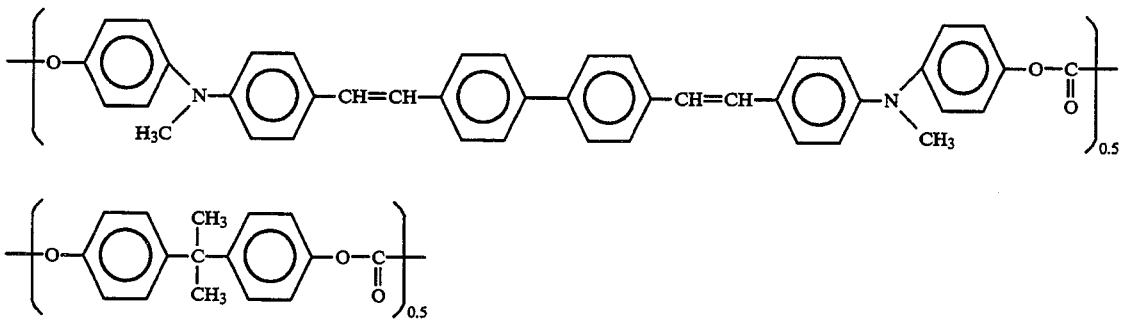

SYNTHESIS EXAMPLE 23

A polycarbonate was obtained by repeating the procedure of Reference Example 2 and Synthesis Example tant finding that the polymer was a polycarbonate copolymer having the following repeating unit and composition:

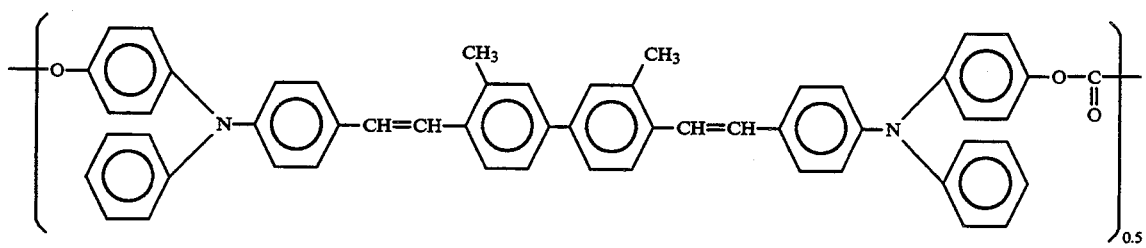

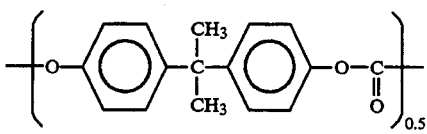

EXAMPLE 9

A transparent supporting substrate was provided in the form of a 25 mm×75 mm×1.1 mm glass substrate over which a film having a thickness of 100 nm was formed from an ITO according to the vapor deposition process (supplied by HOYA). Previously this substrate was washed with an ultrasonic wave in isopropyl alcohol, dried by blowing nitrogen gas and further washed with UV ozone (UV 300 supplied by Samco International) for 8 minutes.

A luminescence layer was laid on this transparent supporting substrate by coating a 0.9 wt. % solution obtained by dissolving 200 mg of the polycarbonate of Synthesis Example 10 in 20 g of a 1, 2-dichloroethane according to the spin coating process. The spin coating was carried out in 7000 rPm for 50 seconds, resulting in a film having a thickness of 600±50Å*1 (surface profile detector: DEKTAK 3030 supplied by Sloan Co.). This luminescence layer was very excellent in the thin film properties and further it was expected that a good organic EL device could be made from this luminescence layer. Then, this transparent supporting substrate was set to the substrate holder of a commercially available vacuum deposition system comprising 3 resistance heating boats (supplied by Japan Vacuum Technique Co., Ltd.) Placed in one boat was 200 mg of a PBD as the electron injecting material. 2 g of a magnesium was placed in another boat and 200 mg of a silver in still another boat and then the vacuum chamber was depressurized to $2\times10^{-3}$ Pa. Then, the boat containing PBD was heated to deposit the PBD at a deposition rate of 0.3 to 0.5 nm/sec and provide an electron injecting layer comprising a film having a thickness of 20 nm on the transparent supporting substrate. In this process, the substrate was maintained at room temperature.

*1: The film was examined by an optical microscope 3 months later, with the resultant finding that no recognizable changes in the thin film and crystallization were present and the film remained as it should be.

Thereafter, the boat containing magnesium and the boat containing silver were electrified simultaneously to deposit them while keeping a ratio of one rate of deposition to another rate of deposition (magnesium: silver) at 1:7 to 1:10. Thus, obtained was an opposed electrode comprising the magnesium and silver which were deposed in the form of a laminate having a thickness of 120 nm (detected by a quartz oscillator sensor). In this way, the desired organic EL device was completed.

Then, the so obtained organic EL device was applied with a DC voltage of 6V, resulting in the passage of an electric current of 70 mA/cm$^2$ to luminesce in Blue green as determined by the chromaticity coordinates. The peak wavelength as determined by the spectrometry was 483 nm and the brightness was 1200 cd/cm$^2$.

REFERENCE EXAMPLE 3

A phosphonate represented by the following structural formula:

Structural Formula

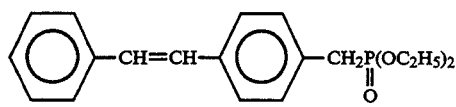

was dissolved in 20 ml of a dimethylsulfoxide (DMSO) in an atmosphere of argon gas and 1.0 g of a potassium-t-butoxide (t-BuOK) was added thereto. Then, a compound represented by the following structural formula:

Structural Formula

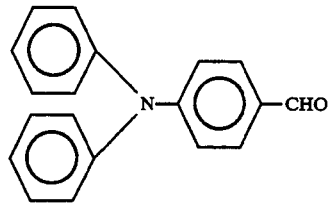

was added thereto and the resultant mixture was stirred for 5 hours. 100 ml of a methanol was added to the so obtained reaction product and a yellow powder was precipitated. An iodine-containing benzene solution was added to this powder for recrystallization and 0.9 g of a yellowish powder was obtained.

The structure and composition of the so obtained yellowish powder were analyzed according to the spectrum of the proton magnetic resonance ($^1$H-NMR), and as the result it was found that the power was a styrylamine compound represented by:

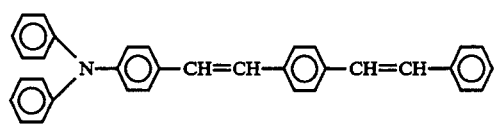

By repeating the procedure of Example 9, a 0.9 wt. % solution obtained by dissolving 20 mg of this compound in 20 g of a dichloromethane was coated on the transparent supporting substrate according to the spin coating process. The spin coating was carried out in 7000 rPm for 50 seconds. The obtained film was measured by said DEKTAK 3030, with the resultant finding that the thin film had a markedly uneven thickness of 600±400Å.

Ordinarily, a film cannot be formed from a single member of a low molecular weight organic substance having such marked unevenness and the material can by no means be used either as a luminescence layer or as a hole injecting layer.

COMPARATIVE EXAMPLE 3

An organic EL device was prepared by repeating the procedure of Example 9, except that the styrylamine compound obtained in Reference Example 3 was used as the emitting layer (a film at a thickness of 60 nm).

The organic EL device had an ITO electrode as the anode and a mixed metal electrode of magnesium and silver as the cathode and was applied with a DC voltage of 7V and as the result it was found that the device was shortcircuited, incapable of emitting EL.

EXAMPLE 10

A polycarbonate was synthesized by repeating the procedure of Example 9. Then, a hole injecting layer was prepared on the transparent supporting substrate by coating a 0.9 wt. % solution obtained by dissolving 200 mg of the above polycarbonate in 20 g of a dichloromethane according to the spin coating process. The spin coating was carried out in 7000 rpm for 50 seconds, resulting in a film at a thickness of 600±100Å (surface profile detector: DEKTAK 3030 supplied by Sloan Co.). Then, this transparent supporting substrate was set to the substrate holder of a commercially available vacuum deposition system comprising 3 resistance heating boats (supplied by Japan Vacuum Technique Co., Ltd.) Placed in one boat was an aluminum complex (Alq, 200 mg) in which a 8-hydroxyquinoline as an emitting material was coordinated at (III). A magnesium (2 g) was placed in another boat and a silver (200 mg) in still another boat and then the vacuum chamber was depressurized to $10^{-3}$ Pa. Then, the boat containing Alq was heated to 250° to 270° C. to deposit the Alq at a deposition rate of 0.1 to 0.3 nm/sec and provide an electron transferring luminescence layer comprising a film at a thickness of 50 nm on the transparent supporting substrate. In this process, the substrate was maintained at room temperature.

Thereafter, the boat containing magnesium and the boat containing silver were electrified simultaneously to deposit them while keeping the ratio of one rate of deposition to another rate of deposition (magnesium:silver) at 1:7 to 1:10. Thus, obtained was an opposed electrode comprising the magnesium and silver which were deposited at a thickness of 120 nm (detected by a quartz oscillating sensor). In this way, the desired organic EL device was completed.

The so obtained organic EL device had an ITO electrode as the anode and a mixed metal electrode of magnesium and silver as the cathode and was applied with a DC voltage of 7V, resulting in the passage of an electric current of approximately 50 mA/cm² to emit EL in green as determined by the chromaticity coordinates. The peak wavelength as determined by the spectrometry was 513 nm and the brightness was 1000 cd/cm².

COMPARATIVE EXAMPLE 4

An organic EL device was prepared by repeating the procedure of Example 10, except that the hole injecting layer comprising the polycarbonate layer was not incorporated into the device.

The organic EL device had an ITO electrode as the anode and a mixed metal electrode of magnesium and silver as the cathode and was applied with a DC voltage of 17V, resulting in the passage of an electric current of approximately 20 mA/cm² to emit EL in green as determined by the chromaticity coordinates. The peak wavelength as determined by the spectrometry was 513 nm and the brightness was 20 cd/m². This device required a markedly high voltage but had low brightness, emphasizing that the polycarbonate layer had worked as a hole injecting layer perfectly in Example 2.

EXAMPLES 11 TO 25

The organic EL devices were prepared by using the polycarbonates listed in Table 2 as the emitting layer and repeating the procedure of Example 9. The results obtained with them are given in Table 2. Those devices were found to have sufficiently high brightness and high luminescence efficiency in colors wherein it is difficult for the conventional EL emitting layers to work.

TABLE 2

| Example No. | Polycarbonates | Voltage (V) | Current (mA/cm²) |
|---|---|---|---|
| 11 | Synthesis Example. 1 | 9 | 50 |
| 12 | Synthesis Example. 2 | 7 | 70 |
| 13 | Synthesis Example. 3 | 7 | 40 |
| 14 | Synthesis Example. 4 | 7 | 70 |
| 15 | Synthesis Example. 5 | 8 | 70 |
| 16 | Synthesis Example. 6 | 9 | 60 |
| 17 | Synthesis Example. 8 | 9 | 45 |
| 18 | Synthesis Example. 9 | 10 | 60 |
| 19 | Synthesis Example. 10 | 12 | 35 |
| 20 | Synthesis Example. 11 | 8 | 40 |
| 21 | Synthesis Example. 12 | 9 | 75 |
| 22 | Synthesis Example. 13 | 10 | 80 |
| 23 | Synthesis Example. 14 | 7 | 90 |
| 24 | Synthesis Example. 15 | 8 | 25 |
| 25 | Synthesis Example. 16 | 9 | 30 |

| Example No. | Colors of Luminescence | Brightness (cd/m²) | Luminescence Eff. (l m/W) |
|---|---|---|---|
| 11 | Green | 1200 | 0.8 |
| 12 | Greenish blue | 250 | 0.2 |
| 13 | Green | 1000 | 1.1 |
| 14 | Bluish green | 600 | 0.4 |
| 15 | Blue | 400 | 0.2 |
| 16 | Blue | 500 | 0.3 |
| 17 | Green | 800 | 0.6 |
| 18 | Green | 450 | 0.2 |
| 19 | Green | 150 | 0.1 |
| 20 | Green | 600 | 0.6 |
| 21 | Green | 800 | 0.4 |
| 22 | Green | 1000 | 0.4 |
| 23 | Green | 400 | 0.2 |
| 24 | Bluish green | 500 | 0.8 |
| 25 | Green | 400 | 0.5 |

REFERENCE EXAMPLE 4

Synthesis of:

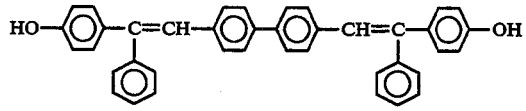

(1) Synthesis of an arylene group-containing phosphoric compound 9.0 g of a 4, 4'-bis(bromomethyl) biphenyl and 11 g of a triethyl phosphite were stirred on an oil bath at 140° C. for 6 hours in a stream of argon gas. Then, the excessive triethyl phosphite and an ethyl bromide formed as a byproduct were distilled away under reduced pressure. The residue was allowed to stand overnight and 9.5 g (yield: 80%) of white crystals was obtained. The crystals were found to have a melting point of 97.0° to 100.0° C. They were analyzed by the proton nuclear magnetic resonance (¹H-NMR, solvent: CDCl₃) and the results thereof are given below:

δ=7.0 to 7.6 ppm (m; 8H, biphenylene ring-H)

δ=4.0 ppm (q; 8H, ethoxy group methylene-CH)

δ=3.1 ppm (d; 4H, J=20 Hz($^{31}$P-$^1$H coupling)P-CH$_2$)

δ=1.3 ppm (t; 12H, ethoxy group methyl-CH$_3$)

It was confirmed from the above results that the product was an arylene group-containing phosphoric compound (phosphonate) represented by the following formula:

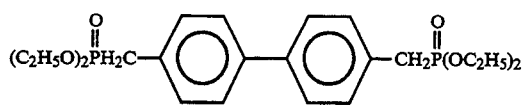

(2) Synthesis of:

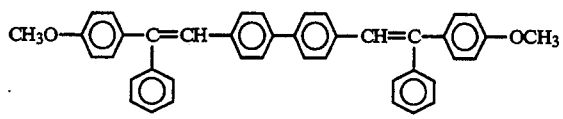

6.2 g (0.016 mole) of the phosphonate synthesized in (1) above, 3.6 g (0.03 mole) of a potassium-t-butoxide and 6.3 g (0.03 mole) of a 4-methoxybenzophenone were suspended in 100 ml of a dimethylsulfoxide anhydride and stirred at room temperature in an atmosphere of argon gas. The reaction product occurred as a red suspension. After 4 hours of stirring, 50 ml of methanol and 50 ml of water were added thereto and a yellow precipitate was formed. The precipitate was filtered and purified by the silica gel chromatography to obtain 3.2 g (yield: 40%) of a yellowish powder. The powder was analyzed by the proton nuclear magnetic resonance ($^1$H-NMR), with the resultant finding that it was the desired product.

(3) Synthesis of:

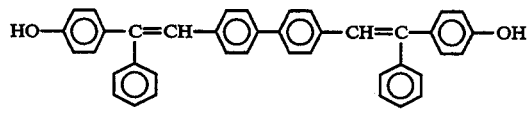

3.0 g (0.006 mole) of the compound obtained in (2) above was placed in a 200 ml flask equipped with a nitrogen tube and 50 ml of a methylene chloride was introduced thereto. The compound was dissolved in 50 ml of the methylene chloride while cooling the solution and 1.2 ml of a boron tribromide was slowly dropped into the solution. After the dropping was completed, the reaction solution was stirred at room temperature for 3 hours and again with cooling 50 ml of water in limited amounts was added thereto. The organic layer was washed with 50 ml of water thrice and dried with a sodium sulfate. After the sodium sulfate was filtered, the solvent was distilled away to obtain 3.0 g (yield: 90%) of the desired compound. The analysis with $^1$H-NMR resulted in the finding that the structure of the obtained compound was the structure of the desired product.

SYNTHESIS EXAMPLE 24

A solution obtained by dissolving 67.8 g (0.125 mole) of the dihydroxy compound synthesized in the same way as in Reference Example 4 and 28.5 g (0.125 mole) of a 2, 2-bis(4-hydroxyphenyl) propane in 600 ml of a 3N aqueous sodium hydroxide solution and 250 ml of a methylene chloride were placed in a 1 liter flask. The reaction solution was vigorously stirred while the temperature of the solution was kept close to 10° C. with external cooling and a phosgene was blown thereinto at a rate of 340 ml/min for 30 minutes.

Thereafter the stirring was continued for another 1 hour to complete the polymerization. After the reaction was over, the organic layer was diluted with 500 ml of the methylene chloride.

The diluted organic layer was washed with water, diluted hydrochloric acid and water in this order and introduced into a methanol to obtain a polycarbonate polymer.

The so obtained polymer was found to have a reduced viscosity [$\eta_{sp}/c$] of 0.89 dl/g as determined in a solution having a concentration of 0.5 g/dl of the polycarbonate with the methylene chloride as the solvent at 20° C.

The polymer was also analyzed with the spectrum each of the $^1$H-NMR and IR and the results thereof are given as follows:

$^1$H-NMR (Solvent: CD$_2$Cl$_2$). δ(ppm)=1.70 (6H, s). 6.8 to 7.5 (34H, m).

It was confirmed from the results of the NMR spectrum and the IR spectrum that this polymer comprised the following repeating unit and composition:

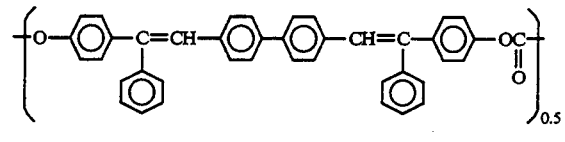

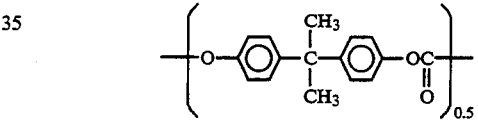

SYNTHESIS EXAMPLE 25

A dihydroxy compound represented

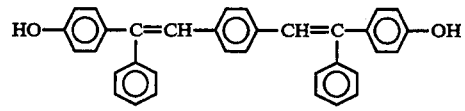

was obtained by repeating the procedure of Reference Example 4, except that

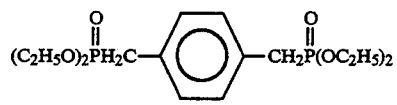

was used as a phosphonate.

A solution comprising 65.8 g (0.125 mole) of this dihydroxy compound having a diarylvinylene arylene skeleton and 33.5 g (0.125 mole) of a 1, 1-bis(4-hydroxyphenyl) cyclohexane and 250 ml of a methylene chloride were placed in a 1 liter flask. The reaction solution was vigorously stirred while the temperature of the solution was kept close to 10° C. with external cooling and phosgene was blown thereinto at a rate of 340 m/min for 30 minutes.

Thereafter the stirring was continued for 1 hour to complete the polymerization. After the reaction was over, the organic layer was diluted with 520 ml of the methylene chloride and the diluted organic layer was washed with water, diluted hydrochloric acid and water in this order and the product was introduced into methanol to obtain a polycarbonate polymer.

This polymer was found to have a $\eta_{sp}/c$ of 0.6 dl/g as determined in a solution having a concentration of 0.5 g/dl of the polycarbonate with the methylene chloride as the solvent at 20° C. The mean molecular weight (Mw) of the polymer was measured with the gel permeation chromatography (GPC), with the resultant finding of 25000.

The structure and composition of this polymer were determined with the result of the analysis of the spectrum as described above, with the resultant finding that the polymer was a polycarbonate copolymer having the following repeating unit and composition:

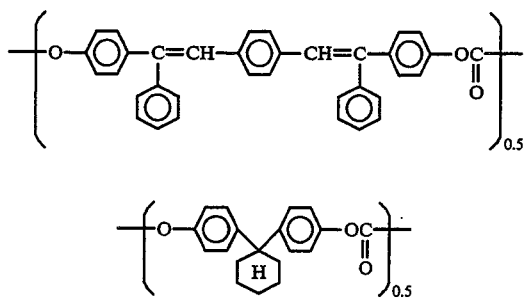

SYNTHESIS EXAMPLE 26

A polycarbonate polymer was obtained by repeating the procedure of Synthesis Example 24, except that 95.6 g (0.2 mole) of a dihydroxy compound having a diarylvinylene arylene skeleton represented by:

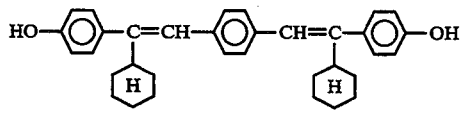

and 12.8 g (0.05 mole) of a 2, 2-bis(3-methyl-4-hydroxyphenyl) propane in place of 1, 1-bis(4-hydroxyphenyl) cyclopropane were used.

The so obtained polymer was found to have a $\eta_{sp}/c$ of 0.45 dl/g as determined in a solution having a concentration of 0.5 g/dl of the polycarbonate with the methylene chloride as the solvent at 20° C. The Mw of the polymer was measured by the GPC, with the resultant finding of 15000.

The structure and composition of the polymer were determined with the results of the analysis of the spectrum each of the $^1$H-NMR, IR and MS, with the resultant finding that this polymer was a polycarbonate copolymer having the following repeating unit and composition:

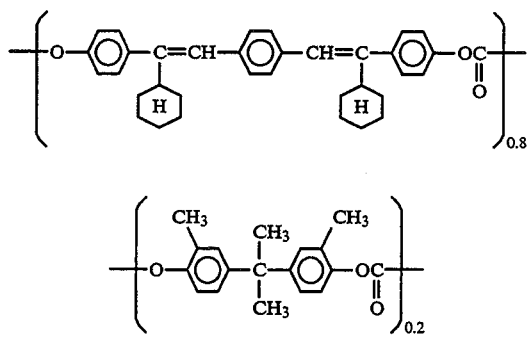

SYNTHESIS EXAMPLE 27

A polycarbonate polymer was obtained by repeating the procedure of Synthesis Example 24, except that 15.1 mole of a dihydroxy compound having a diarylvinylene arylene skeleton represented by:

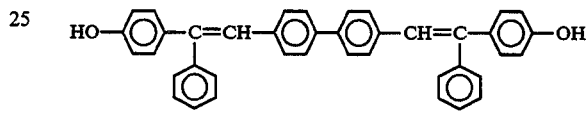

and 70.4 g (0.20 mole) of a 1, 1-bis(4-hydroxyphenyl)-1, 1-diphenylmethane in place of 1, 1-bis(4-hydroxyphenyl) cyclohexane were used.

The so obtained polymer was found to have a $\eta_{sp}/c$ of 0.75 dl/g as determined in a solution having a concentration of 0.5 g/dl of the polycarbonate with the methylene chloride as the solvent at 20° C. The Mw of the polymer was measured by the gel permeation chromatography (GPC), with the resultant finding of 28000.

The structure and composition of the polymer were determined with the results of the analysis of the spectrum each of the $^1$H-NMR, IR and MS with the resultant finding that this polymer was a polycarbonate copolymer having the following repeating unit and composition:

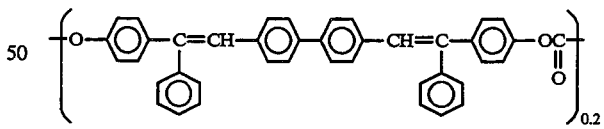

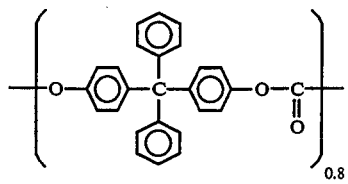

SYNTHESIS EXAMPLE 28

A polycarbonate polymer was obtained by repeating the procedure of Synthesis Example 24, except that 82.1 g (0.125 mole) of a dihydroxy compound having a diarylvinylene arylene skeleton represented by:

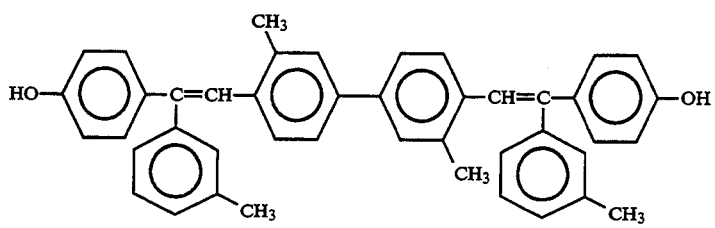

and 28.5 g (0.125 mole) of a 2, 2-bis(4-hydroxyphenyl) propane in place of 1, 1-bis(4-hydroxyphenyl) cyclohexane were used.

The so obtained polymer was found to have a $\eta_{sp}/c$ of 0.4 dl/g as determined in a solution having a concentration of 0.5 g/dl of the polycarbonate with the methylene chloride as the solvent at 20° C. The Mw of the polymer was measured by the GPC, with the resultant finding of 13000.

The structure and composition of the polymer were determined with the results of the analysis of the spectrum each of the ¹H-NMR, IR and MS with the resultant finding that this polymer was a polycarbonate copolymer having the following repeating unit and composition:

polymer having the following repeating unit and composition:

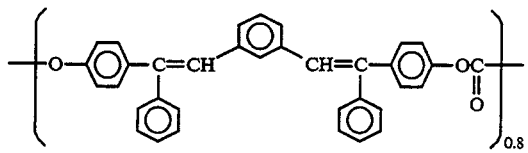

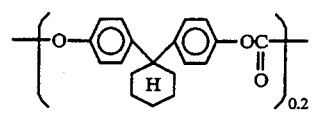

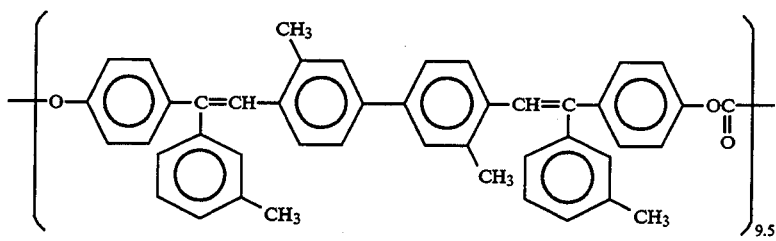

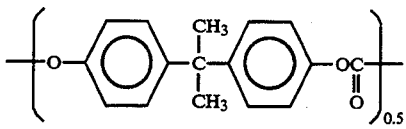

SYNTHESIS EXAMPLE 29

A polycarbonate polymer was obtained by repeating the procedure of Synthesis Example 24, except that 71.2 g (0.2 mole) of a dihydroxy compound having a diarylvinylene arylene skeleton represented by:

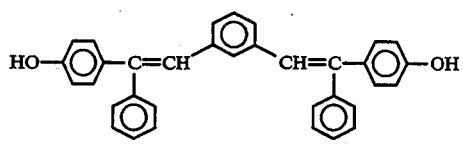

and 13.4 g (0.05 mole) of a 1, 1-bis(4-hydroxyphenyl) cyclohexane were used. The so obtained polymer was found to have a $\eta_{sp}/c$ of 0.79 dl/g as determined in a solution having a concentration of 0.5 g/dl of the polycarbonate with the methylene chloride as the solvent at 20° C. The Mw of the polymer was measured by the GPC, with the resultant finding of 32000.

The structure and composition of the polymer were determined with the results of the analysis of the spectrum each of the ¹H-NMR, IR and MS with the resultant finding that this polymer was a polycarbonate co-

SYNTHESIS EXAMPLE 30

A polycarbonate polymer was obtained by repeating the procedure of Synthesis Example 24, except that 13.7 g (0.05 mole) of a dihydroxy compound having a diarylvinylene arylene skeleton represented by:

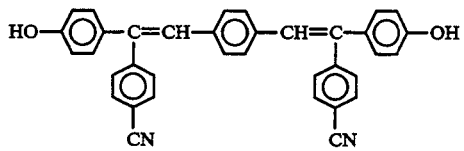

and 70.4 g (0.20 mole) of a 1, 1-bis(4-hydroxyphenyl)-1, 1-diphenylmethane in place of 1, 1-bis(4-hydroxyphenyl) cyclohexane were used.

The so obtained polymer was found to have a $\eta_{sp}/c$ of 0.4 dl/g as determined in a solution having a concentration or 0.5 g/dl of the polycarbonate with the methylene chloride as the solvent at 20° C. The Mw of the polymer was measured by the GPC, with the resultant finding of 18000.

The structure and composition of the polymer were determined with the results of the analysis of the spectrum each of the ¹H-NMR, IR and MS, with the resultant finding that this polymer was a polycarbonate copolymer having the following repeating unit and composition:

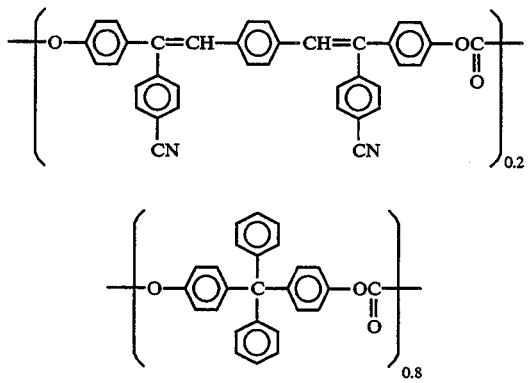

SYNTHESIS EXAMPLE 31

A polycarbonate polymer was obtained by repeating the procedure of Synthesis Example 24, except that 74.4 g (0.2 mole) of a dihydroxy compound having a diarylvinylene arylene skeleton represented by:

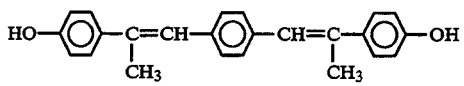

and 44.6 g (0.2 mole) of a 2, 2-bis(3-methyl-4-hydroxyphenyl) propane in place of 1, 1-bis(4-hydroxyphenyl) cyclohexane were used.

The so obtained polymer was found to have a $\eta_{sp}/c$ of 0.7 dl/g as determined in a solution having a concentration of 0.5 g/dl of the polycarbonate with the methylene chloride as the solvent at 20° C. The Mw of the polymer was measured by the GPC, with the resultant finding of 32000.

The structure and composition of the polymer were determined with the results of the analysis of the spectrum each of the ¹H-NMR, IR and MS with the resultant finding that this polymer was a polycarbonate copolymer having the following repeating unit and composition:

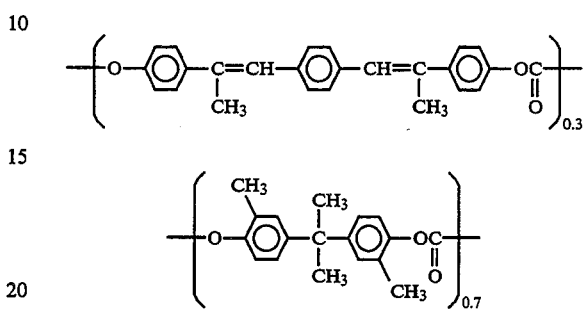

SYNTHESIS EXAMPLE 32

A polycarbonate polymer was obtained by repeating the procedure of Synthesis Example 24, except that 122.25 g (0.125 mole) of a dihydroxy compound having a diarylvinylene arylene skeleton represented by:

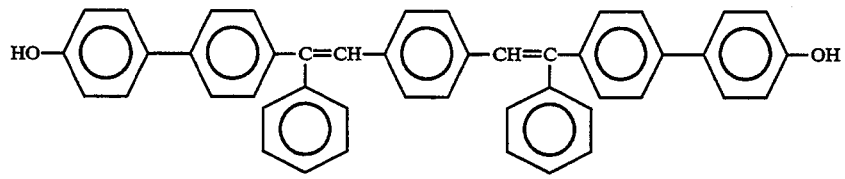

and 32.25 g (0.125 mole) of a 2, 2-bis(3-methyl-4-hydroxyphenyl) propane in place of 1, 1-bis(4-hydroxyphenyl) cyclohexane were used.

The so obtained polymer was found to have a $\eta_{sp}/c$ of 0.6 dl/g as determined in a solution having a concentration of 0.5 g/dl of the polycarbonate with the methylene chloride as the solvent at 20° C. The Mw of the polymer was measured by the GPC, with the resultant finding of 24000.

The structure and composition of the polymer were determined with the results of the analysis of the spectrum each of the ¹H-NMR, IR and MS with the resultant finding that this polymer was a polycarbonate copolymer having the following repeating unit and composition:

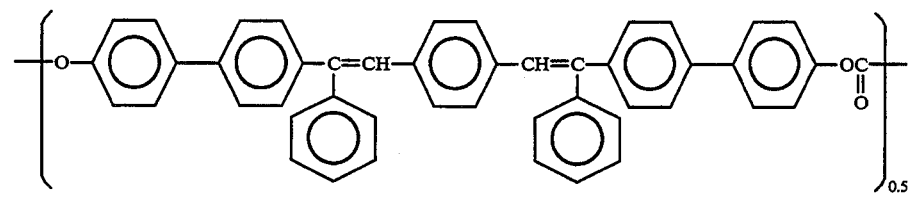

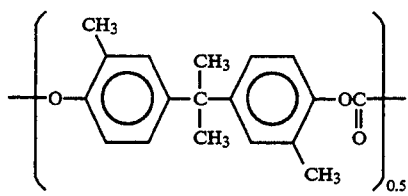

SYNTHESIS EXAMPLE 33

A polycarbonate polymer was obtained by repeating the procedure of Synthesis Example 24, except that 109.5 g (0.125 mole) of a dihydroxy compound having a diarylvinylene arylene skeleton represented by:

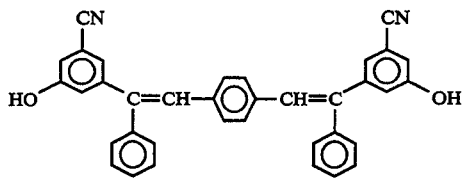

and 32.25 g (0.125 mole) of a 2, 2-bis(3-methyl-4-hydroxyphenyl) propane in place of 1, 1-bis(4-hydroxyphenyl) cyclohexane were used.

The so obtained polymer was found to have a $\eta_{sp}/c$ of 0.4 dl/g as determined in a solution having a concentration of 0.5 g/dl of the polycarbonate with the methylene chloride as the solvent at 20° C. The Mw of the polymer was measured by the GPC, with the resultant finding of 13000.

The structure and composition of the polymer were determined with the results of he analysis of the spectrum each of the $^1$H-NMR, IR and MS with the resultant finding that this polymer was a polycarbonate copolymer having the following repeating unit and composition:

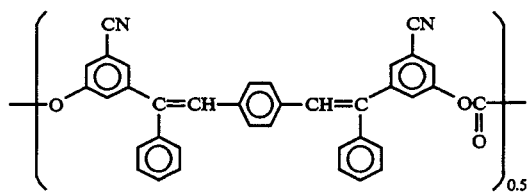

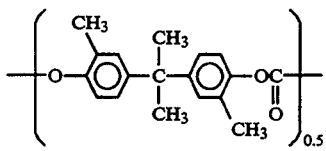

SYNTHESIS EXAMPLE 34

A polycarbonate polymer was obtained by repeating the procedure of Synthesis Example 24, except that 107 g (0.125 mole) of a dihydroxy compound having a diarylvinylene arylene skeleton represented by:

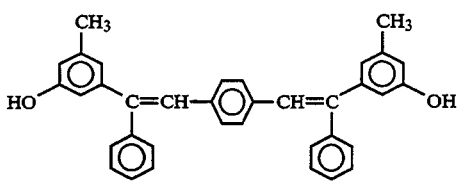

and 25.3 g (0.125 mole) of a bis(4-hydroxyphenyl) ether in place of 1, 1-bis(4-hydroxyphenyl) cyclohexane were used. The so obtained polymer was found to have a $\eta_{sp}/c$ of 0.61 dl/g as determined in a solution having a concentration of 0.5 g/dl of the polycarbonate with the methylene chloride as the solvent at 20° C. The Mw of the polymer was measured by the GPC, with the resultant finding of 21000.

The structure and composition of the polymer were determined with the results of the analysis of the spectrum each of the $^1$H-NMR, IR and MS with the resultant finding that this polymer was a polycarbonate copolymer having the following repeating unit and composition:

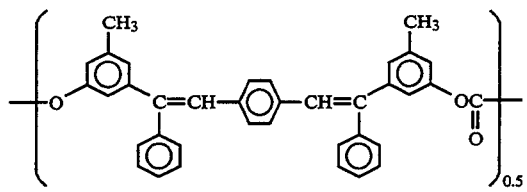

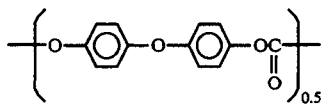

SYNTHESIS EXAMPLE 35

A polycarbonate polymer was obtained by repeating the procedure of Synthesis Example 24, except that 122.3 g (0.125 mole) of a dihydroxy compound having a diarylvinylene arylene skeleton represented by:

and 25.25 g (0.125 mole) of a 1, 2-bis(4-hydroxyphenyl) ethane in place of 1, 1-bis(4-hydroxyphenyl) cyclohexane were used.

The so obtained polymer was found to have a $\eta_{sp}/c$ of 0.45 dl/g as determined in a solution having a concentration of 0.5 g/dl of the polycarbonate with the methylene chloride as the solvent at 20° C. The Mw of the polymer was measured by the GPC, with the resultant finding of 15000.

The structure and composition of the polymer were determined with the results of the analysis of the spectrum, each of the $^1$H-NMR, IR and MS with the resultant finding that this polymer was a polycarbonate copolymer having the following repeating unit and composition:

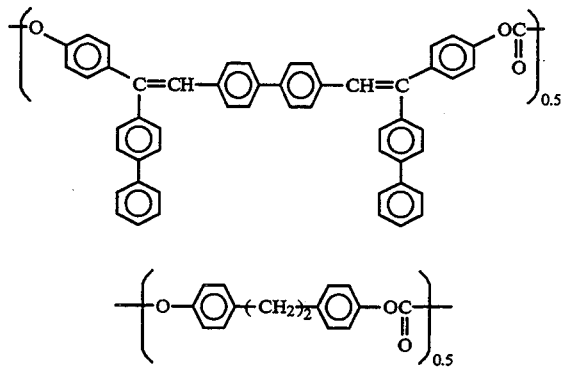

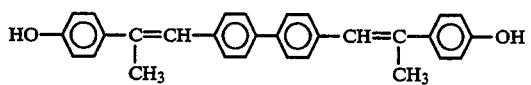

SYNTHESIS EXAMPLE 36

A polycarbonate polymer was obtained by repeating the procedure of Synthesis Example 24, except that 87.75 g (0.125 mole) of a dihydroxy compound having a diarylvinylene arylene skeleton represented by:

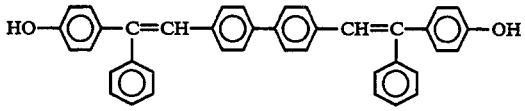

and 26.75 g (0.125 mole) of a 4, 4'-dihydroxyphenyl in place of 1, 1-bis(4-hydroxyphenyl) cyclohexane were used.

The so obtained polymer was found to have a $\eta_{sp}/c$ of 0.65 dl/g as determined in a solution having a concentration of 0.5 g/dl of the polycarbonate with the methylene chloride as the solvent at 20° C. The Mw of the polymer was measured by the GPC, with the resultant finding of 26000.

The structure and composition of the polymer were determined with the results of the analysis of the spectrum each of the $^1$H-NMR, IR and MS with the resultant finding that this polymer was a polycarbonate copolymer having the following repeating unit and composition:

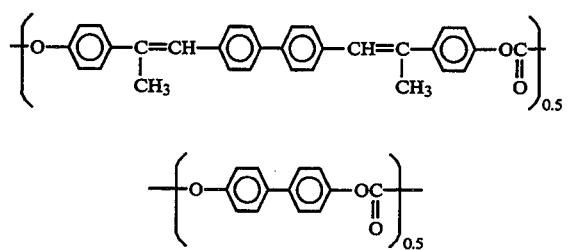

SYNTHESIS EXAMPLE 37

A polycarbonate polymer was obtained by repeating the procedure of Synthesis Example 24, except that 103 g (0.125 mole) of a dihydroxy compound having a diarylvinylene arylene skeleton represented by:

and 31.7 g (0.125 mole) of a 3, 3-bis(hydroxyphenyl) pentane in place of 1, 1-bis(4-hydroxyphenyl) cyclohexane were used.

The so obtained polymer was Found to have a $\eta_{sp}/c$ of 0.45 dl/g as determined in a solution having a concentration of 0.5 g/dl of the polycarbonate with the methylene chloride as the solvent at 20° C. The Mw of the polymer was measured by the GPC, with the resultant finding of 17000.

The structure and composition of the polymer were determined with the results of the analysis of the spectrum each of the $^1$H-NMR, IR and MS with the resultant finding that this polymer was a polycarbonate copolymer having the following repeating unit and composition:

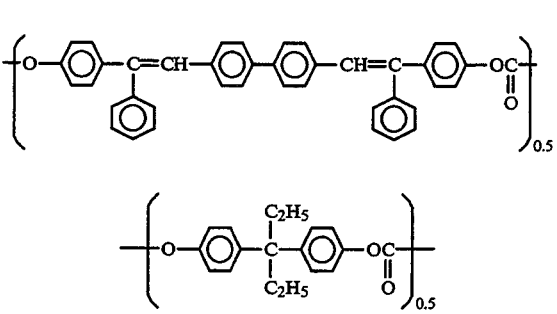

EXAMPLE 26

A transparent supporting substrate was provided in the form of a 25 mm×75 mm×1.1 mm glass substrate over which a film having a thickness of 100 nm was formed from an ITO according to the vapor deposition method (supplied by HOYA Co., Ltd.). Previously this substrate was washed with an ultrasonic wave in an isopropyl alcohol, dried by blowing nitrogen gas and further washed in a UV ozone (UV300 supplied by Samco International) for 8 minutes.

An emitting layer was laid over this transparent supporting substrate by coating a 0.9 wt. % solution obtained by dissolving 200 mg of the polycarbonate of Synthesis Example 25 in 20 g of a dichloromethane according to the spin coating method. This spin coating was carried out in 7000 rpm for 50 seconds, resulting in a film at a thickness of 600±150Å[*1] (surface profile detector: DEKTAK 3030 supplied by Sloan Co.). Then, the transparent supporting substrate was set to the substrate holder of a commercially available vacuum deposition system (supplied by Nihon Vacuum Technique Co., Ltd.) having 3 resistance heating boats. Placed in one boat was PBD (200 mg) as the electron injecting material. A magnesium (2 g) was placed in another boat and a silver (200 mg) in still another boat and then the vacuum chamber was depressurized to $2 \times 10^{-3}$ Pa. Thereafter, the boat containing PBD was heated to deposit the PBD at a deposition rate of 0.3 to 0.5 nm/sec. and provide an electron injecting layer comprising a film at a thickness of 20 nm on the transparent supporting substrate. In this process, the substrate was maintained at room temperature.

*1: The film was examined by an optical microscope 5 months later, with the resultant finding that no recognizable crystals were present and the film remained as it should be.

Thereafter, the boat containing the magnesium and the boat containing the silver were electrified simultaneously to deposit both materials while keeping the ratio of one rate of deposition to another rate of deposition (magnesium:silver) at 1:7 to 1:10. Thus, obtained was an opposed electrode comprising the magnesium and silver which were deposited at a thickness of 120 nm (detected by a quartz oscillating sensor). In this way, the desired organic EL device was completed.

Then, the so obtained organic EL device was applied with a DC voltage of 6V, resulting in the passage of an electric current of approximately 75 mA/cm$^2$ to emit EL in Blue Green as determined by the chromaticity coordinates. The peak wavelength as determined by the spectrometry was 485 nm and the brightness was 350 cd/m$^2$.

REFERENCE EXAMPLE 5

A sulfonate represented by the following structural formula:
Structural Formula

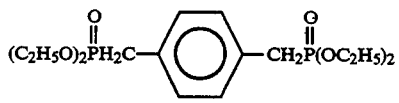

was dissolved in 20 ml of a dimethyl sulfoxide (DMSO) in an atmosphere of argon gas and 1.0 g of a potassium-t-butoxide (t-BuOK) was added thereto. Then, a compound represented by the following structural formula:-
Structural Formula

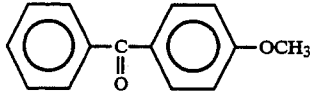

was added and the resultant mixture was stirred for 5 hours. 100 ml of a methanol was added to the reaction product and then a yellowish power was precipitated. A benzene solution containing an iodine was added to recrystallize this powder and 0.8 g of a yellowish powder was obtained. The structure and composition of the so obtained powder was analyzed by the $^1$H-NMR, with the resultant finding that it was a dihydroxy compound represented by:

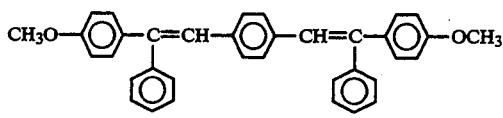

A 0.9 wt. % solution obtained by dissolving 200 mg of this compound in 20 g of a dichloromethane was coated on a transparent supporting substrate according to the spin coating method and by repeating the procedure of Example 26. In this process, the spin coating was carried out in 7000 rPm for 50 seconds, resulting in a film having a thickness of 600±500Å as determined by said DEKTAK 3030 which means a quite uneven thin film.

Ordinarily, a film cannot be formed from a single member of an organic low molecular weight substance having marked unevenness according to the spin coating method and the substance can by no means be used either as a luminescent layer or as a hole injecting layer.

COMPARATIVE EXAMPLE 5

A compound having a diarylvinylene arylene skeleton represent by:

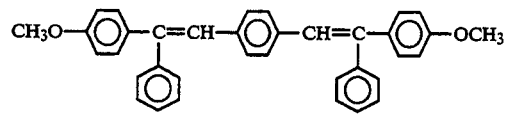

was synthesized by repeating the procedure of Reference Example 5.

Furthermore, an organic EL device was prepared by repeating the procedure of Example 26, except that the above compound was used as the emitting layer (in a film at a thickness of 50 nm).

The organic EL device had an ITO electrode as the anode and a mixed metal electrode of magnesium and silver as the cathode and was applied with a DC voltage of 10V and it was found that the device was short-circuited, incapable of emitting EL. This is explained by the fact that the thin film could not be formed from the low molecular weight compound to cause the shortcircuit in the device.

EXAMPLE 27

A polycarbonate was obtained by repeating the procedure of Example 26. Then, a hole injecting layer was provided by coating a 0.9 wt. % solution obtained by dissolving 200 mg of the above polycarbonate in 20 g of a dichloromethane according to the spin coating method. This spin coating was carried out in 7000 rpm for 50 seconds, resulting in a film at a thickness of 600±150Å (surface profile detector: DEKTAK 3030). Thereafter, the transparent supporting substrate was set to the substrate holder of a commercially available vacuum deposition system (supplied by Nihon Vacuum Technique Co., Ltd.) having 3 resistance heating boats. Placed in one boat was an aluminum complex (Alq, 200 mg) wherein a 8-hydroxyquinoline was coordinated at (III) as the luminescence material. A magnesium (2 g) was placed in another boat and a silver (200 mg) in still another boat and then the vacuum chamber was depressurized to $10^{-3}$ Pa. Thereafter, the boat containing Alq was heated to 250° to 270° C. to deposit the Alq at a deposition rate of 0.1 to 0.3 nm/sec. and provide an electron transferring emitting layer comprising a 50 nm thick film on the transparent supporting substrate. In this process, the substrate was maintained at room temperature.

Next, the boat containing the magnesium and the boat containing the silver were electrified simultaneously to deposit both the materials while keeping the ratio of one rate of deposition to another rate of deposition (magnesium:silver) at 1:7 to 1:10. Thus, obtained was an opposed electrode, comprising the magnesium and silver which were deposited at a thickness of 120 nm (detected by a quartz oscillating sensor). In this way, the desired organic EL device was completed.

The so obtained organic EL device had an ITO electrode as the anode and a mixed metal electrode of magnesium and silver as the cathode and was applied with a DC voltage of 12V, resulting in the passage of an electric current of approximately 76 mA/cm² to emit EL in green as determined by the chromaticity coordinates. The peak wavelength as determined by the spectrometry was 513 nm and the brightness was 1000 cd/m².

COMPARATIVE EXAMPLE 6

An organic EL device was prepared by repeating the procedure of Example 2, except that the hole injecting layer comprising the polycarbonate layer was not incorporated into the device.

The organic EL device had an ITO electrode as the anode and a mixed metal electrode of magnesium and silver as the cathode and was applied with a DC voltage of 17V, resulting in the passage of an electric current of approximately 20 mA/cm² to emit EL in green as determined by the chromaticity coordinates. The peak wavelength as determined by the spectrometry was 513 nm and the brightness was 20 cd/m². In this device, the required voltage was at a markedly high level but brightness was very low, emphasizing that the polycarbonate layer served as a hole injecting layer to a full extent in Example 2.

EXAMPLES 28 TO 36

Organic EL devices were prepared by using the polycarbonates listed in Table 3 and repeating the procedure of Example 26 and the results obtained with them are given in Table 3. Those EL devices were found to achieve sufficiently high brightness and further be excellent in efficiency of emitting EL in the colors range wherein it is difficult for conventional polymer emitting layers to work.

TABLE 3

| Example No. | Polycarbonates | Voltage (V) | Electric Current (mA/cm²) |
|---|---|---|---|
| 26 | Synthesis Example. 25 | 9 | 14 |
| 27 | Synthesis Example. 27 | 10 | 30 |
| 28 | Synthesis Example. 28 | 7 | 25 |
| 29 | Synthesis Example. 29 | 8 | 70 |
| 30 | Synthesis Example. 30 | 12 | 20 |
| 31 | Synthesis Example. 31 | 10 | 140 |
| 32 | Synthesis Example. 24 | 8 | 30 |
| 33 | Synthesis Example. 32 | 7 | 50 |
| 34 | Synthesis Example. 33 | 11 | 65 |
| 35 | Synthesis Example. 34 | 10 | 30 |
| 36 | Synthesis Example. 35 | 8 | 70 |
| 37 | Synthesis Example. 36 | 13 | 30 |
| 38 | Synthesis Example. 37 | 9 | 40 |

| Example No. | Colors of Luminescence | Brightness (cd/m²) | Luminescence Efficiency (1 m/W) |
|---|---|---|---|
| 26 | Purplish blue | 200 | 0.5 |
| 27 | Blue | 700 | 0.7 |
| 28 | Blue | 600 | 1.0 |
| 29 | Blue | 200 | 0.1 |
| 30 | Yellowish green | 200 | 0.5 |
| 31 | Purplish blue | 50 | 0.06 |
| 32 | Blue | 400 | 0.5 |
| 33 | Bluish green | 600 | 0.5 |
| 34 | Green | 400 | 0.2 |
| 35 | Bluish green | 560 | 0.6 |
| 36 | Green | 700 | 0.4 |
| 37 | Purple | 150 | 0.1 |
| 38 | Blue | 500 | 0.4 |

INDUSTRIAL APPLICABILITY

As described above, the organic EL device of the present invention is made of either or both of the emitting layer and the hole injecting layer comprising a thin film which is easy to be formed by the spin coating process. These emitting or hole injecting layers have an excellent ability to retain thin films. Furthermore, the organic EL device of the present invention, if using a polycarbonate of the present invention as an emitting layer, is capable of emitting EL in a color range from blue to green. Furthermore, the organic EL device of the present invention is sufficiently high in brightness, has high luminescence efficiency on an application of a low applied voltage and further has a long span of life time.

Thus, it is expected that the organic EL device of the present invention will find a wide and effective application in various segments of industry as an highly useful industrial tool.

We claim:

1. An organic electroluminescence device which comprises a polycarbonate containing a repeating unit of a styrylamine skeleton having an electroluminesence function as at least one material selected from the group consisting of an emitting material and a hole injecting material.

2. The organic electroluminescence device according to claim 1, wherein the styrylamine skeleton is a monovalent or divalent group formed by removing hydrogen atoms from a molecule wherein one aromatic tertiary amine is substituted by at least one arylvinylene or arylvinylene arylenevinylene group having 8 to 22 carbon atoms.

3. The organic electroluminescence device according to claim 1 wherein the styrylamine skeleton is a divalent group formed by removing hydrogen atoms from a molecule comprising 2 or 3 aromatic tertiary amines and a vinylene group or a vinylenearylene vinylene group having 10 to 22 carbon atoms which combines said aromatic tertiary amines.

4. The organic electroluminescence device according to claim 2 or 3, wherein a polycarbonate has a repeating unit comprising a styrylamine skeleton represented by the formula (I):

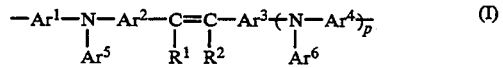

wherein Ar¹ to Ar⁴ are each independently a substituted or unsubstituted arylene group having 6 to 20 carbon atoms; Ar⁵ and Ar⁶ are each independently a substituted or unsubstituted aryl group having 6 to 20 carbon atoms; R¹ and R² are each independently a hydrogen atom, an alkyl group having 1 to 6 carbon atoms, a substituted or unsubstituted aryl group having 6 to 20 carbon atoms wherein the substituent group is an alkyl group or an alkoxy group each having 1 to 10 carbon atoms; and P is an integer of 0 or 1.

5. The organic electroluminescence device according to claim 2 or 3, wherein the polycarbonate has a repeating unit (α) represented by the general formula (II):

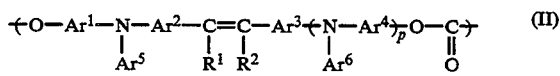

wherein $Ar^1$ to $Ar^4$ are each independently a substituted or unsubstituted arylene group having 6 to 20 carbon atoms; $Ar^5$ and $Ar^6$ are each independently a substituted or unsubstituted aryl group having 6 to 20 carbon atoms, $R^1$ and $R^2$ are each independently a hydrogen atom, an alkyl group having 1 to 6 carbon atoms, an unsubstituted aryl group having 6 to 20 carbon atoms or an aryl group having 6 to 20 carbon atoms substituted by an alkyl group having 1 to 10 carbon atoms or an alkoxy group having 1 to 10 carbon atoms; and P is an integer of 0 or 1, and a repeating unit ($\beta$) represented by the formula

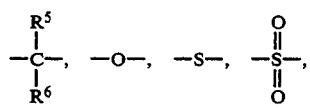

(III)

wherein $R^3$ and $R^4$ are each independently a hydrogen atom or an alkyl group having 1 to 6 carbon atoms; Y is represented by

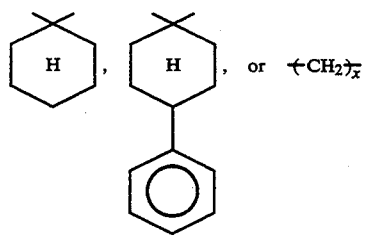

wherein x is an integer of 2 to 10; $R^5$ and $R^6$ are each independently a hydrogen atom or an alkyl group having 1 to 6 carbon atoms or an aryl group having 6 to 10 carbon atoms.

6. The organic electroluminescence device according to claim 2 or 3 wherein the polycarbonate has a repeating unit represented by the formula (IV):

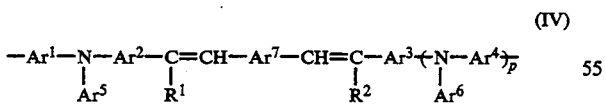

(IV)

wherein $R^1$ and $R^2$ are each independently a hydrogen atom, an alkyl group having 1 to 6 carbon atoms, an unsubstituted aryl group having 1 to 6 carbon atoms or an aryl group having 1 to 6 carbon atoms substituted by an alkyl group having 1 to 10 carbon atoms or an alkoxy group having 1 to 10 carbon atoms, P is an integer of 0 or 1 and $Ar^1$ to $Ar^4$ are each independently a substituted or unsubstituted arylene group having 6 to 20 carbon atoms; $Ar^5$ and $Ar^6$ are each independently a substituted or unsubstituted aryl group having 6 to 20 carbon atoms; $Ar^7$ is a substituted or unsubstituted arylene group having 6 to 20 carbon atoms wherein the substituent group is an alkyl group or an alkoxy group each having 1 to 10 carbon atoms; and the dotted lines mean an acceptable single-bond linkage.

7. The organic electroluminescence device according to claim 2 or 3, wherein the polycarbonate has a repeating unit ($\gamma$) represented by the general formula (V):

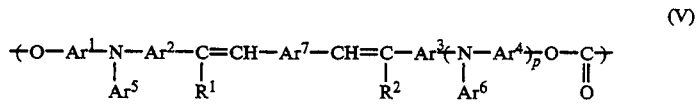

(V)

wherein $Ar^1$ to $Ar^4$ are each independently a substituted or unsubstituted arylene group having 6 to 20 carbon atoms; $Ar^5$ and $Ar^6$ are each independently a substituted or unsubstituted aryl group having 6 to 20 carbon atoms; $Ar^7$ is a substituted or unsubstituted arylene group having 6 to 20 carbon atoms wherein the substituent group is an alkyl group having 1 to 10 carbon atoms or an alkoxy group having 1 to 10 carbon atoms; $R^1$ and $R^2$ are each independently a hydrogen atom, an alkyl group having 1 to 6 carbon atoms, a substituted or unsubstituted aryl group having 6 to 20 carbon atoms wherein the substituent group is an alkyl group having 1 to 10 carbon atoms or an alkoxy group having 1 to 10 carbon atoms, and P is an integer of 0 or 1; and the dotted lines mean an acceptable single-bond linkage, and a repeating unit ($\beta$) represented by the formula (III)

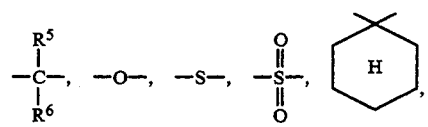

wherein $R^3$ and $R^4$ are each independently a hydrogen atom or an alkyl group having 1 to 6 carbon atoms; Y is

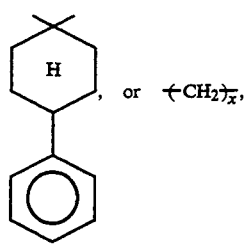

wherein x is an integer of 2 to 10; $R^5$ and $R^6$ are each independently a hydrogen atom or an alkyl group having 1 to 6 carbon atoms or an aryl group having 6 to 10 carbon atoms.

8. The organic electroluminescence device according to claim 1, wherein the polycarbonate has a repeating unit A comprising a diarylvinylene arylene skeleton represented by the general formula (IX):

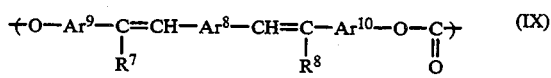

wherein $Ar^8$ to $Ar^{10}$ are each independently a substituted or unsubstituted arylene group having 6 to 10 carbon atoms represented by:

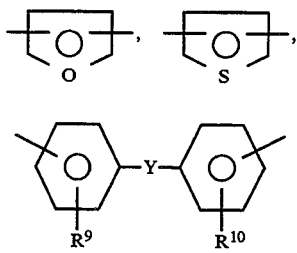

wherein $R^9$ and $R^{10}$ are each independently any of a hydrogen atom, a halogen atom, an alkyl group having 1 to 6 carbon atoms or an aryl group having 6 to 12 carbon atoms; and Y is represented by:

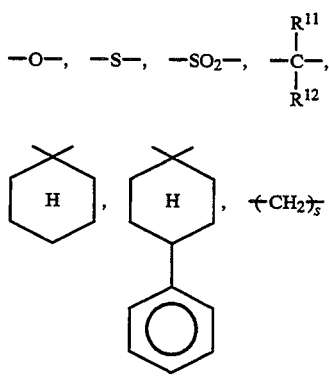

wherein $R^{11}$ and $R^{12}$ are each independently a hydrogen atom, a trifluoromethyl group, an alkyl group having 1 to 6 carbon atoms or an aryl group having 6 to 12 carbon atoms; and s is an integer of 2 to 10,

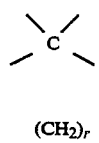

(CH₂)ᵣ wherein r is an integer of 4 to 10, or

wherein s is as defined above; $R^7$ and $R^8$ are each independently an alkyl group having 1 to 6 carbon atoms or a substituted or unsubstituted aryl group having 6 to 20 carbon atoms.

9. The organic electroluminescence device according to claim 8, wherein the polycarbonate has a reduced viscosity of 0.2 dl/g or more as determined in a solution having a concentration of 0.5 g/dl of the polycarbonate with a methylene chloride as the solvent at 20° C.

10. The organic electroluminescence device according to claim 9, wherein the polycarbonate has the repeating unit A represented by the formula (IX) and a repeating unit B represented by the formula (X):

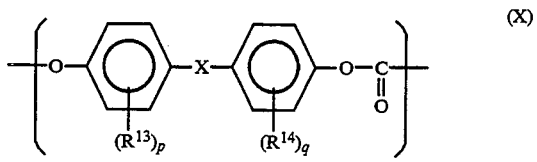

wherein $R^{13}$ and $R^{14}$ ape each independently a hydrogen atom, a halogen atom, an alkyl group having 1 to 6 carbon atoms or an aryl group having 6 to 12 carbon atoms; p and q are each independently an integer of 1 to 4; and X is represented by:

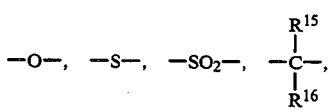

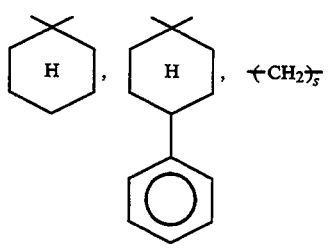

wherein $R^{15}$ and $R^{16}$ are each independently a hydrogen atom, a trifluoromethyl group, an alkyl group having 1 to 6 carbon atoms or an aryl group having 6 to 12 carbon atoms; and s is as defined above,

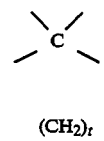

(CH₂)ₜ wherein t is an integer of 4 to 10, or

wherein u is an inter of 2 to 10.

11. The organic electroluminescence device according to claim 4 or 6, wherein the polycarbonate has a reduced viscosity of 0.2 dl/g or more as determined in a solution having a concentration of 0.5 g/dl of the polycarbonate with a methylene chloride as the solvent at 20° C.

12. The organic electroluminescence device wherein the polycarbonate as set forth in claim 1 is interposed between a pair of electrodes.

13. The organic electroluminescence device according to claim 1, comprising an anode, a hole injecting layer, an emitting layer, an electron injecting layer and a cathode which are laminated in this order.

14. The organic electroluminescence device according to claim 1, comprising an anode, an emitting layer, an electron injecting layer and a cathode which are laminated in this order.

15. The organic electroluminescence device comprising a hole injecting layer made of the polycarbonate as set forth in claim 1.

16. The organic electroluminescence device comprising a hole injecting layer made of the polycarbonate as set forth in claim 8.

17. The organic electroluminescence device comprising an emitting layer made of the polycarbonate as set forth in claim 1.

18. The organic electroluminescence device comprising an emitting layer made of the polycarbonate as set forth in claim 8.

19. The organic electroluminescence device according to claim 6, wherein the polycarbonate has a reduced viscosity of 0.2 dl/g or more as determined in a solution having a concentration of 0.5 g/dl of the polycarbonate with a methylene chloride as the solvent at 20° C.

20. An organic electroluminescence device which comprises a polycarbonate containing a repeating unit of a diarylvinylene arylene skeleton having an electroluminescence function as at least one material selected from the group consisting of an emitting material and a hole injecting material.

21. The organic electroluminescence device wherein the polycarbonate as set forth in claim 20 is interposed between a pair of electrodes.

22. The organic electroluminescence device according to claim 19, comprising in the following sequence: an anode, a hole injecting layer, an emitting layer, an electron injecting layer and a cathode, which are laminated in said sequence.

23. The organic electroluminescence device according to claim 19, comprising in the following sequence: an anode, an emitting layer, an electron injecting layer and a cathode, which are laminated in said sequence.

24. The organic electroluminescence device according to claim 1, wherein the polycarbonate contains a repeating unit selected from the group consisting of

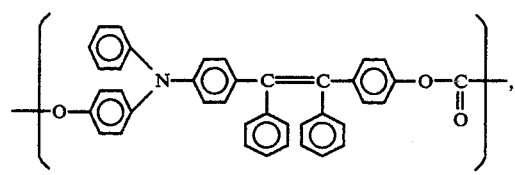

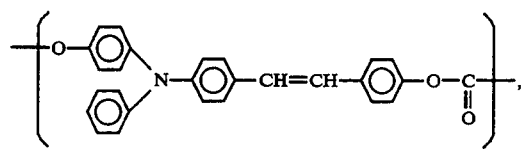

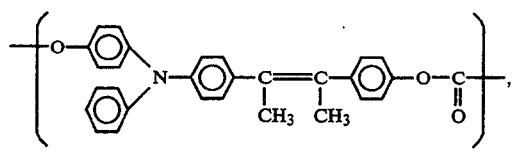

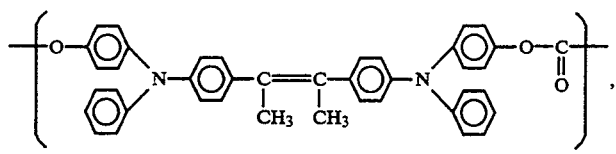

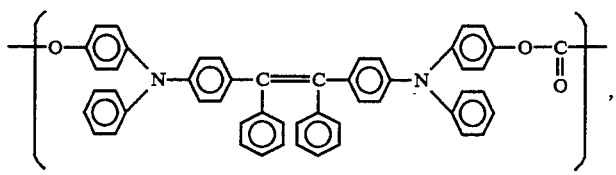

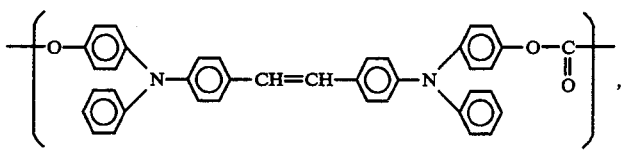

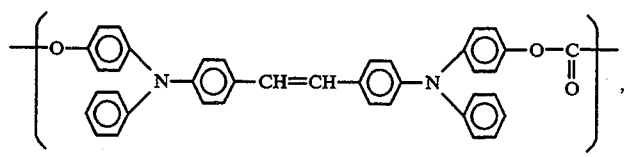
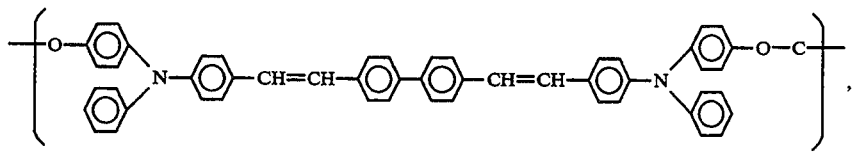
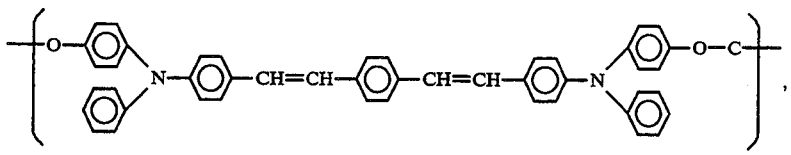
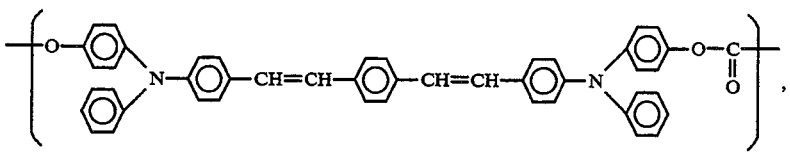
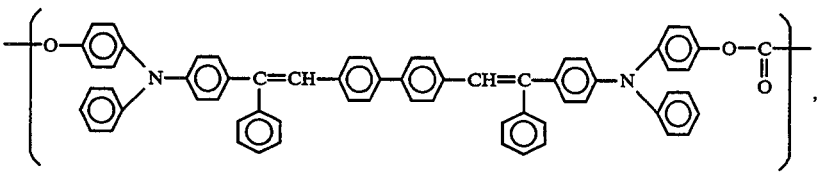
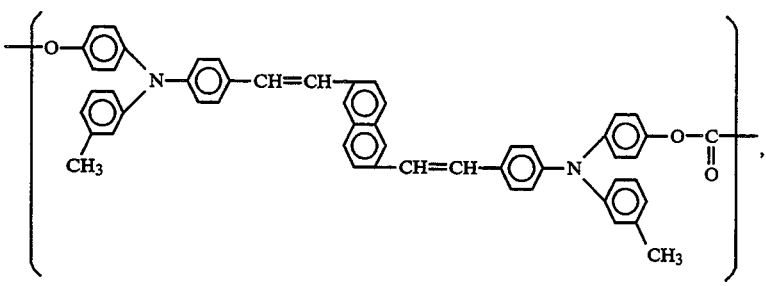
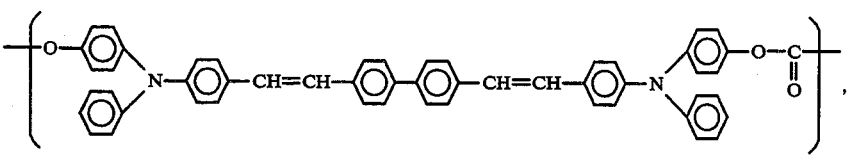
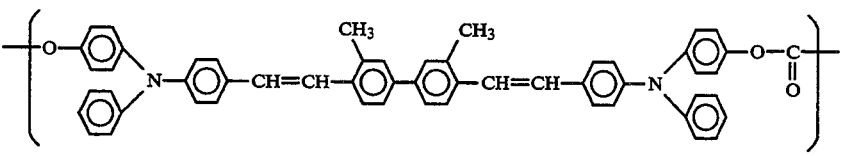
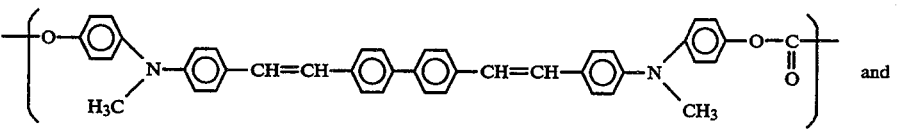 and

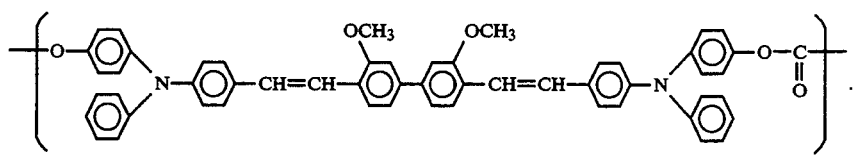
25. The organic electroluminescence device according to claim 20, wherein the polycarbonate contains a repeating unit selected from the group consisting of
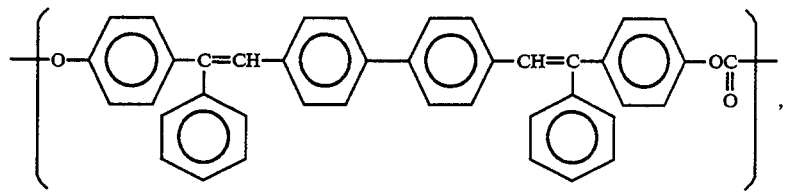
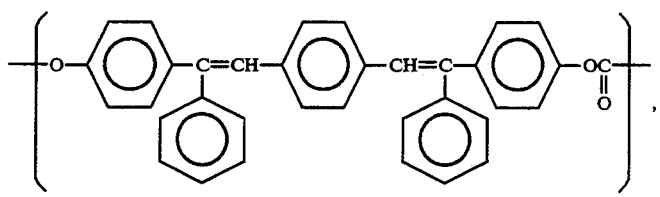
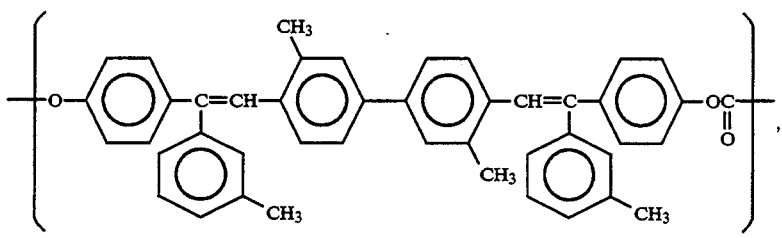
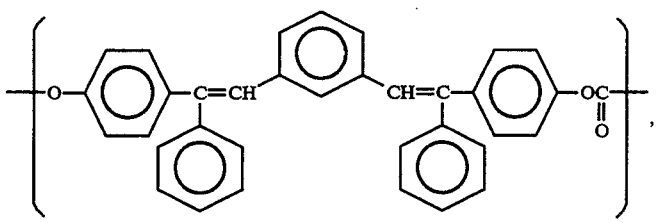
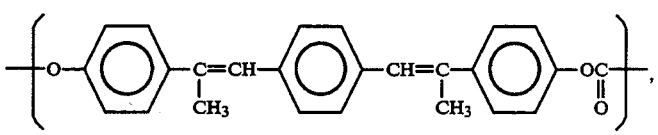
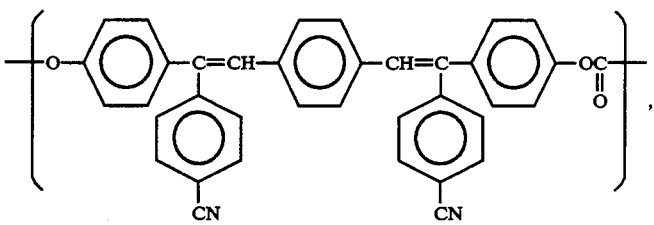

-continued
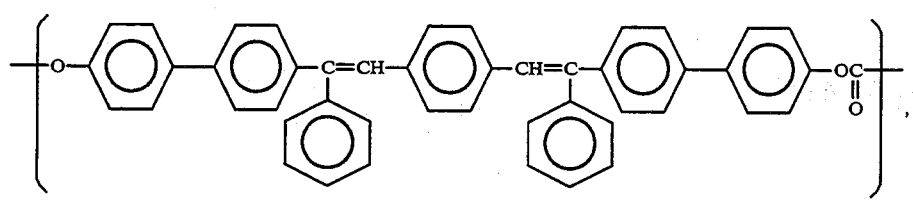
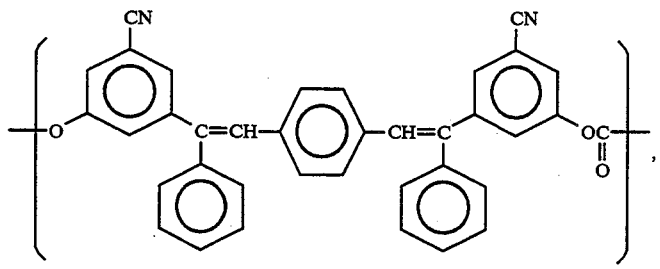
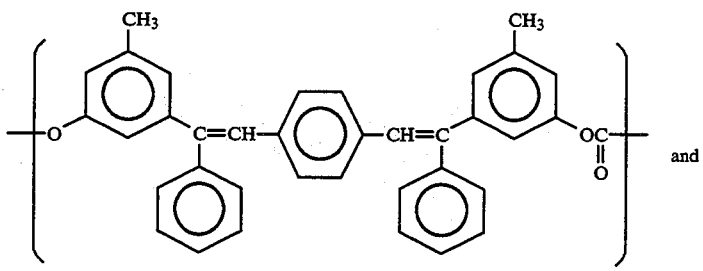 and
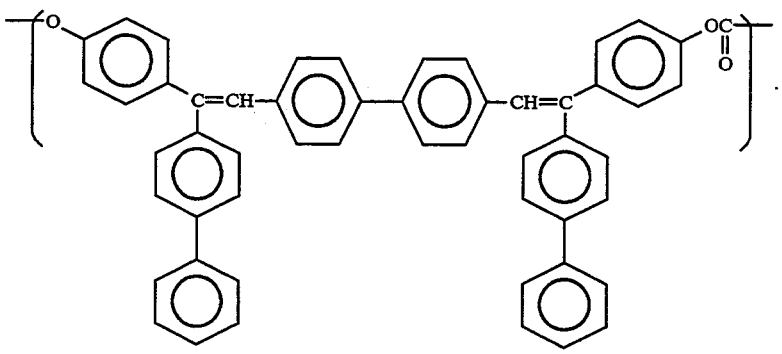
* * * * *

UNITED STATES PATENT AND TRADEMARK OFFICE
CERTIFICATE OF CORRECTION

PATENT NO. : 5,389,444
DATED : February 14, 1995
INVENTOR(S) : HOSOKAWA et al

It is certified that error appears in the above-indentified patent and that said Letters Patent is hereby corrected as shown below:

Column 92, line 52, claim 11, delete "or 6".

Column 94, line 9, claim 22, delete "claim 19" and insert --claim 20--.

Column 94, line 14, claim 23, delete "claim 19" and insert --claim 20--.

Signed and Sealed this

Eighth Day of October, 1996

Attest:

BRUCE LEHMAN

Attesting Officer      Commissioner of Patents and Trademarks